(12) United States Patent
Stewart et al.

(10) Patent No.: US 10,004,181 B2
(45) Date of Patent: Jun. 26, 2018

(54) TREE SURROUND FOR WATERING TREES AND BUSHES ON SLOPED HILLSIDES

(71) Applicants: Jonathan L. Stewart, Albuquerque, NM (US); Elaine A. Hart, Albuquerque, NM (US)

(72) Inventors: Jonathan L. Stewart, Albuquerque, NM (US); Elaine A. Hart, Albuquerque, NM (US)

( * ) Notice: Subject to any disclaimer, the term of this patent is extended or adjusted under 35 U.S.C. 154(b) by 281 days.

(21) Appl. No.: 14/929,279

(22) Filed: Oct. 31, 2015

(65) Prior Publication Data
US 2017/0118920 A1    May 4, 2017

(51) Int. Cl.
*A01G 1/00* (2006.01)
*A01G 9/28* (2018.01)
*A01G 1/08* (2006.01)

(52) U.S. Cl.
CPC .............. *A01G 9/28* (2018.02); *A01G 1/08* (2013.01)

(58) Field of Classification Search
USPC .......... 47/33, 32, 32.7, 32.8, 1.01 T; 52/102, 52/169.4; D25/164; 256/26; 403/279, 403/282, 361, 365
See application file for complete search history.

(56) References Cited

U.S. PATENT DOCUMENTS

| | | | |
|---|---|---|---|
| 348,598 A | 9/1886 | Strickland | |
| 933,654 A | 9/1909 | Lippincott | |
| 1,798,265 A | 3/1931 | McGibbon | |
| 2,061,631 A * | 11/1936 | Law | A01G 13/0243 405/284 |
| 2,184,904 A | 12/1939 | Boehme | |
| 2,782,561 A | 2/1957 | Smith | |
| 2,865,136 A * | 12/1958 | Roy | A01G 1/08 47/33 |
| 2,909,328 A | 10/1959 | Babyak | |
| 3,305,969 A | 2/1967 | Mattson | |
| 3,378,949 A * | 4/1968 | Dorris | A01G 9/28 47/33 |
| 3,415,013 A | 12/1968 | Galbraith | |
| 3,472,133 A | 10/1969 | Ziehm, Jr. | |
| 3,520,082 A | 7/1970 | Smith | |
| 3,545,128 A | 12/1970 | Fontaine et al. | |
| 3,777,421 A | 12/1973 | Bomba et al. | |
| 3,951,294 A | 4/1976 | Wilson | |
| 4,087,938 A | 5/1978 | Koch | |

(Continued)

FOREIGN PATENT DOCUMENTS

| FR | 1421937 | * | 1/1965 | .............. A01G 1/08 |
|---|---|---|---|---|
| FR | 3009922 | * | 5/2013 | .............. A01G 1/08 |
| GB | 1365482 | * | 11/1971 | |

*Primary Examiner* — Andrea M Valenti
(74) *Attorney, Agent, or Firm* — Robert D. Watson

(57) ABSTRACT

A water-retaining enclosure for surrounding trees and bushes and holding water, on flat or sloped hillsides. The enclosure is made of a resilient, polymeric material, such as wood/polymer composite. The bottom edge of the enclosure can have a sharpened edge or sawteeth for cutting into the soil. The upper edges can be tapered. The ends can be joined together to make a 360° ring using a watertight joint, or left open to form a 270° (¾) circle. The joint can utilize an elastomeric seal, finned connector, mating conical surfaces, interlocking flanges, or an interference fit to make it watertight.

10 Claims, 63 Drawing Sheets

(56) References Cited

U.S. PATENT DOCUMENTS

| | | |
|---|---|---|
| 4,590,705 A | 5/1986 | Prince |
| 4,647,491 A | 3/1987 | Ireland et al. |
| 4,648,203 A | 3/1987 | Worzek |
| 4,665,645 A | 5/1987 | Schau, III et al. |
| 4,761,923 A | 8/1988 | Reum et al. |
| 4,809,460 A * | 3/1989 | Futch .................. A01G 9/28 47/33 |
| 4,858,379 A | 8/1989 | West |
| 4,905,409 A | 3/1990 | Cole |
| 4,934,093 A | 6/1990 | Yanna |
| 4,955,156 A | 9/1990 | Williams |
| 4,976,063 A | 12/1990 | Young |
| 5,048,241 A | 9/1991 | Gavin, Jr. |
| 5,060,416 A | 10/1991 | Rohde |
| 5,119,587 A | 6/1992 | Waltz |
| 5,259,154 A | 11/1993 | Lilley |
| 5,301,461 A | 4/1994 | Zwier |
| 5,323,557 A | 6/1994 | Sonntag |
| 5,367,822 A | 11/1994 | Beckham |
| 5,456,045 A | 10/1995 | Bradley et al. |
| 5,465,526 A | 11/1995 | Langley |
| 5,522,176 A | 6/1996 | Suttle |
| 5,566,503 A * | 10/1996 | Nickson .................. A01G 1/08 47/30 |
| 5,615,529 A | 4/1997 | Johnson et al. |
| 5,647,169 A | 7/1997 | Bui |
| 5,661,925 A | 9/1997 | MacMaster |
| 5,711,106 A | 1/1998 | Ellis |
| 5,775,027 A | 7/1998 | Tisbo et al. |
| 5,794,378 A | 8/1998 | Beatrez |
| 5,839,222 A | 11/1998 | Sittner |
| 5,844,431 A | 12/1998 | Chen |
| 5,862,629 A | 1/1999 | Sulyman |
| 5,921,021 A | 7/1999 | Coates |
| 6,012,254 A | 1/2000 | Gaston |
| 6,202,367 B1 * | 3/2001 | Marino .................. A01G 1/08 47/30 |
| 6,349,500 B1 | 2/2002 | Popham |
| 6,357,172 B1 | 3/2002 | Risgaard et al. |
| 6,367,194 B1 | 4/2002 | Measday et al. |
| 6,523,300 B2 | 2/2003 | Smith |
| 6,606,818 B1 | 8/2003 | Christmas |
| 6,625,925 B1 | 9/2003 | Foster |
| 6,931,798 B1 | 8/2005 | Pocai |
| D554,276 S | 10/2007 | Lu |
| D554,957 S | 11/2007 | Harvey |
| D624,213 S * | 9/2010 | Perotti .................. D25/164 |
| 8,132,358 B1 | 3/2012 | Wells |
| 8,528,249 B1 | 9/2013 | Kao |
| 8,826,588 B1 | 9/2014 | MacKichan et al. |
| 2002/0112398 A1 * | 8/2002 | Smith .................. A01G 1/08 47/33 |
| 2007/0113473 A1 | 5/2007 | Sellers, Sr. et al. |
| 2014/0215908 A1 | 8/2014 | Ta |

* cited by examiner

Sec. B-B

Sec. C-C

Sec. D-D

Sec A-A

Sec A-A

Sec A-A

Sec A-A

Sec A-A

Sec B-B

TREE SURROUND FOR WATERING TREES AND BUSHES ON SLOPED HILLSIDES

CROSS-REFERENCE TO RELATED APPLICATIONS

None

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention pertains to landscape borders, edging, and enclosure devices for protection and watering of trees and bushes/shrubs in yards or gardens, including sloped hillsides.

Description of Related Art

Gardeners and landscapers frequently utilize border or edging material, such as fences, logs, railroad ties, bricks, concrete blocks, and the like to provide a decorative or functional edge for a lawn or garden, or to establish a terrace, or to surround a tree, or to contain mulch. Such border items are heavy, awkward to handle and place, and generally are not watertight. Such border items are also not designed to be used on sloped ground or a hillside.

U.S. Pat. No. 5,367,822 to Beckham describes a circular tree surround (edging border) made from an impermeable plastic material, which lies on the ground, and has a central well for holding water in a porous foam insert. The product is not designed for use on a slope or hillside; and depending on the manufacturing tolerances, the male/female interlocking joint that connects the two free ends of the tree surround may, or may not be, a watertight joint, depending on the tolerances.

U.S. Pat. No. 6,367,194 to Measday, et al. describes a circular tree surround made from a flexible, impermeable polymeric material, having a conical shape, and which is partially buried in the ground. The product is not designed for use on a slope or hillside, and the conical shape of the surround requires that dirt be dug up and backfilled around the outside of the surround after installation. Also, depending on the manufacturing tolerances, the male/female interlocking joint that connects the two free ends of the tree surround may, or may not be, a watertight joint, depending on the tolerances.

U.S. Pat. No. 5,465,526 to Langley describes a circular tree surround (edging border) made from an impermeable plastic material, which is partially embedded in the ground, and has a serrated bottom edge. The product is not designed for use on a slope or hillside; and depending on the manufacturing tolerances, the "T"-shaped male/female interlocking joint that connects the two free ends of the tree surround may, or may not be, a watertight joint, depending on the tolerances.

U.S. Pat. No. 5,566,503 to Nickson describes a circular tree surround (edging border) made from an impermeable plastic material, which is partially buried in the ground, and has a serrated bottom edge. The product is not designed for use on a slope or hillside; and the male/female interlocking joint that connects the two overlapping sides of the tree surround may not remain as a watertight joint as the plastic ages, softens, and weakens over time.

US Patent Application Publication US 2014/0215908 A1 to Scott Ta describes a circular tree surround made from a flexible, impermeable polymeric material, which rests on the ground. The product is not designed for use on a slope or hillside; and depending on the manufacturing tolerances, the male/female interlocking joint that connects the two free ends of the tree surround may, or may not be, a watertight joint, depending on the tolerances.

Against this background, the present invention was developed.

SUMMARY OF THE INVENTION

The present invention relates to water-retaining enclosures for surrounding trees and bushes and holding water, on flat or sloped hillsides. The enclosure is made of a resilient, polymeric material, such as wood/plastic composite. The bottom edge of the enclosure can have a sharpened edge or sawteeth for cutting into the soil when the embedded in the ground. The upper edges can be tapered. The ends of the enclosure can be joined together to make a 360° ring with a watertight joint, or left open to form a 270° (¾) circle. The joint can utilize an elastomeric seal, finned connector, mating conical surfaces, interlocking flanges, or an interference fit to make it watertight.

BRIEF DESCRIPTION OF THE SEVERAL VIEWS OF THE DRAWING(S)

DETAILED DESCRIPTION OF THE INVENTION

FIGS. 1-34B describe examples of a various embodiments of the present invention. Note: the terms: "tree surround", "tree ring", "tree enclosure", "tree strip", and "edging strip" are intended to be synonymous terms in this application. The terms "male and female connectors" are identical to "male and female members".

Figure 1:
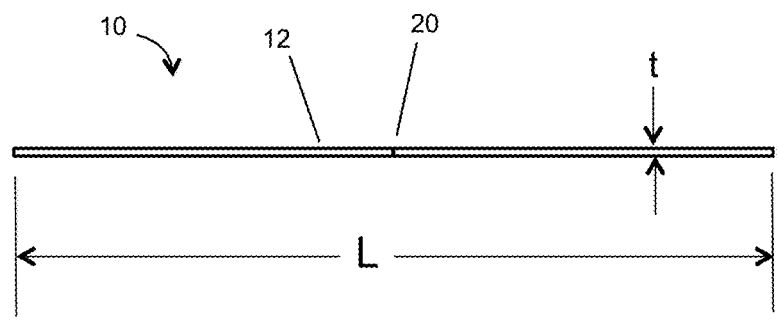
FIG. 1 shows a plan view of an example of the present invention.

FIG. 1 shows a plan view of an example of the present invention, in the uninstalled (pre-bent) state. Tree surround 10 comprises a flat strip 12 of resilient, polymeric/plastic material having a uniform wall thickness, t.

The wall thickness, t, can range from 0.10-0.30 inches thick, with a preferred thickness in the range of 0.15-0.20 inches. Tree surround strip 10 can be made of a resilient plastic material that is resistant to UV rays, such as: polypropylene, polyethylene, high-density polyethylene, low-density polyethylene, polyvinyl chloride, reground/recycled polypropylene; chlorinated polyvinyl chloride, polyvinylidene fluoride, vinyl esters, epoxy resins, ultra high molecular weight polyethylene, fluorinated ethylene propylene, acrylonitrile-butadiene-styrene, fiberglass reinforced vinyl ester, fiberglass reinforced epoxy, polyphenylene sulfide, polyether sulfone, fiberglass reinforced polyvinylchloride, thermoplastic resins, acrylic (poly(methyl methacrylate),PMMA), Nylon (polyamide), polylactic acid (polylactide), polycarbonate (e.g., Lexan), polybenzimidazole (PBI), and recycled wood/plastic composites (which includes non-cellulose wood-like fillers, such as peanut hulls, bamboo, straw, and digestate). The percentage of wood-filler in the wood/plastic composite can be tailored as needed (ranging from 10% to 70% wood content) to optimize the strength, durability, etc. of the wood/plastic composite.

Figure 2A:
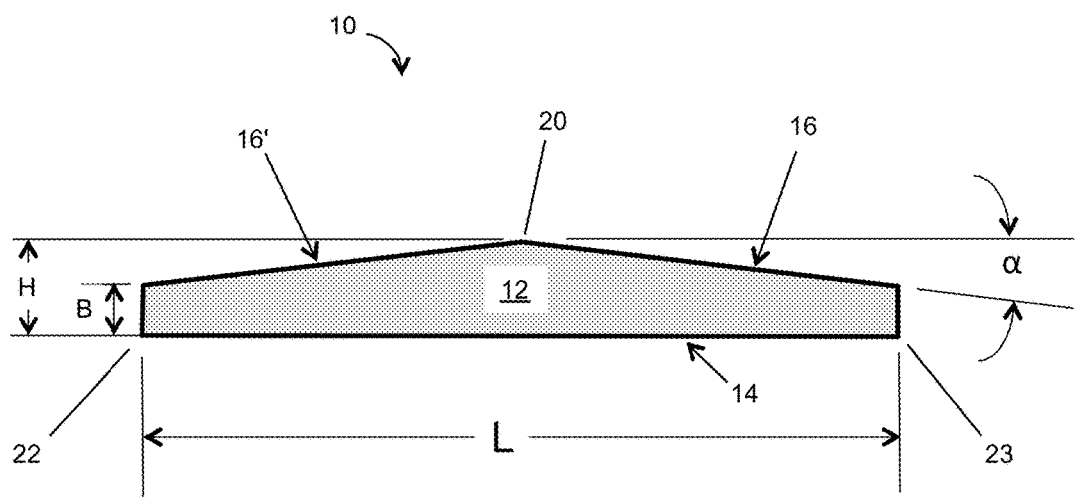
FIG. 2A shows an elevation view of an example of the present invention.

FIG. 2A shows an elevation view of an example of the present invention, in the uninstalled state. Surround 10 comprises a long strip 12 of material, having a length, L, which is much greater than the strip's thickness, t. The length, L, can range from 2-8 feet, with preferred lengths of 3, 4, 5, and 6 feet long. Strip 12 has a lower, (bottom) edge 14 that can be substantially straight/flat; and a pair of upper edges (top) edges 16 and 16', which are slanted (tapered) at an angle, α, from the horizontal. Taper angle, α, can range from 0 to 20 degrees, depending on the slope of the ground (hillside), with a preferred angle ranging from 10-15 degrees. The central height, H, of strip 12 can range from 2-8 inches or more, with a preferred height of 4-6 inches. The end height, B, of the distal ends 22, 23 of strip 12 can range from 0-4 inches, with a preferred height, B, of 1-3 inches (for example, B=2 inches). Tapered edges 16 and 16' are located at the top edge of surround 10, and the strip 10 is installed with the bottom edge 14 being partially embedded in the ground a minimum of ¼ to ½ inch. The bottom edge 14 has a sharpened (beveled) point or a plurality of sawteeth (not shown), which greatly aid in cutting into the soil when being embedded in the ground (to be discussed later). The high point of the strip occurs at point 20, located in the center of strip 12 (halfway along the length of strip 12). When installed on a hillside, the high central point 20 is located at the furthermost downhill position, and the distal ends 22, 23 are located at the uphill-most location (see, e.g., FIGS. 7C to 7F)

Figure 2B:
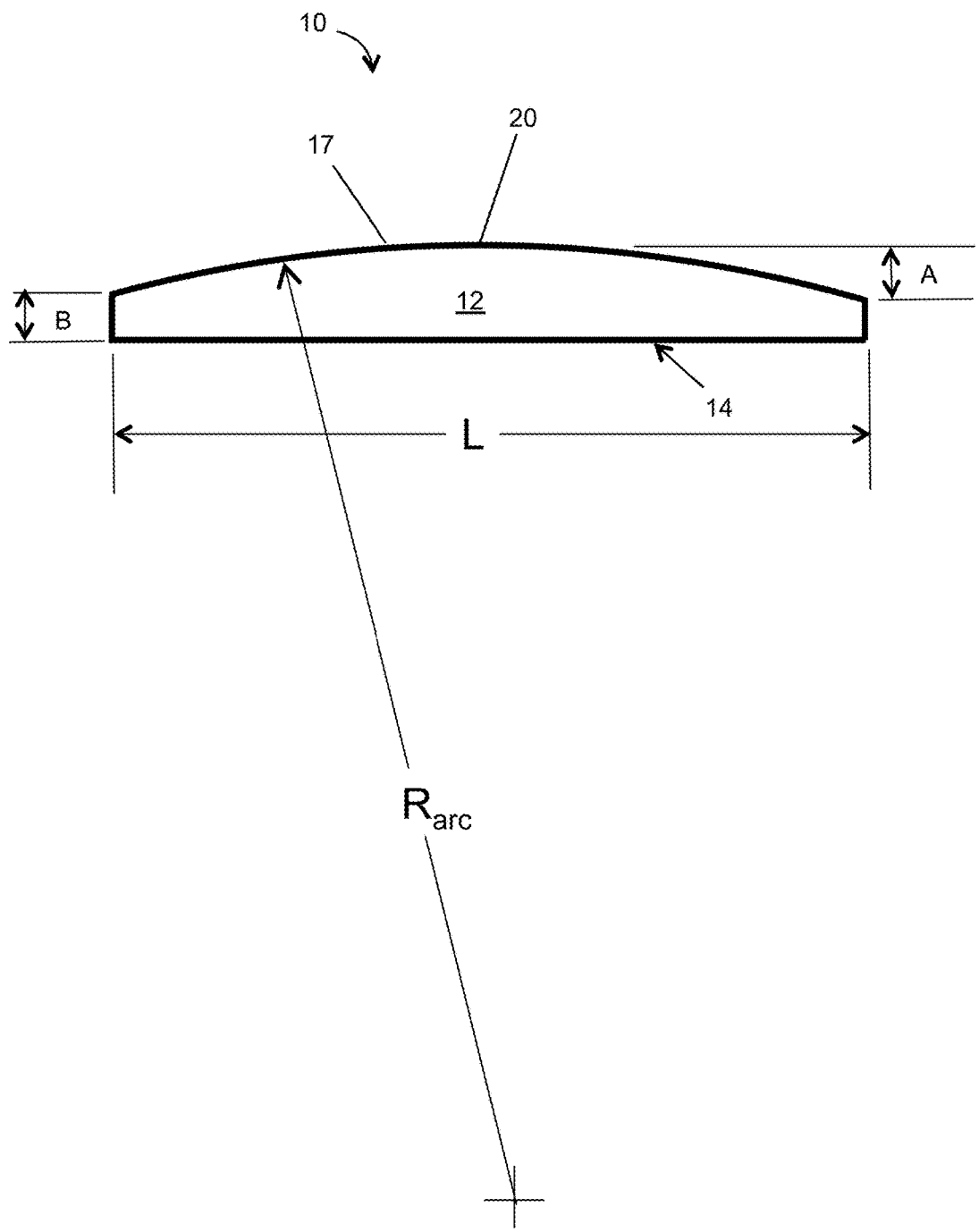
FIG. 2B shows an elevation view of an example of the present invention.

FIG. 2B shows an elevation view of an example of the present invention, in the uninstalled state. Here, the curved (tapered) top edge 17 is defined by the arc of a large circle with radius=$R_{arc}$, which has a radius on the order of 1.5 to 3.0 times the length, L, of surround 12, depending on the ratio of dimensions A and B.

Figure 3:
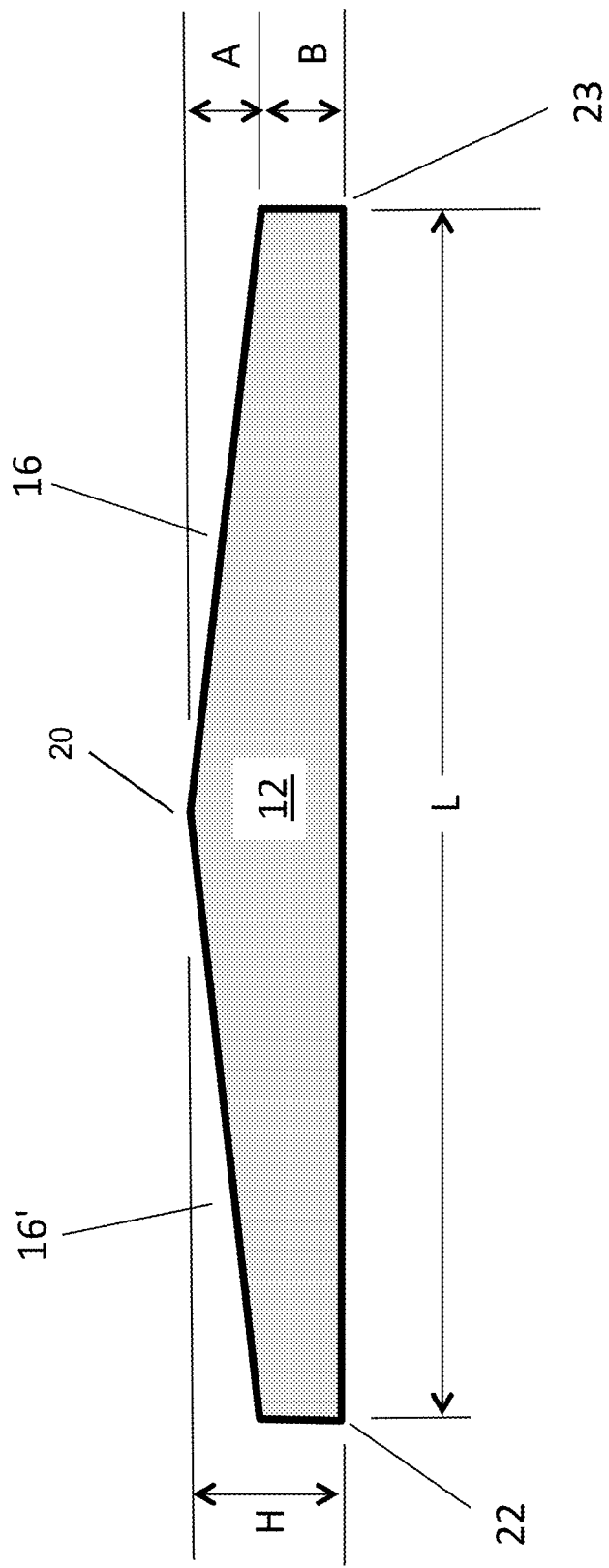
FIG. 3 shows an elevation view of an example of the present invention.

FIG. 3 shows an elevation view of an example of the present invention, in the uninstalled state. The total height, H, of strip 12 can range from 2-8 inches, with a preferred height of 4-6 inches. The taper angle, α, can be chosen such that the height B of the distal ends 22, 23, ranges from 0 to ½ H.

Figure 4A:
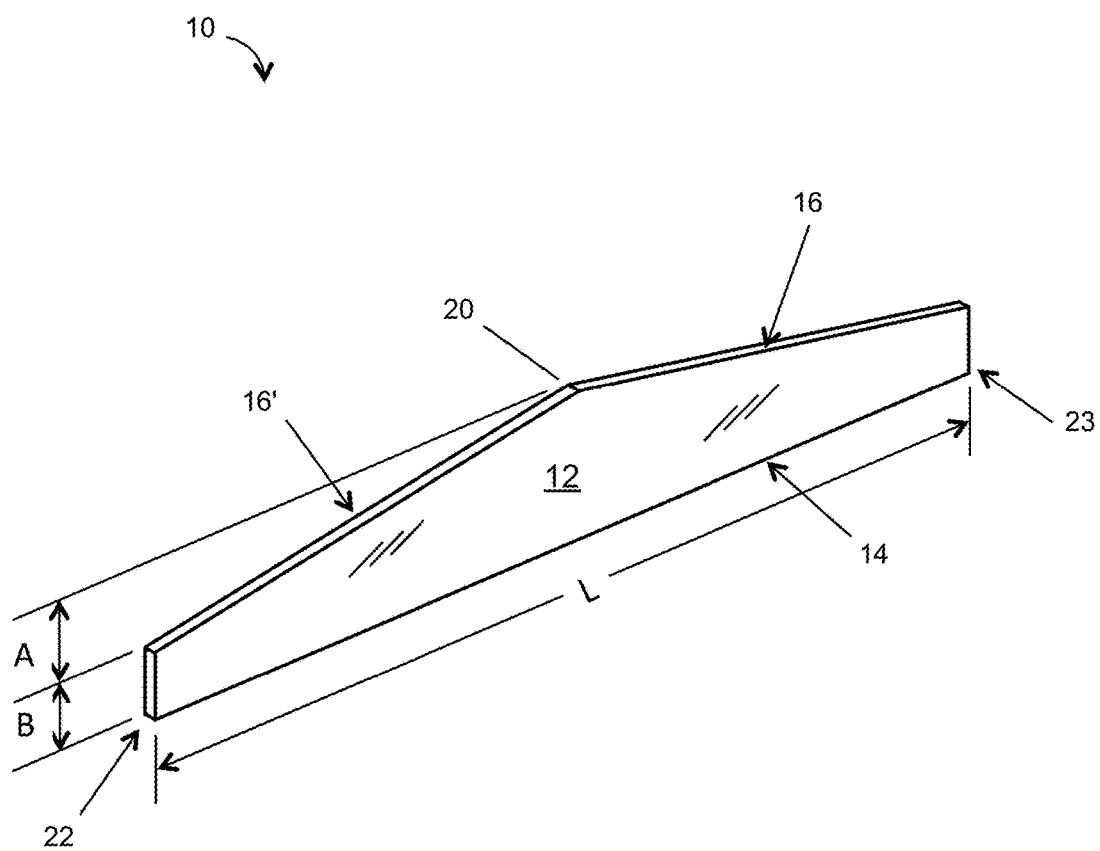
FIG. 4A shows an isometric view of an example of the present invention.

FIG. 4A shows an isometric view of an example of the present invention, in the uninstalled state. The highest point, 20, of strip 12 occurs halfway between the two ends, 22, 23.

Figure 4B:
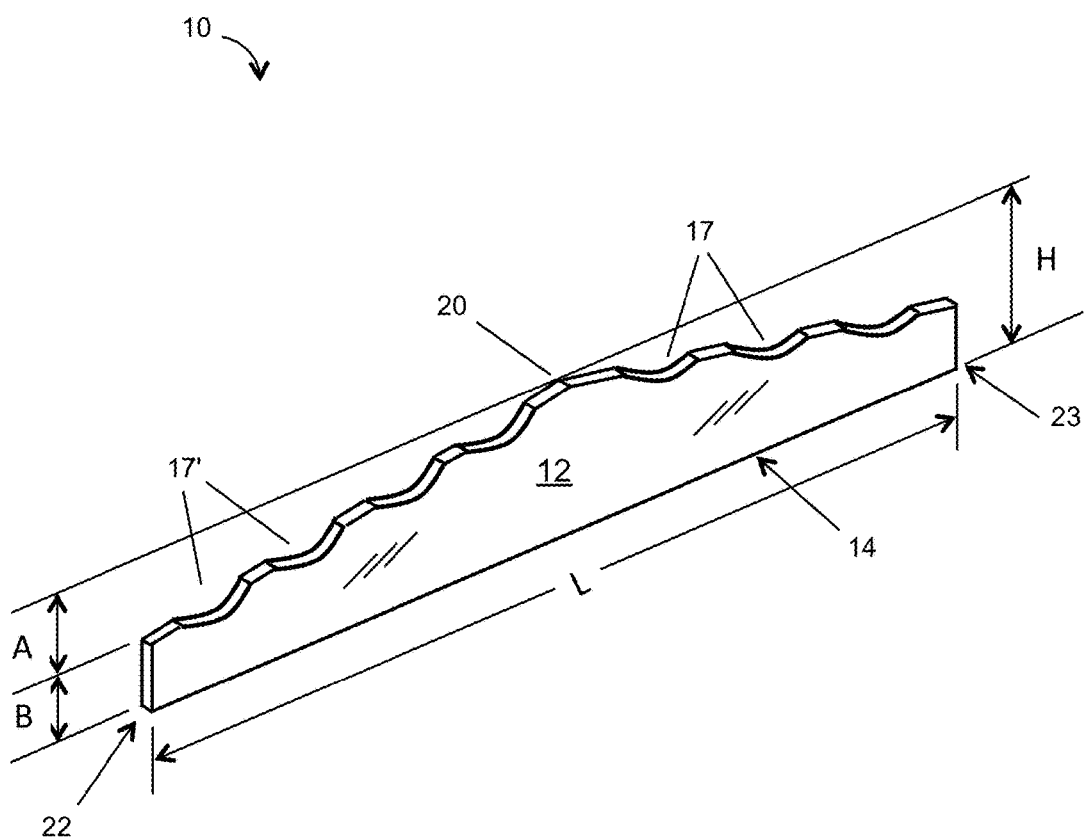
FIG. 4B shows an isometric view of an example of the present invention.
Figure 4C:
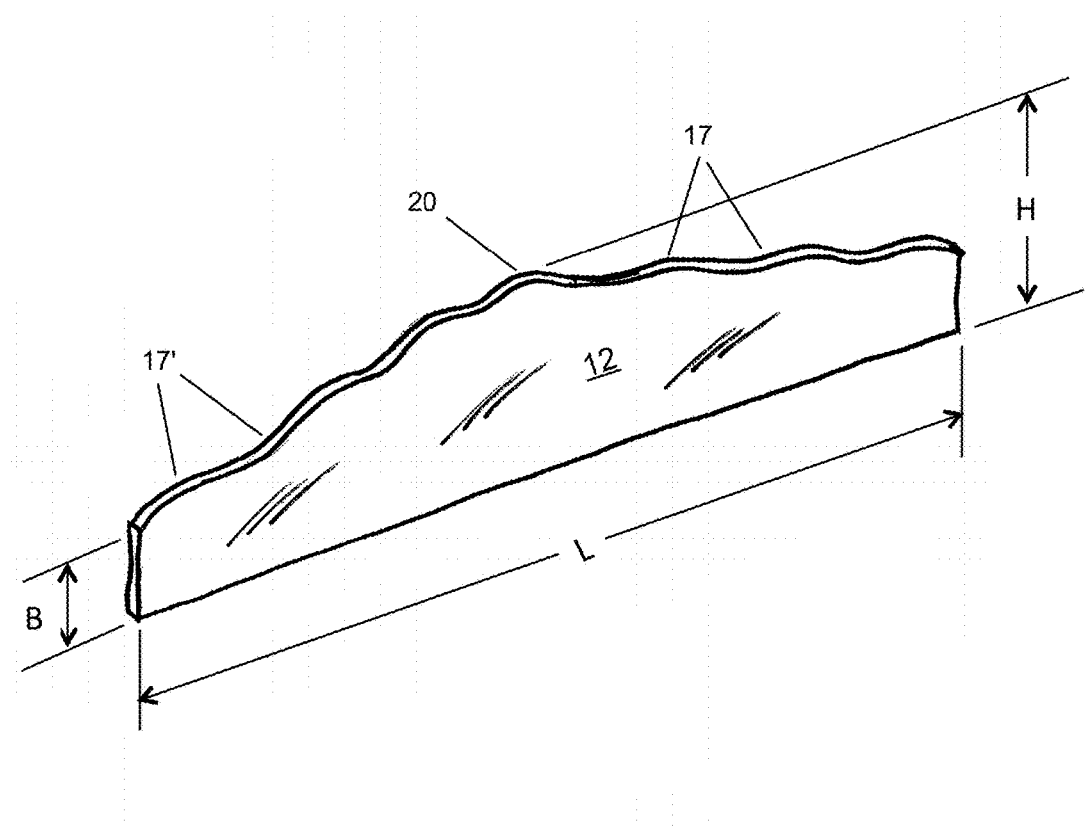
FIG. 4C shows an isometric view of an example of the present invention.

FIGS. 4B and 4C show isometric views of a pair of examples of the present invention, in the uninstalled state. The highest point, 20, of strip 12 occurs halfway between the two ends, 22, 23. The top edge 17 and 17' comprises a decorative pattern, such as a wavy or scalloped pattern, while still retaining the same overall taper angle, α, (as shown, for example, in FIG. 4A).

Figure 5:
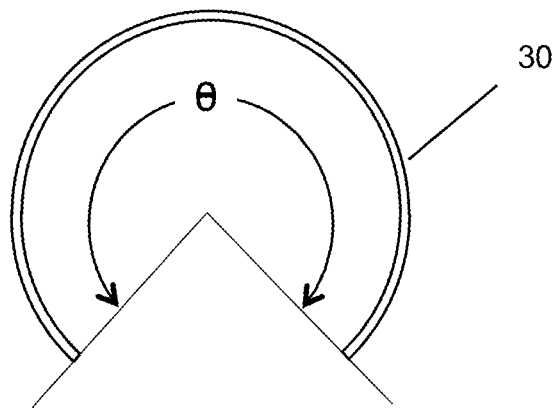
FIG. 5 shows a plan view of an example of the present invention.

FIG. 5 shows a plan view of an example of the present invention, in the installed state, curved into circular shape. The angle of coverage, Θ, can range from 180° to 360°, with a preferred angle of 270° (¾ coverage), in some embodiments.

Figure 6:
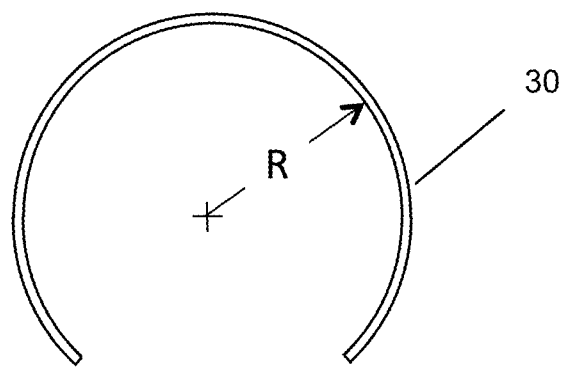
FIG. 6 shows a plan view of an example of the present invention.

FIG. 6 shows a plan view of an example of the present invention. The radius of curved strip 30 can range from 1-3 feet, with a preferred radius of 2 feet. Note: because of the flexibility of strip 30, the installed shape can be non-circular about the tree or bush.

Figure 7A:
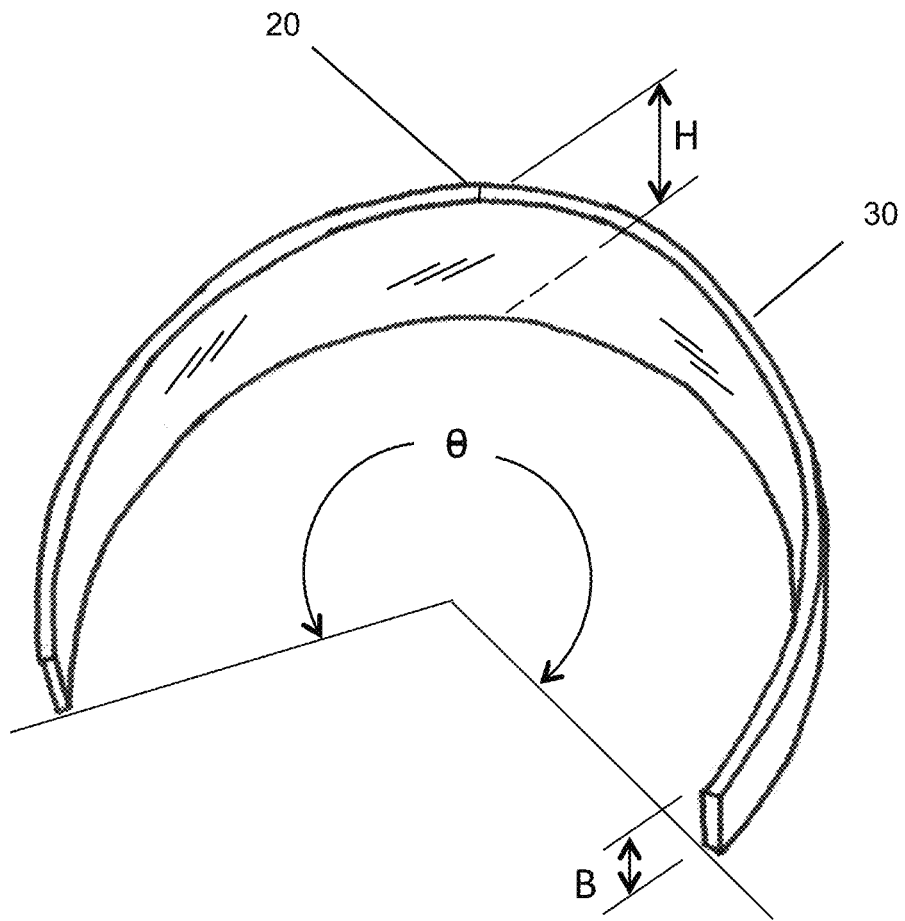
FIG. 7A shows an isometric view of an example of the present invention.

FIG. 7A shows an isometric view of an example of the present invention, in the installed state. The strip 30 is installed so that the peak, 20, of strip 30 is located at the most-downhill position along a slope or hillside.

Figure 7B:
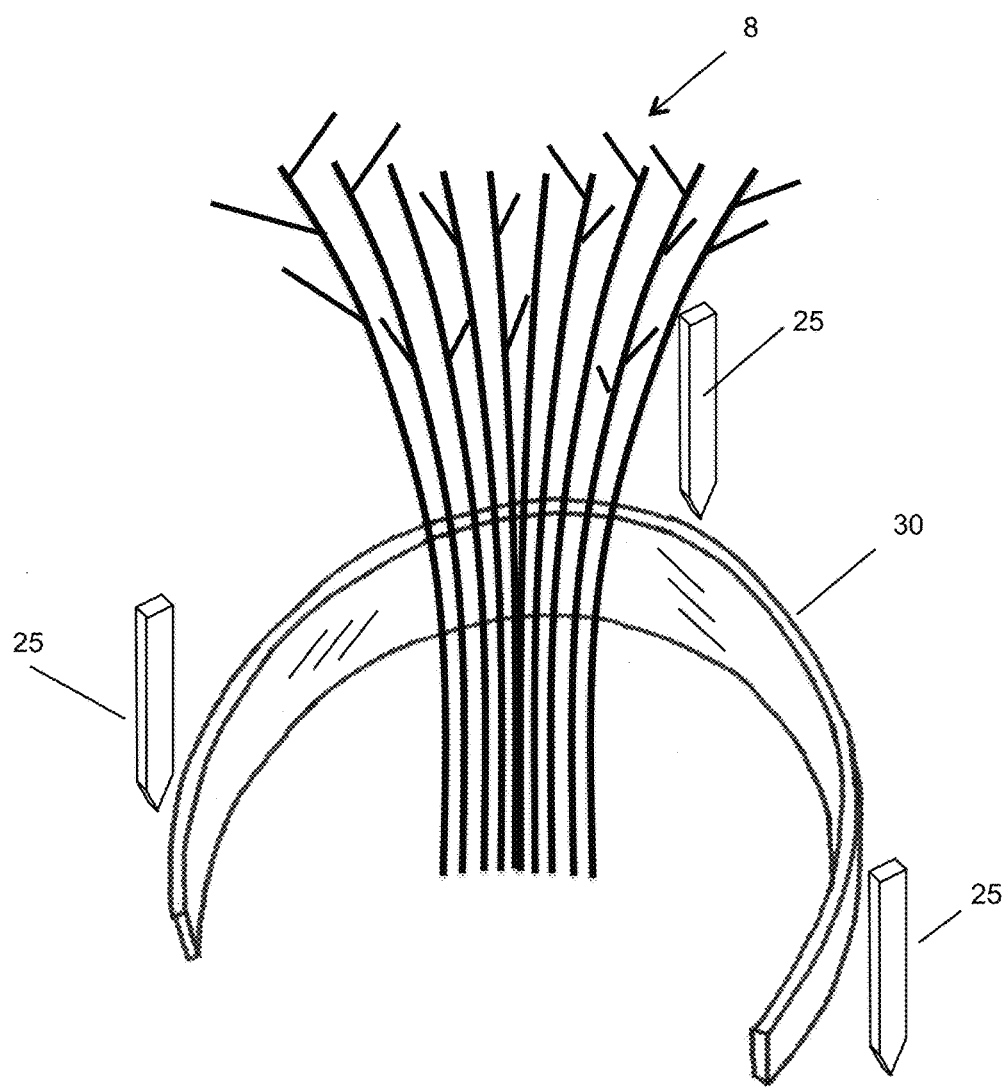
FIG. 7B shows an isometric view of an example of the present invention.

FIG. 7B shows an isometric view of an example of the present invention, in the installed state. This shows an example with 3 stakes/pins 25 used to hold strip 30 in the curved, installed state.

Figure 7C:
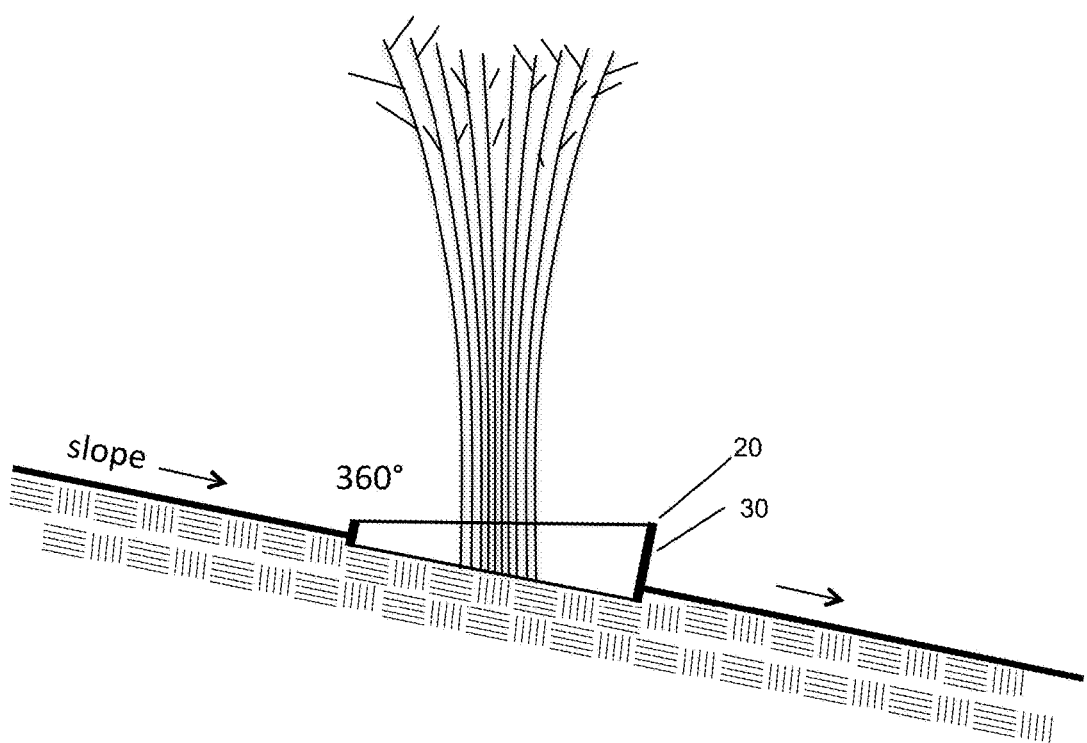
FIG. 7C shows an elevation cross-sectional view of an example of the present invention.

FIG. 7C shows an elevation cross-sectional view of an example of the present invention. Surround enclosure 30 makes a complete 360° circle in this example, with the highest point 20 being located at the most-downhill point along the slope. Enclosure 30 is buried approximately 0.5-2 inches deep in the ground, with the depth of burial being substantially uniform (i.e., 0.5-2 inches deep all around the circle).

Figure 7D:
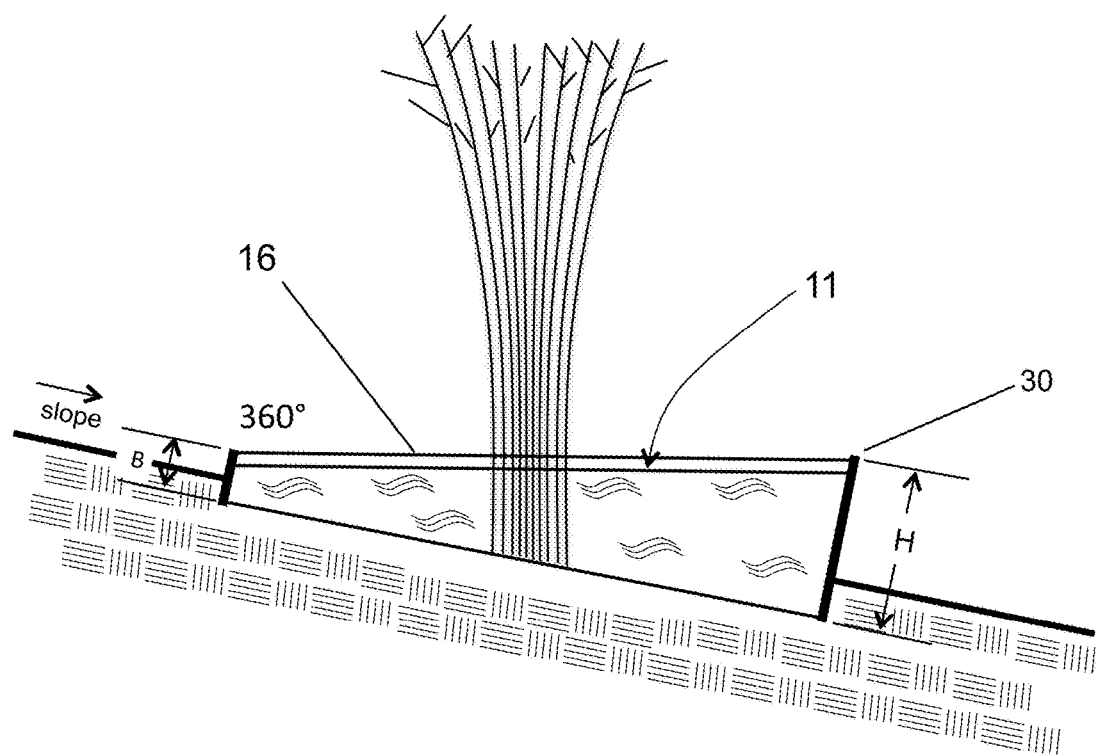
FIG. 7D shows an elevation cross-sectional view of an example of the present invention.

FIG. 7D shows an elevation cross-sectional view of an example of the present invention. Here, enclosure 30 is filled substantially full with water, and the top edge 16 of enclosure 30 is parallel to the horizontal water line 11.

Figure 7E:
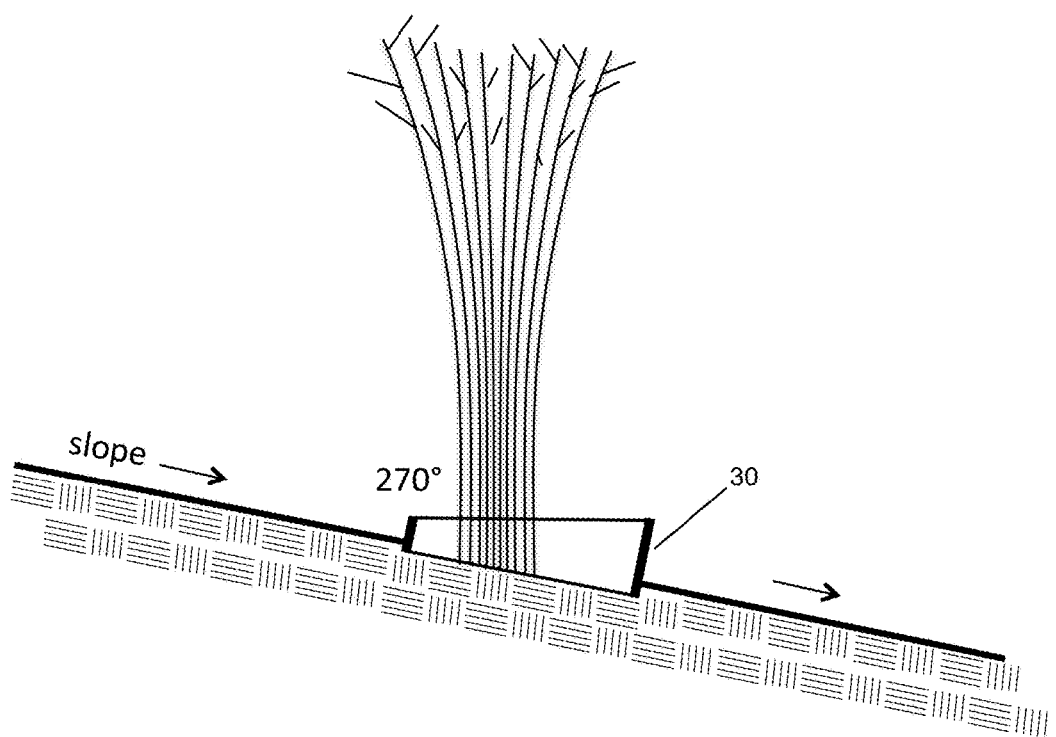
FIG. 7E shows an elevation cross-sectional view of an example of the present invention.

FIG. 7E shows an elevation cross-sectional view of an example of the present invention. Here, enclosure 30 is wrapped ¾ of the way around (i.e.,) 270°, in a semi-circular shape.

Figure 7F:
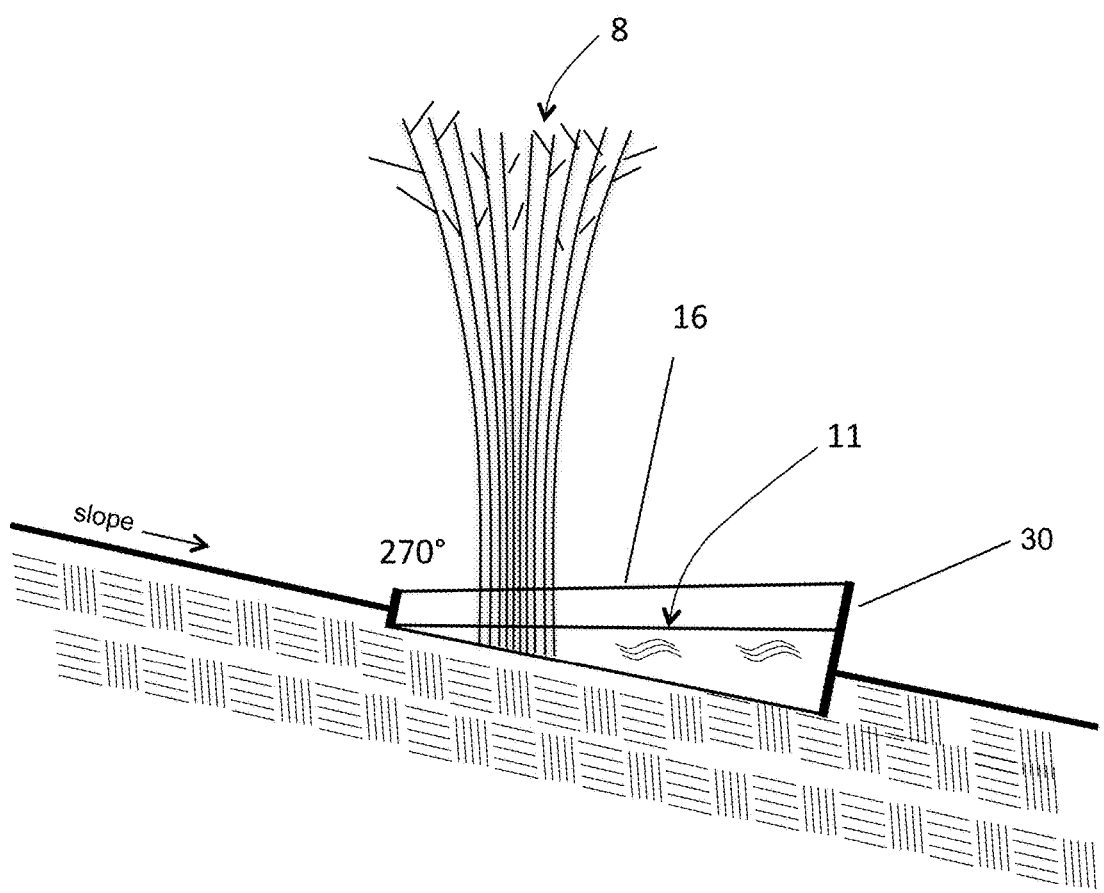
FIG. 7F shows an elevation cross-sectional view of an example of the present invention.

FIG. 7F shows an elevation cross-sectional view of an example of the present invention. Here, enclosure 30 is partially filled with water (approx. 50% full) and the top edge 16 of enclosure 30 is parallel to the horizontal water line 11.

Figure 8A:
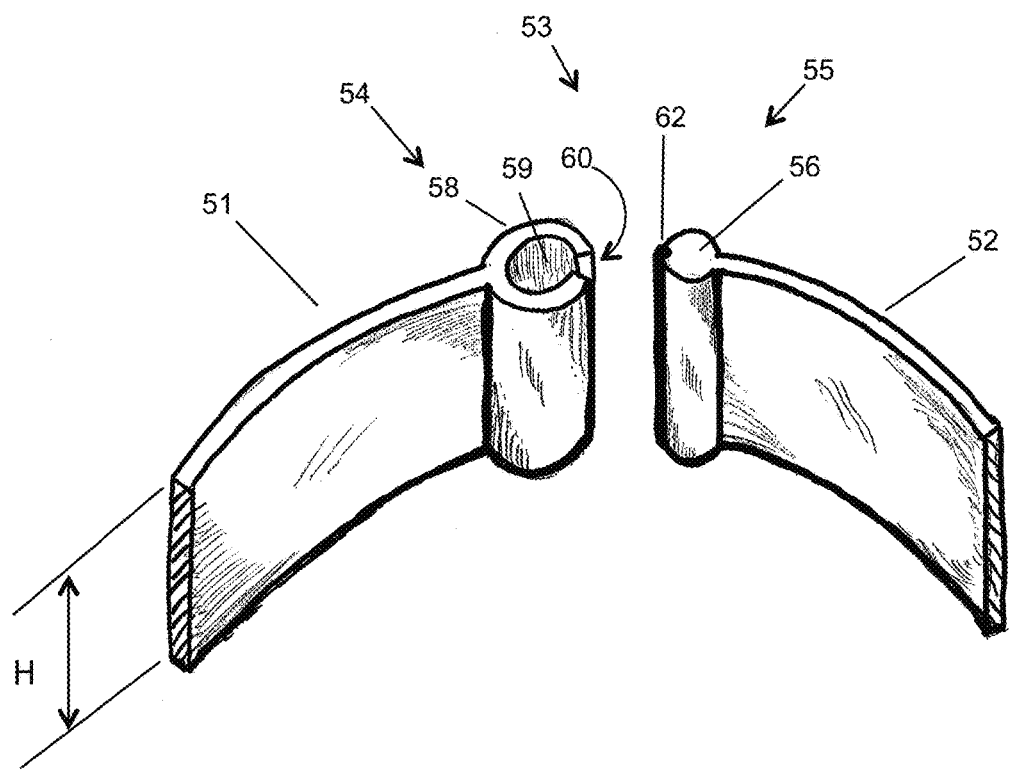
FIG. 8A shows an isometric view of an example of the present invention.
Figure 8B:
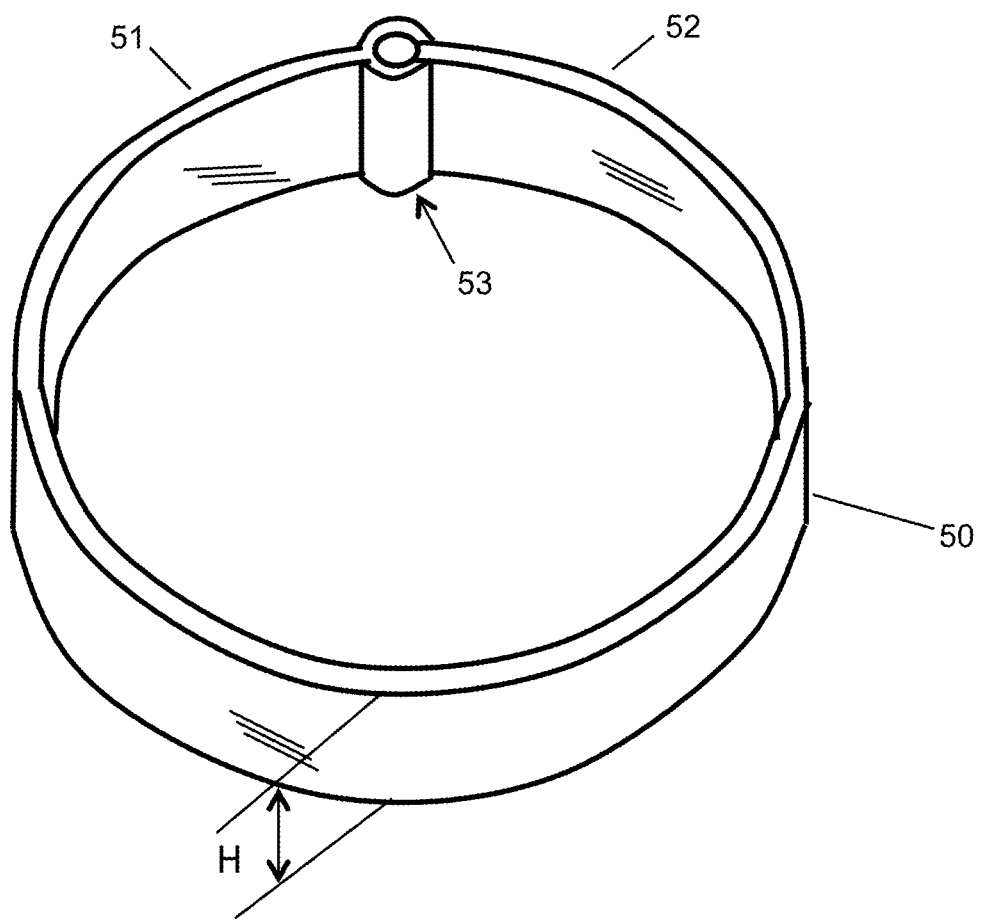
FIG. 8B shows an isometric view of an example of the present invention.

FIGS. 8A and 8B show isometric views of an example of the present invention. Here, the tree enclosure comprises a strip 50 (of constant height, H) that is joined into a full circle (360°) using interlocking, watertight joint 53. Watertight joint 53 comprises a male part 55 that is inserted into a female part 54. Male part 55 comprises a cylindrically-shaped male (connector) 56 disposed at the distal end 52 of strip 50, and further comprises an elastic, wiper-blade type sealing element 62 disposed along the entire length (height) of member 56. The male member 56 mates with (is received by) a cylindrically-shaped female member 58 disposed at the distal end 51 of strip 50. Female member 58 has an open internal volume 59 and an open slot 60 disposed vertically along the length of member 58.

Figure 9A:
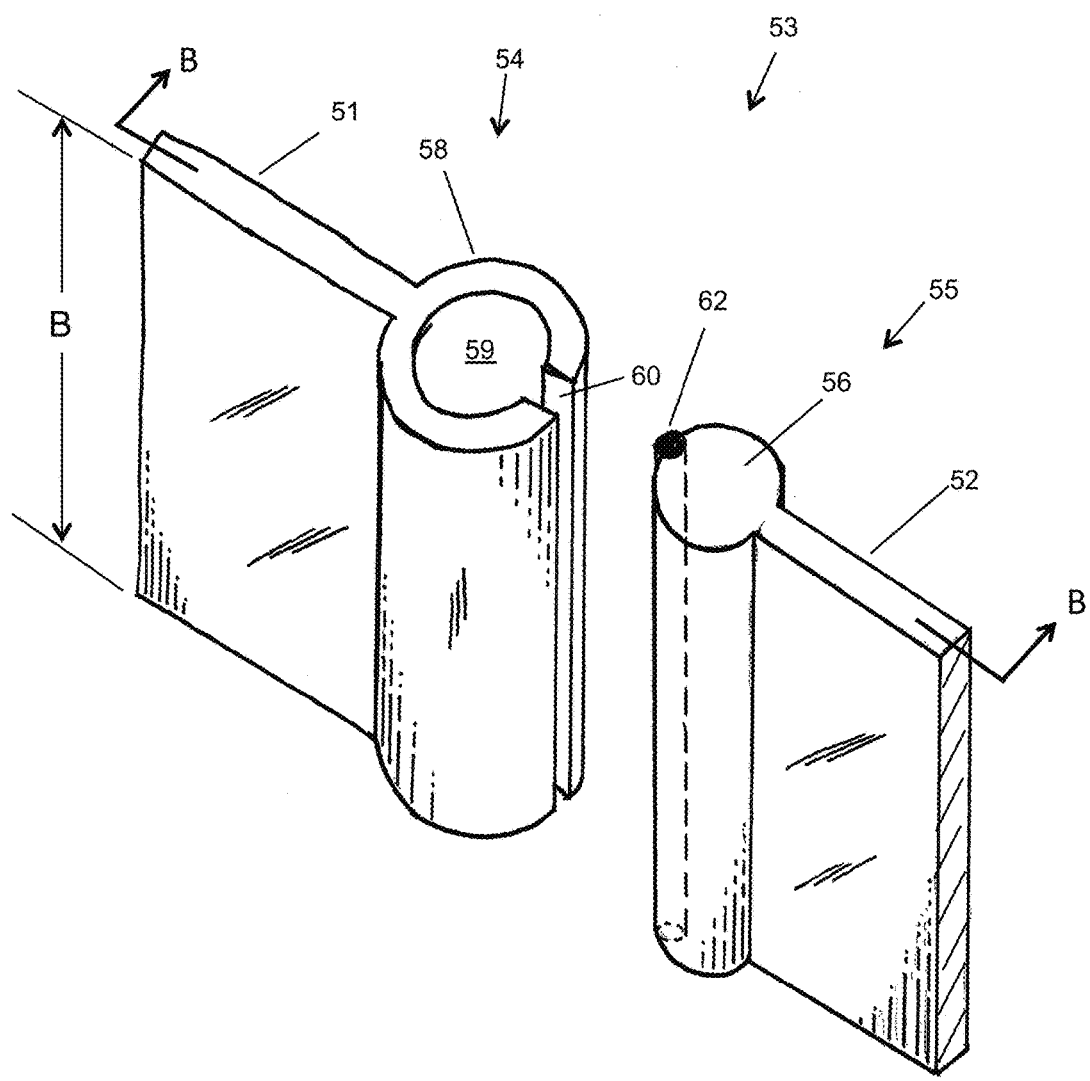
FIG. 9A shows an isometric view of an example of the present invention.

FIG. 9A show an isometric view of an example of the present invention. Male end 55 mates with (interlocks with) female end 54, and forms a water-tight joint by the sealing action of vertical seal 62. Seal 62 can comprise any elastomeric material, such as rubber, silicone, elastomeric polymer, and can comprise a porous material, such as foam or sponge-like material. Seal 62 can be glued to male end 56, or seal 62 can be mechanically held in place (to be discussed later).

Figure 9B:
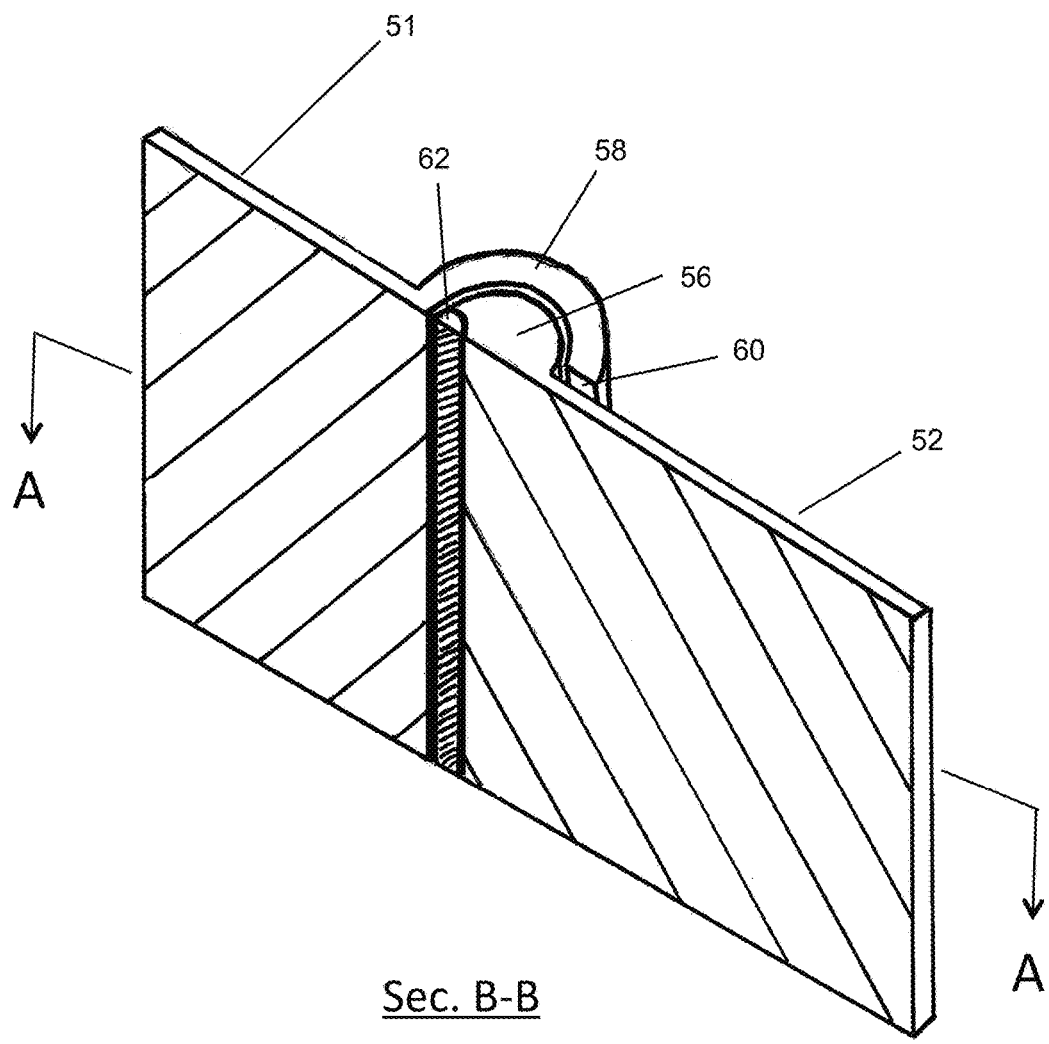
FIG. 9B shows an isometric view of an example of the present invention.

FIG. 9B show an isometric cross-section view of an example of the present invention, showing cross-section "B-B".

Figure 9C:
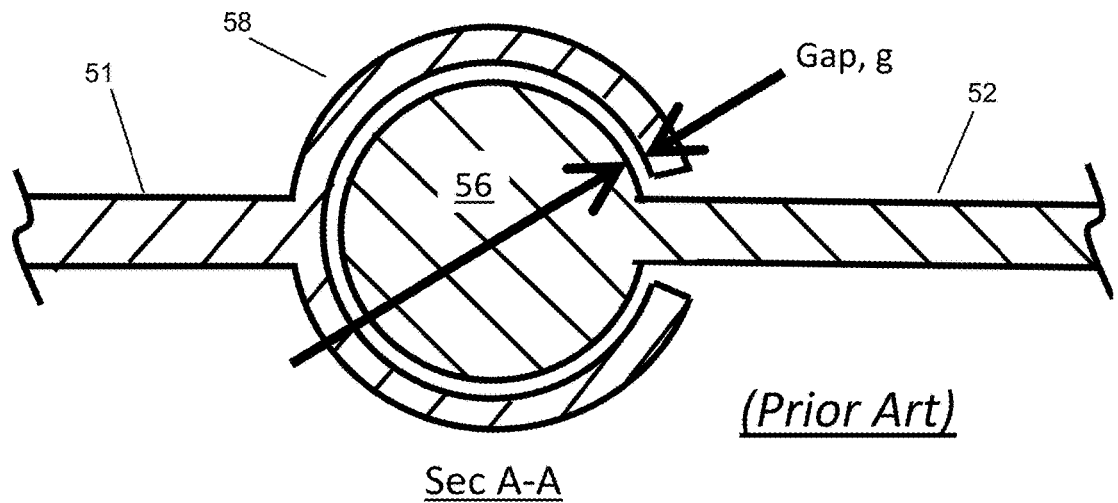
FIG. 9C shows a plan cross-section view of an example of a prior art joint.

FIG. 9C show a plan cross-section view of an example of a prior art joint, showing cross-section "A-A". In this view, the elastomeric seal 62 is deliberately not illustrated, so that the gap, g, between the outside wall of male member 56 and the inside wall of female member 58 can be illustrated. If the gap, g=0, then the male member 56 would fit tightly against the female member 58, and the joint would be watertight. However, in practice, it is very difficult to reliably (and cost-effectively) manufacture such a high-precision joint with such tight tolerances (+/−0.001 inches). The challenge is to prevent making a "negative" gap (i.e., where the outer diameter of the male member 56 is greater than the inner diameter of the outer member 58. This would create an interference, and the joint would not be able to be assembled easily without applying substantial force to the male member to "jam" it into the receiving member. So, in practice (without an elastic seal), there generally needs to be a positive gap (e.g., 0.005"-0.010") to allow for easy assembly without interference. However, such a positive gap makes the joint leak, which means that the tree enclosure would not hold water for very long when filled up. Therefore, the use of an elastic seal solves the problem of the positive gap.

Figure 9D:
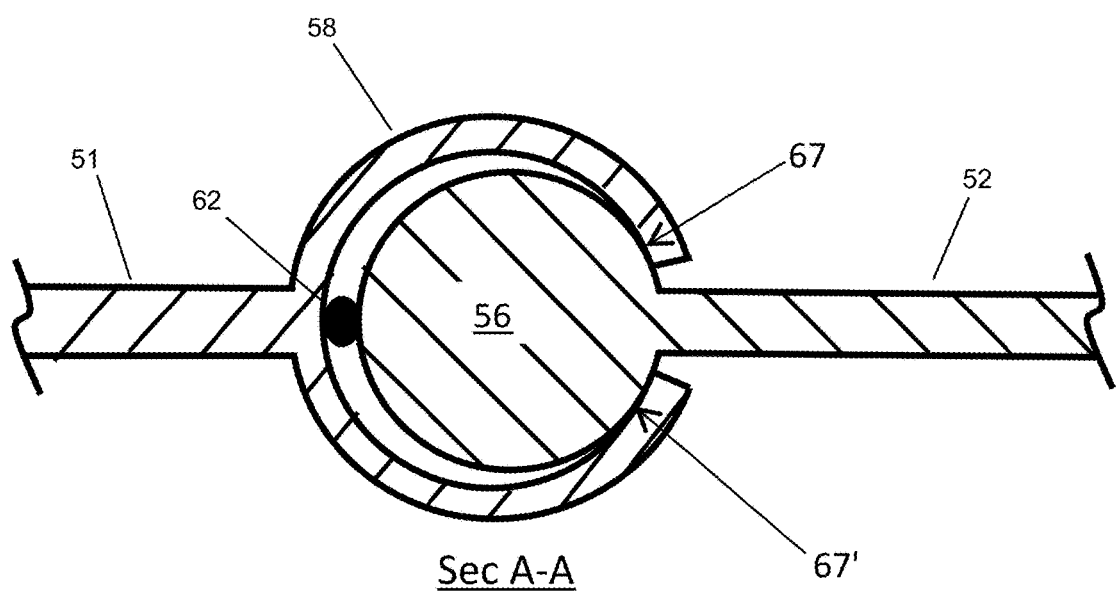
FIG. 9D shows a plan cross-section view of an example of a prior art joint.

FIG. 9D show a plan cross-section view of an example of the present invention, showing cross-section "A-A". In this example, elastic seal 62 is disposed in-between male member 56 and female member 58. The diameter of seal 62 is at least equal to or greater than twice the gap, g (see FIG. 9C). This Figure shows that the inner male member 56 touches the inside wall of female member 58 at two points, 67 and 67', on the side opposite from that of seal 62.

Figure 10A:
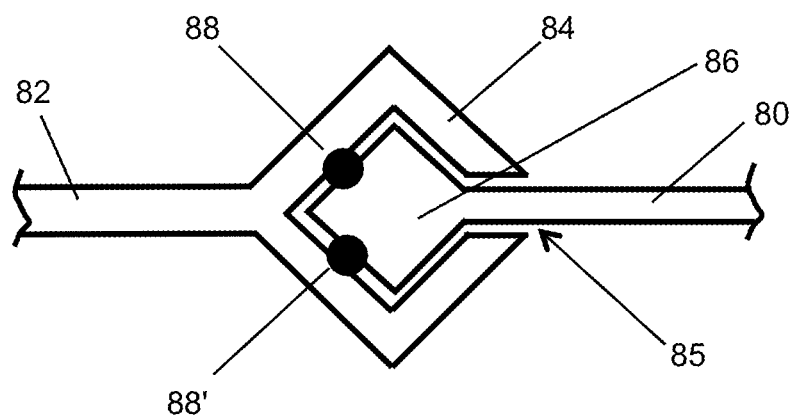
FIG. 10A shows a plan cross-section view of an example of the present invention.

FIG. 10A shows a plan cross-section view of an example of the present invention. In this design, both male and female members 86 and 84, respectively, comprises a "diamond" shaped cross-section. In this case, there are two elastic seals, 88 and 88', running vertically along the length of the male member 86.

Figure 10B:
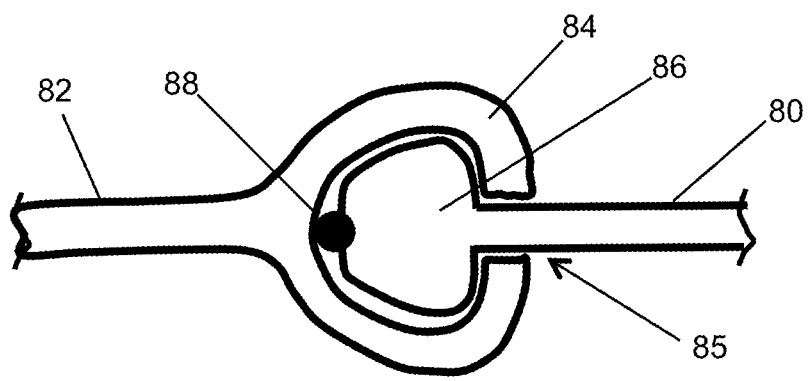
FIG. 10B shows a plan cross-section view of an example of the present invention.

FIG. 10B shows a plan cross-section view of an example of the present invention. In this design, male member 86 comprises a triangularly-shaped cross-section with a flat end on the side where seal 88 rests. Female member 84 is circularly-shaped.

Figure 10C:
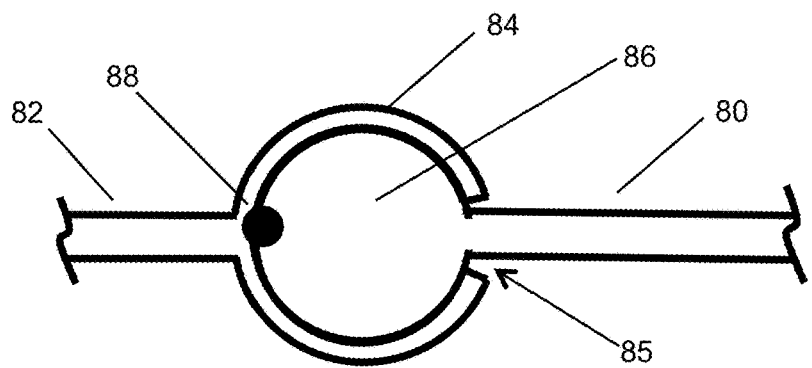
FIG. 10C shows a plan cross-section view of an example of the present invention.

FIG. 10C shows a plan cross-section view of an example of the present invention. In this design, both male and female members 86 and 84, respectively, comprises a circular shaped cross-section.

Figure 10D:
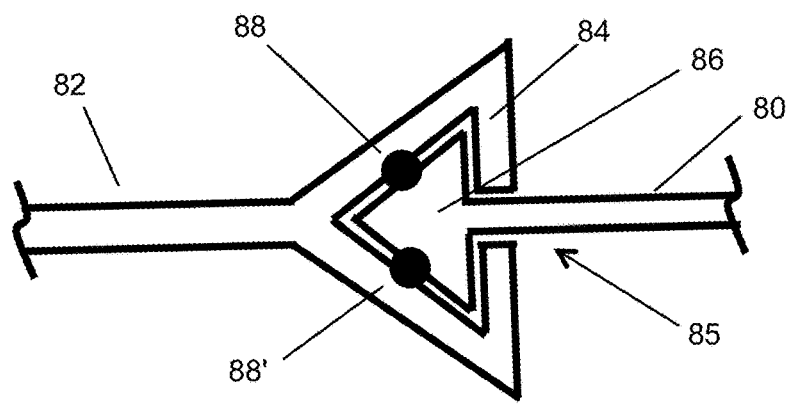
FIG. 10D shows a plan cross-section view of an example of the present invention.

FIG. 10D shows a plan cross-section view of an example of the present invention. In this design, both male and female members 86 and 84, respectively, comprises a triangular shaped cross-section. In this case, there are two elastic seals, 88 and 88', running vertically along the length of the male member 86

Figure 10E:
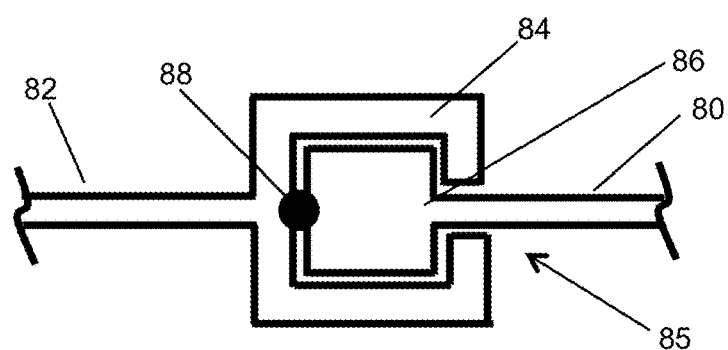
FIG. 10E shows a plan cross-section view of an example of the present invention.

FIG. 10E shows a plan cross-section view of an example of the present invention. In this design, both male and female members 86 and 84, respectively, comprises a square shaped cross-section.

Figure 11A:
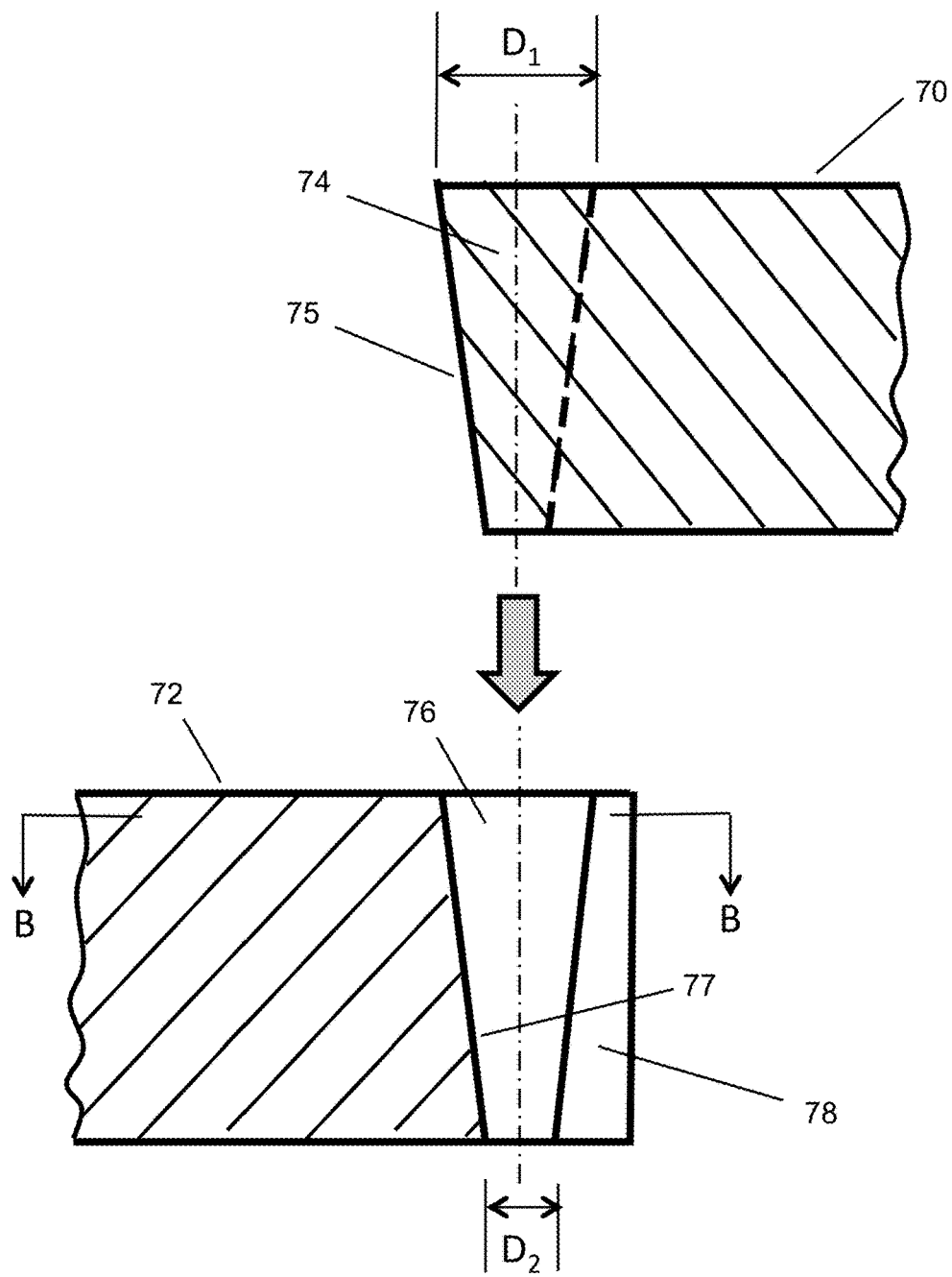
FIG. 11A shows an elevation cross-section view of an example of the present invention.

FIG. 11A shows an elevation cross-section view of an example of the present invention (Section A-A). In this design, both male and female members, 74 and 76, of the joint have a conical shape. Both have the same cone angle, β, which can range from 0-15 degrees, with a preferred angle ranging from 3-6 degrees. Because the outer diameter ($D_2$) of the lower end of male member 74 is smaller than the inner diameter ($D_1$) of the upper end of the female member 76, the two parts can be easily assembled and fit tightly without requiring the use of an elastic seal to make up the difference in "gap" between the two mating parts. At such a low angle for the cone angle, the friction force between the two members dominates after insertion and the two parts stick together well. The force to insert the male member is limited by the fact that the outer female member 76 is slotted with slot 78 (i.e., it's not a complete circle), which allows the two halves of the female member 76, 76' to be somewhat flexible and forgiving.

Figure 11B:
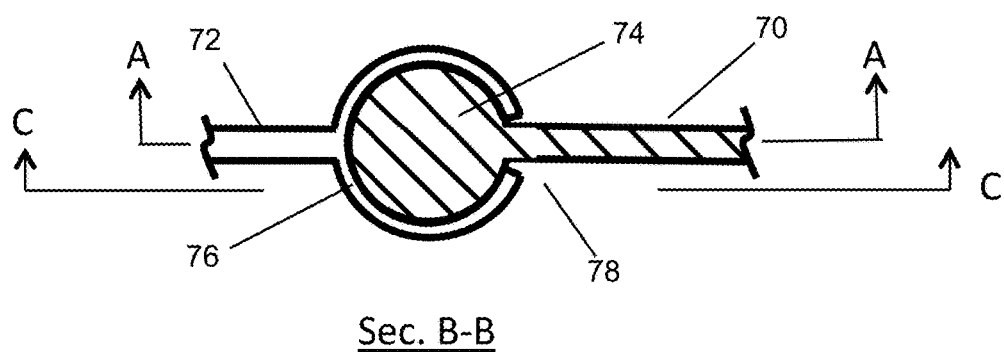
FIG. 11B shows a plan cross-section view of an example of the present invention.

FIG. 11B shows a plan cross-section view of an example of the present invention (Section B-B). This view shows that a watertight joint can be achieved with the dual-conical design configuration.

Figure 11C:
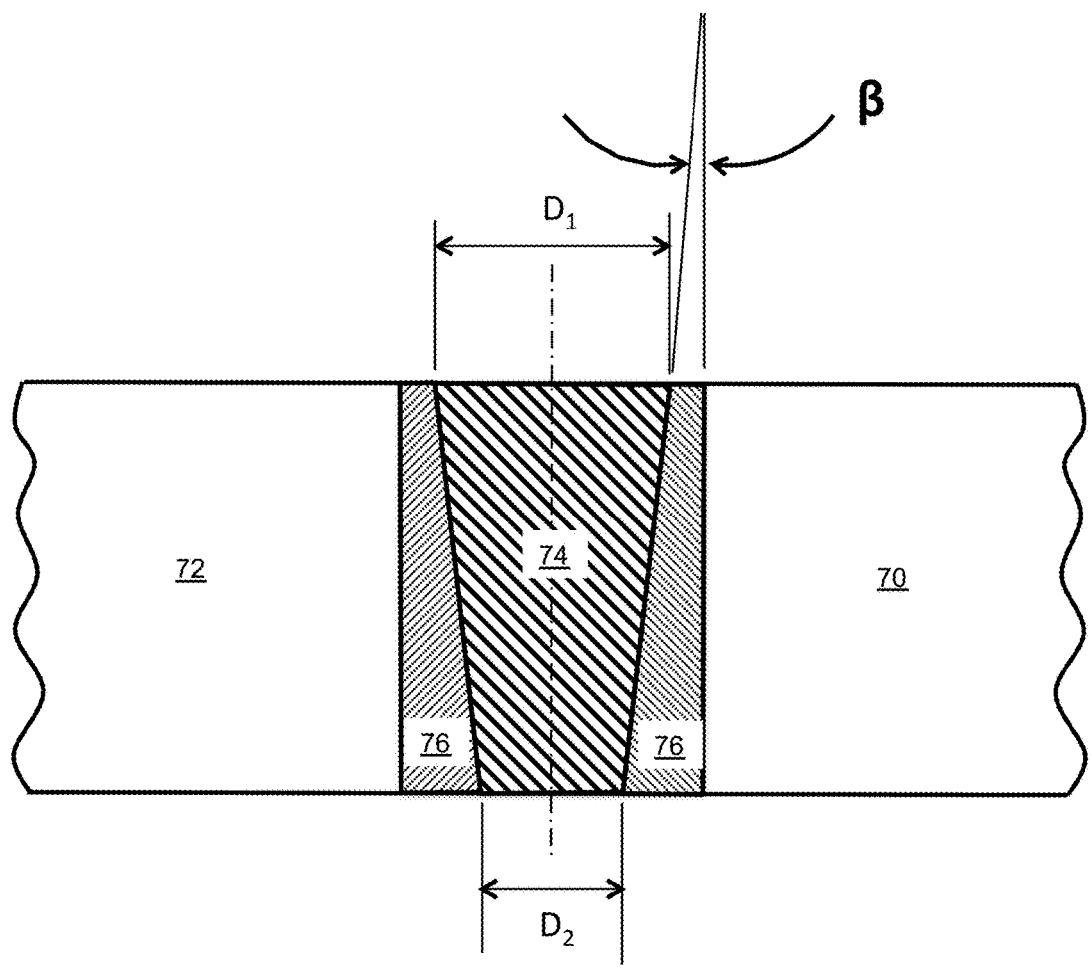
FIG. 11C shows an elevation cross-section view of an example of the present invention.

FIG. 11C shows an elevation cross-section view of an example of the present invention (Section C-C). This view shows that a watertight joint can be achieved with the dual-conical design configuration along the entire length of the joint. Note: the 'dual-conical' design does not require the use of a separate wiper-blade type sealing element to make the joint watertight. However, a separate wiper-blade type of sealing element can be added to such a dual-conical design, if necessary, to achieve water tightness.

Figure 12:
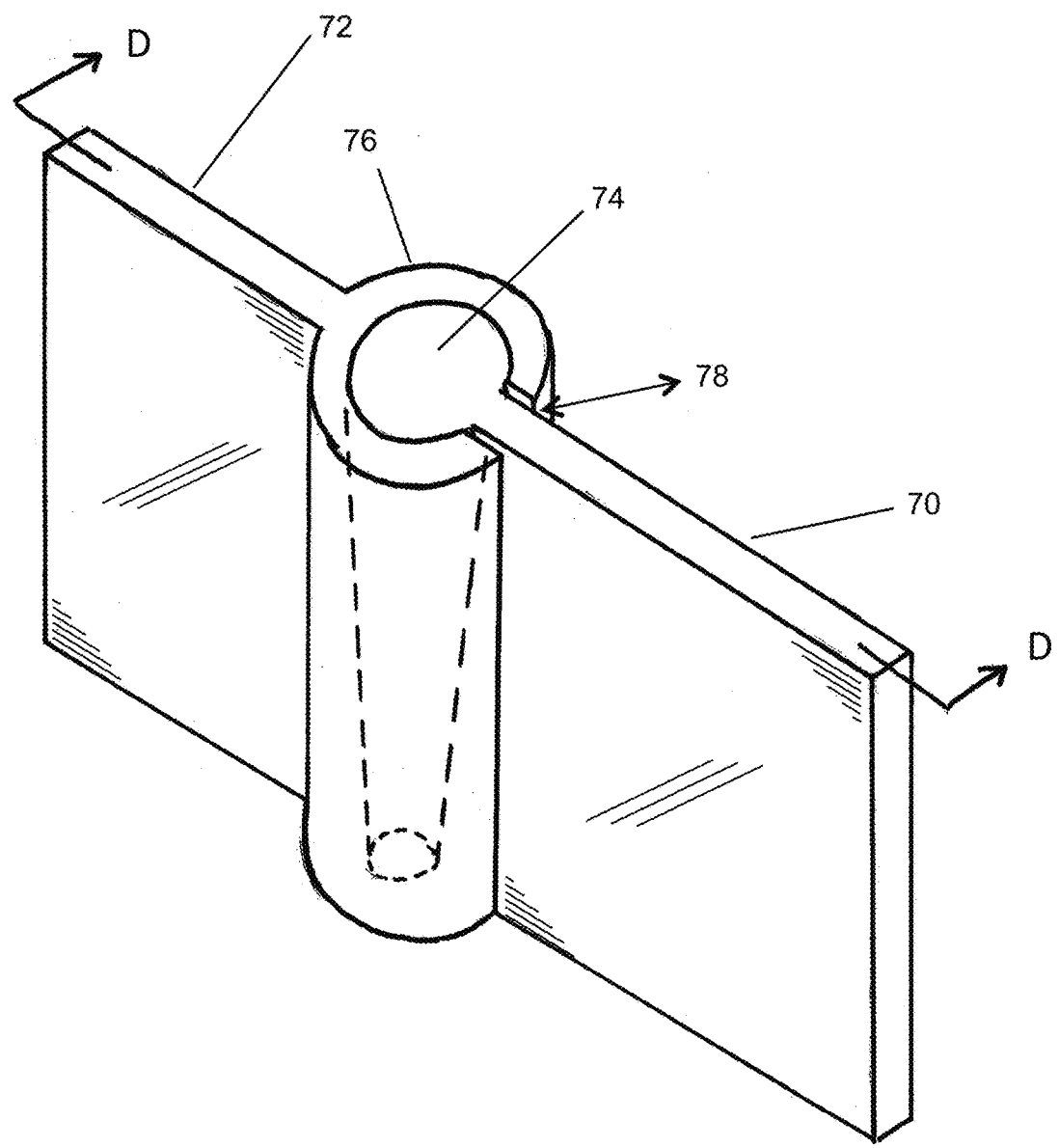
FIG. 12 shows an isometric view of an example of the present invention.

FIG. 12 shows an isometric view of an example of the present invention, illustrating the dual-conical, seal-less, interlocking joint design of FIGS. 11A-C.

Figure 13:
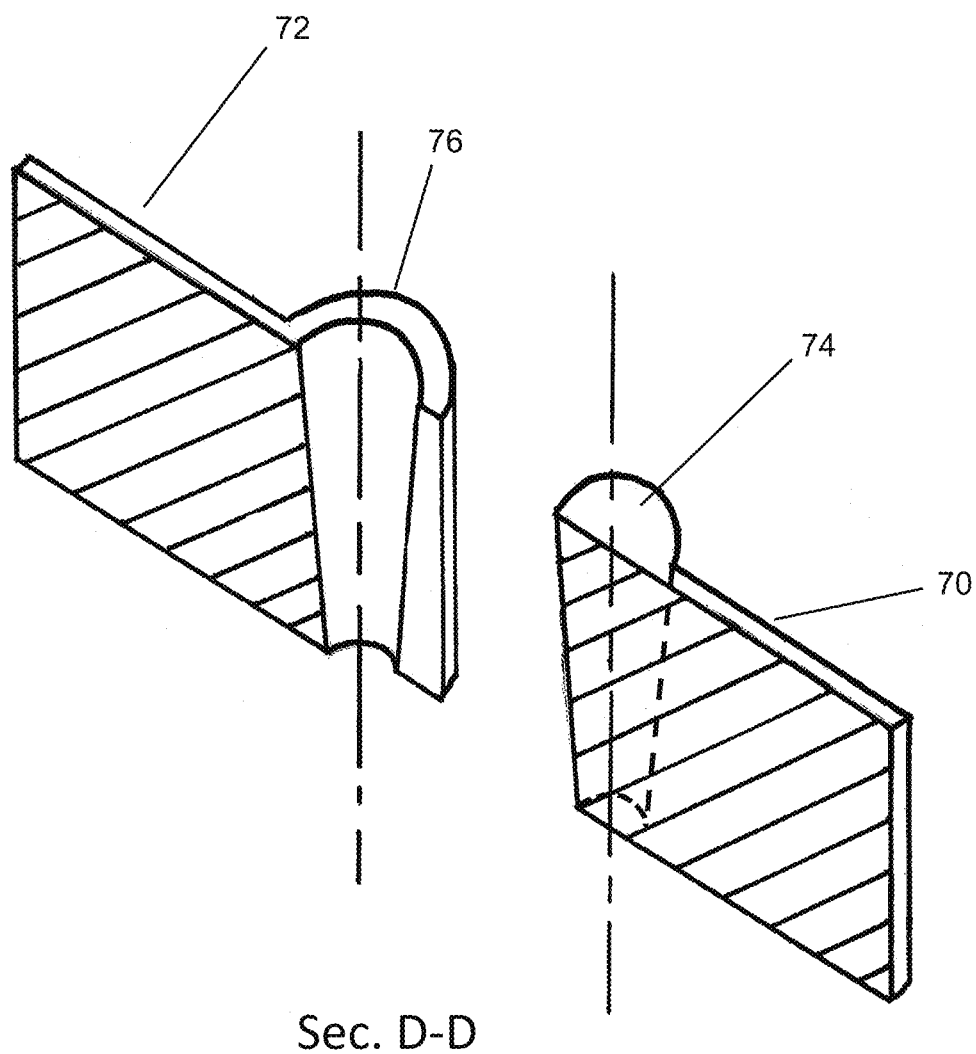
FIG. 13 shows an isometric cross-section view of an example of the present invention.

FIG. 13 shows an isometric cross-section view (Section D-D) of an example of the present invention, illustrating the dual-conical, seal-less, interlocking joint design of FIGS. 11A-C. Both male and female members are simple, one-piece parts.

Figure 14A:
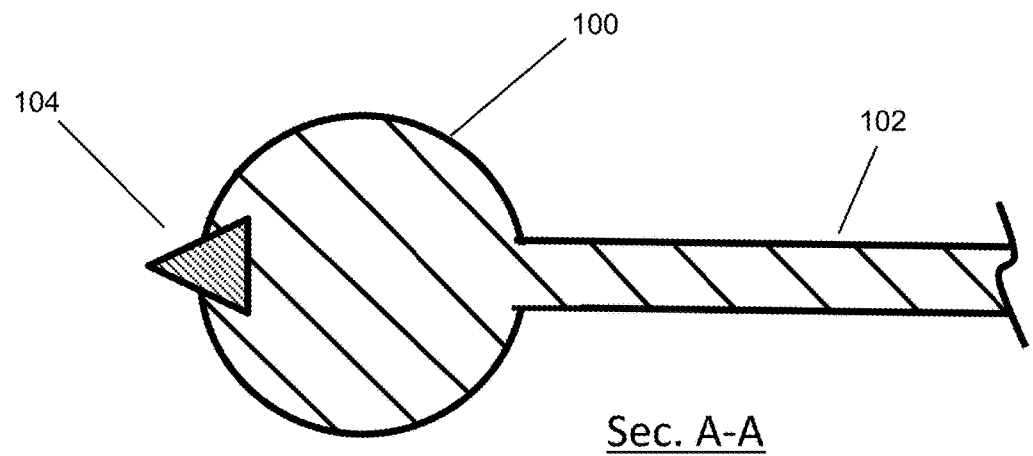
FIG. 14A shows a plan cross-section view of an example of the present invention.

FIG. 14A shows a plan cross-section view of an example of the present invention. This figure focuses on the seal design for the male interlocking member 100. Here, seal 104 comprises a triangular cross-section shape, and the base of the triangle is embedded in the sidewall of cylindrical male member 100 (which itself could have a different shape, e.g., a triangular, square, diamond, or oval shape). In this case, the embedded/recessed location of the sealing element 104 allows it to be captured mechanically, without needing to use glue to hold the seal in place. Seal assembly is achieved by sliding the wiper blade seal 104 along the length of the male member 100.

Figure 14B:
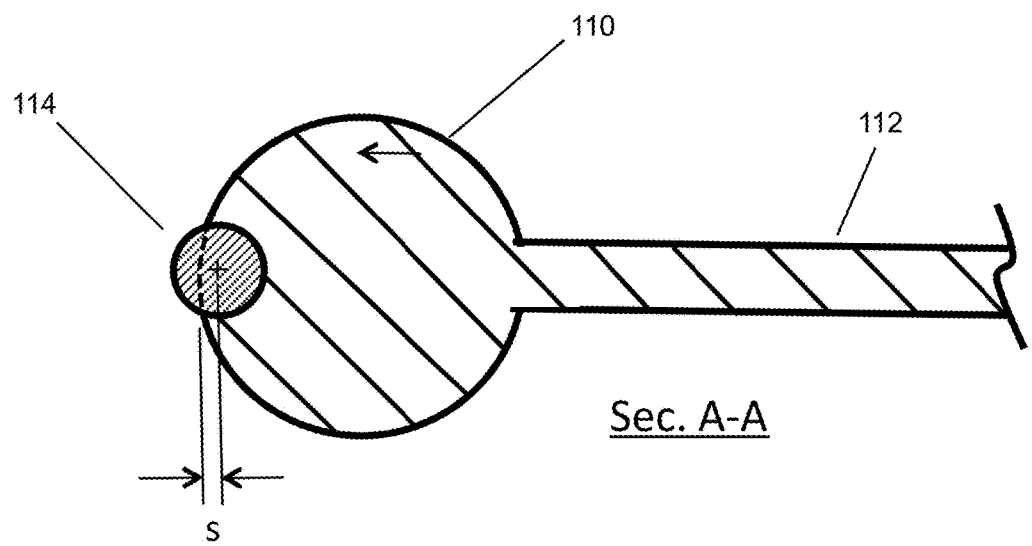
FIG. 14B shows a plan cross-section view of an example of the present invention.

FIG. 14B shows a plan cross-section view of an example of the present invention. In this design, seal 114 is circular (cylindrical) in cross-section and is embedded within (captured by) the male member 110 (i.e., a glue-less design). This can be seen by noticing that the central axis of cylindrical seal 114 rests behind the outer circumference of cylinder 110 by a separation distance=s. This distance, s, can range from 0.001 to 0.005 inches, depending on the diameter of seal 114.

Figure 14C:
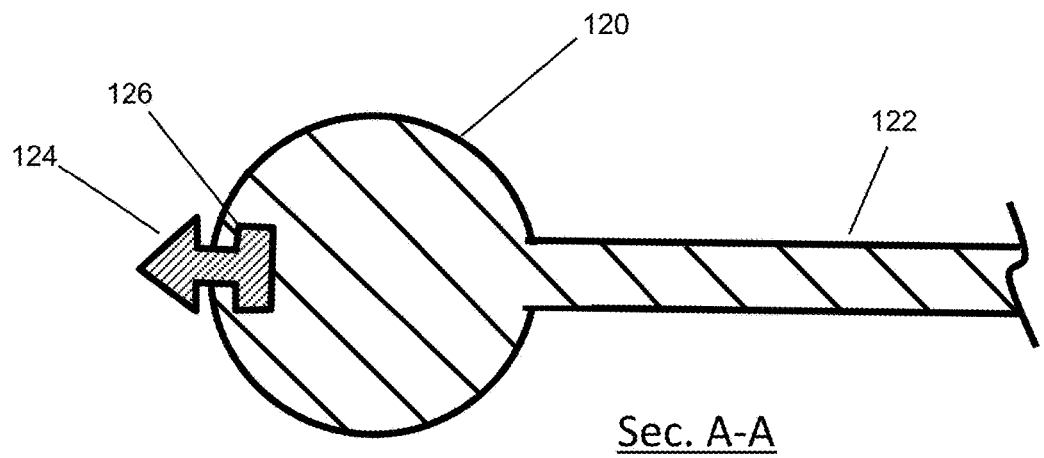
FIG. 14C shows a plan cross-section view of an example of the present invention.

FIG. 14C shows a plan cross-section view of an example of the present invention. In this design, seal 124 is a combination of a rectangular base and a triangular top in cross-section and is embedded within (captured by) the male member 120 (i.e., a glue-less design). Seal 124 has the common shape of an automobile wiper blade geometry.

Figure 14D:
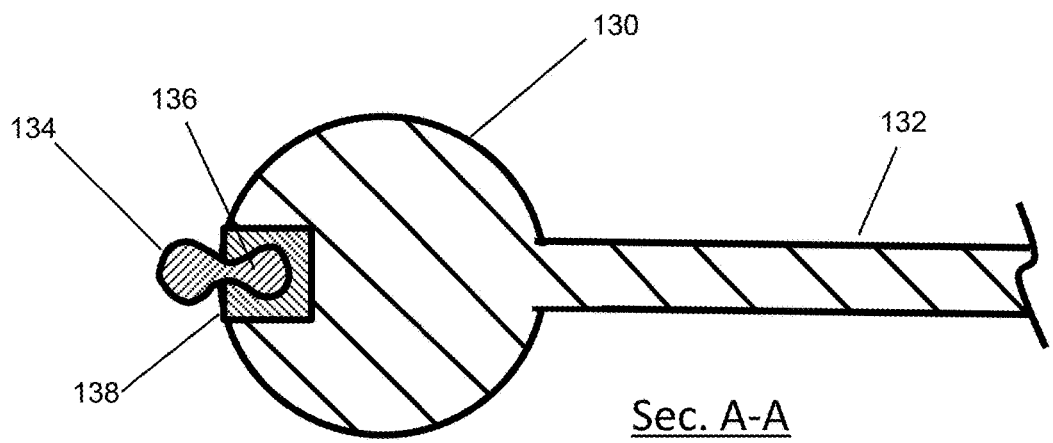
FIG. 14D shows a plan cross-section view of an example of the present invention.

FIG. 14D shows a plan cross-section view of an example of the present invention. In this design, seal 134/136 is double-lobed (i.e., "figure-8" geometry) in cross-section and is embedded within (captured by) a square bar 138, which itself is glued into a square recess cut into the male member 130. While requiring an extra part (square retaining bar 138), this design allows for a more simple groove to be cut or molded into the male member 130 (as compared to the more complex geometry of FIG. 14C).

Note that in FIGS. 14A-D the sealing element is disposed within (attached to/captured within) the male member of the male/female joint. However, alternatively, the sealing element can be disposed within the female member of the male/female joint.

Figure 15:
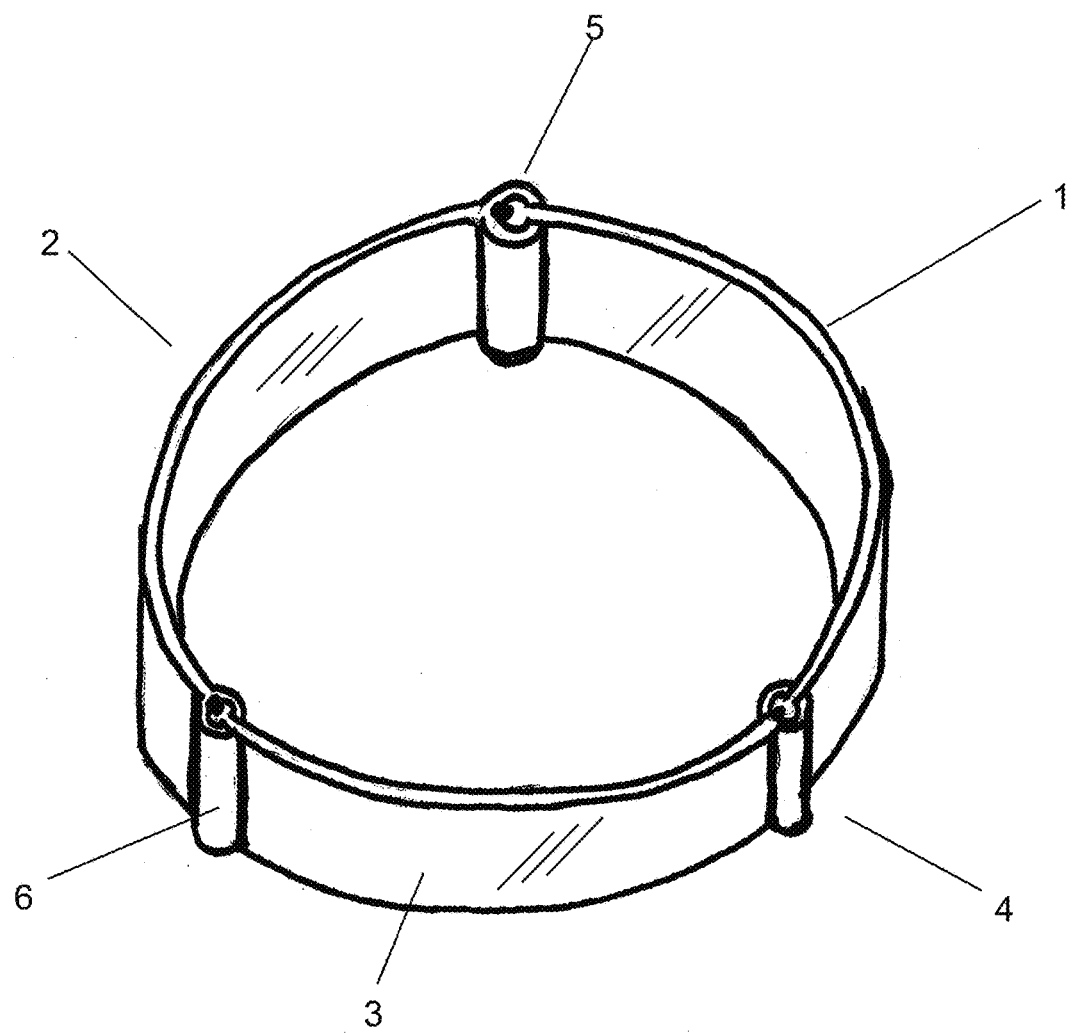
FIG. 15 shows an isometric view of an example of the present invention.

FIG. 15 shows an isometric view of an example of the present invention. Here, a combination of three, shorter segments of the tree surround, 1, 2, 3 have been joined together using interlocking, watertight joints 4, 5, 6, respectively. In principle, any number of surround segments can be combined to make a circle having a large diameter. Note: this is more suitable for segments having a constant height (non-tapered).

Figure 16A:
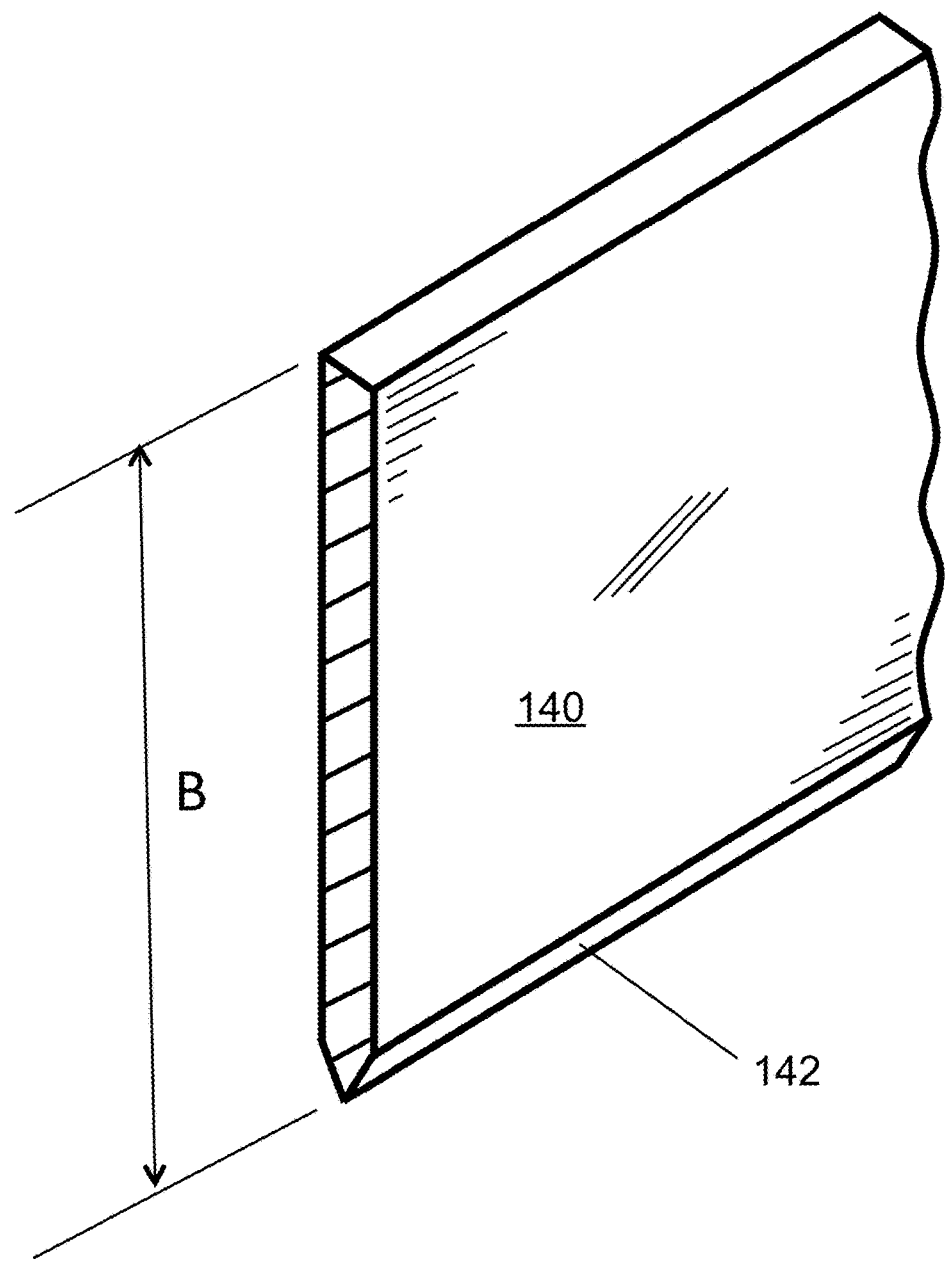
FIG. 16A shows an isometric view of an example of the present invention.
Figure 16B:
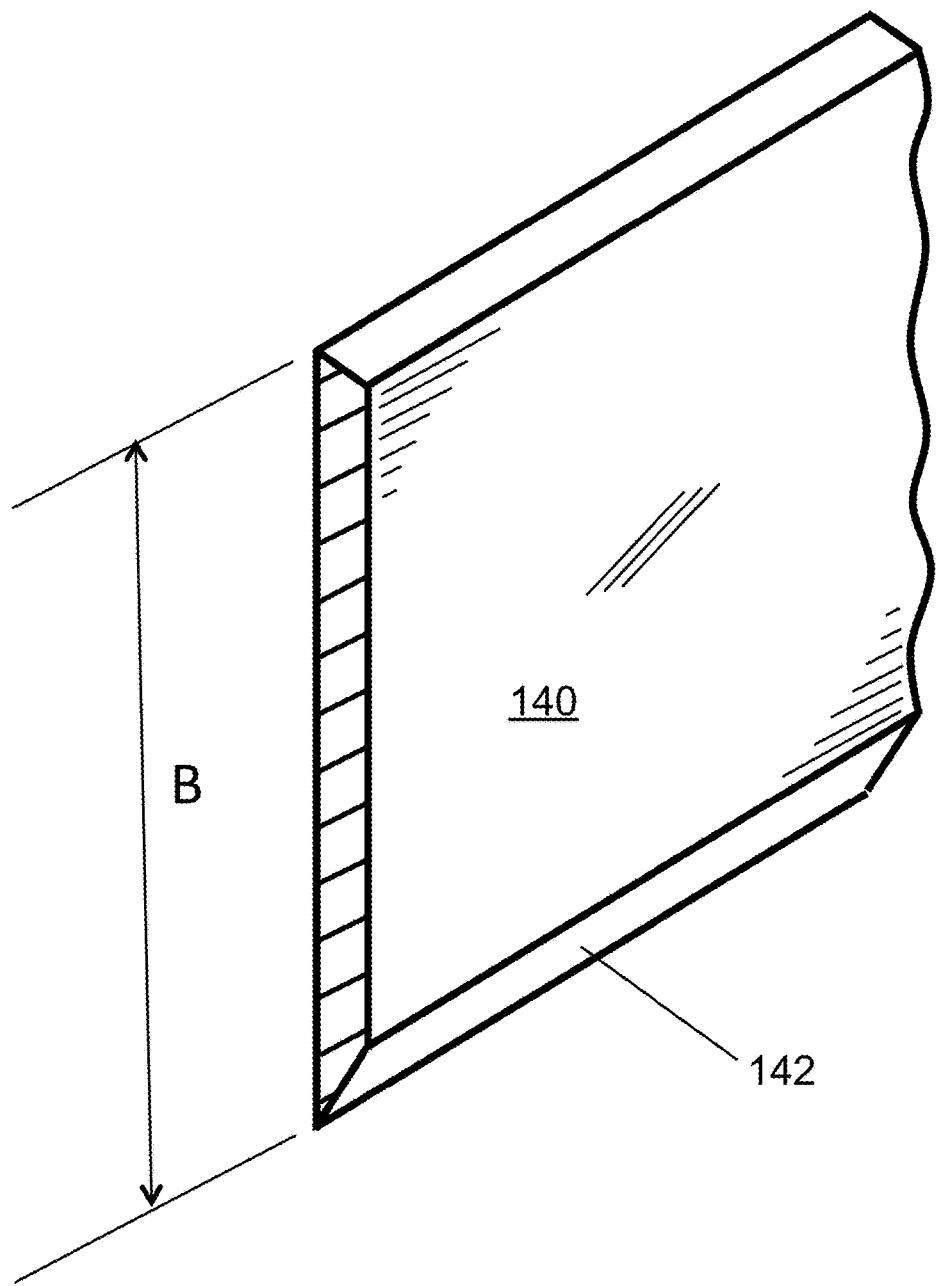
FIG. 16B shows an isometric view of an example of the present invention.

FIG. 16A shows an isometric view of an example of the present invention. Here, the bottom end 142 of tree surround 140 has been fabricated to have a sharp, double-beveled, chevron-angled sharp point, which allows the tree surround 140 to be more easily pushed down into and penetrate the ground than a blunt bottom edge. The bevel angle can range from 30 to 45 degrees. The tree surround 140 can be buried (embedded) into the soil at least ¼ to ½ inch in order to form a watertight seal with the ground by sawing the strip 12 back and forth while pushing down on it. Alternatively, the beveled point 142 can be a single-sided bevel, as shown in FIG. 16B (as opposed to the double-sided bevel 142 shown in FIG.16A).

Figure 17A:
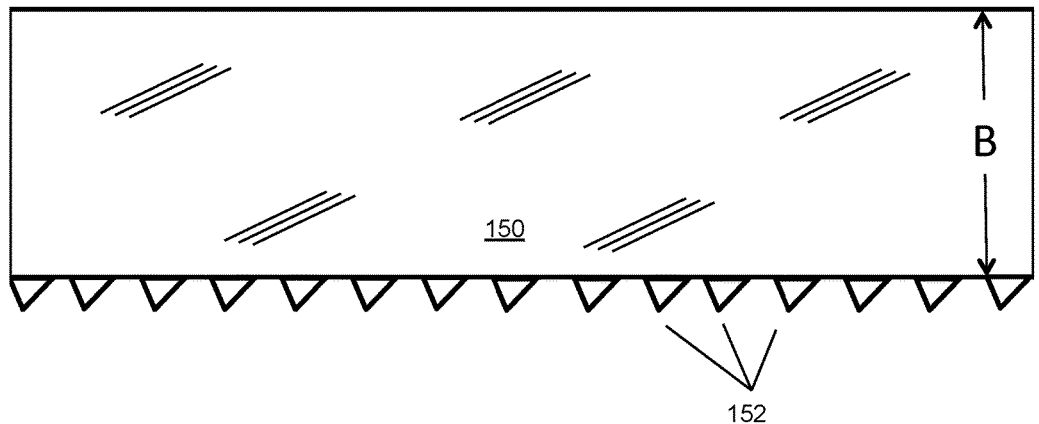
FIG. 17A shows an elevation view of an example of the present invention.

FIG. 17A shows an elevation view of an example of the present invention. Here, the bottom edge 152 of tree surround 150 comprises a plurality of triangular saw teeth molded integrally with the plastic of surround 150. These teeth 152 allow the surround strip 150 to be more easily embedded into the ground by "sawing" (i.e., pushing/pulling) the strip back and forth while pushing down, cutting into the soil. Sawteeth 152 optionally can have a single or double-angled beveled sharp point in cross-section.

Figure 17B:
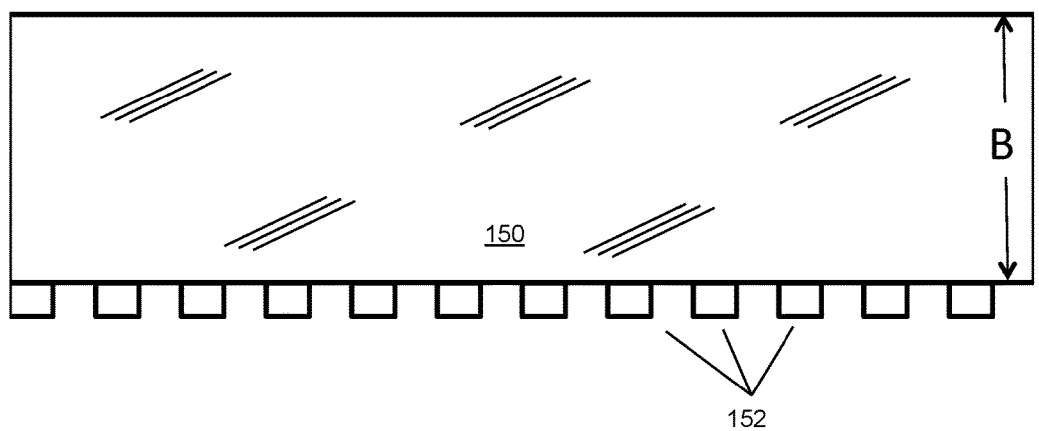
FIG. 17B shows an elevation cross-section view of an example of the present invention.

FIG. 17B shows an elevation cross-section view (Section A-A) of an example of the present invention. Here, the sawteeth are cut as square teeth, which optionally can have a single or double-angled beveled sharp point in cross-section.

Figure 18A:
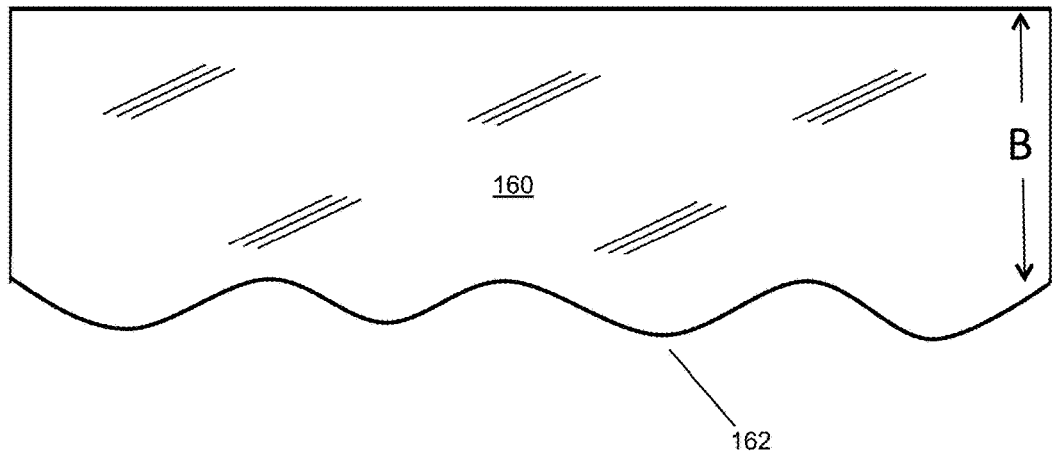
FIG. 18A shows an elevation view of an example of the present invention.

FIG. 18A shows an elevation view of an example of the present invention. The bottom edge 162 of tree surround 160 comprises a wavy, sinusoidal curve. The high (low) points 162 of the wavy curve increases the cutting action when sawing the tree surround segment 160 back and forth into the ground. Alternatively, the bottom edge 164 can additionally be fabricated with a chevron/beveled pointed shape (see, for example, FIGS. 16A and 16B). Alternatively, the tree surround 160 can be installed upside down, with the wavy, sinusoidal curve resting on top of the tree surround 160 (for aesthetic reasons). Alternatively, both the top and bottom edges of surround 160 can have a wavy, sinusoidal curve (not illustrated).

Figure 18B:
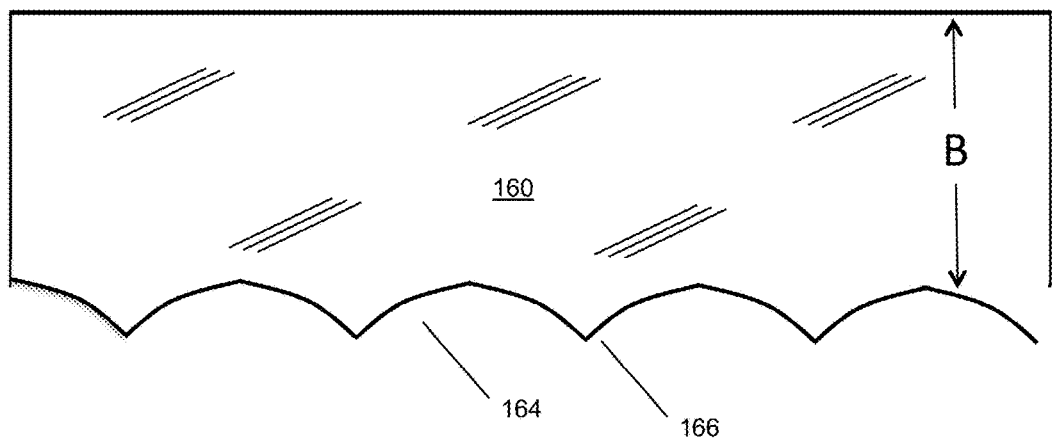
FIG. 18B shows an elevation view of an example of the present invention.

FIG. 18B shows an elevation view of an example of the present invention. The bottom edge 162 of tree surround 160 comprises a scalloped curve. The sharp high (low) points 166 of the scalloped curve increases the cutting action when sawing the tree surround segment 160 back and forth into the ground. Alternatively, the bottom edge 164 can additionally be fabricated with a chevron/beveled pointed shape (see, for example, FIGS. 16A and 16B).

Figure 19:
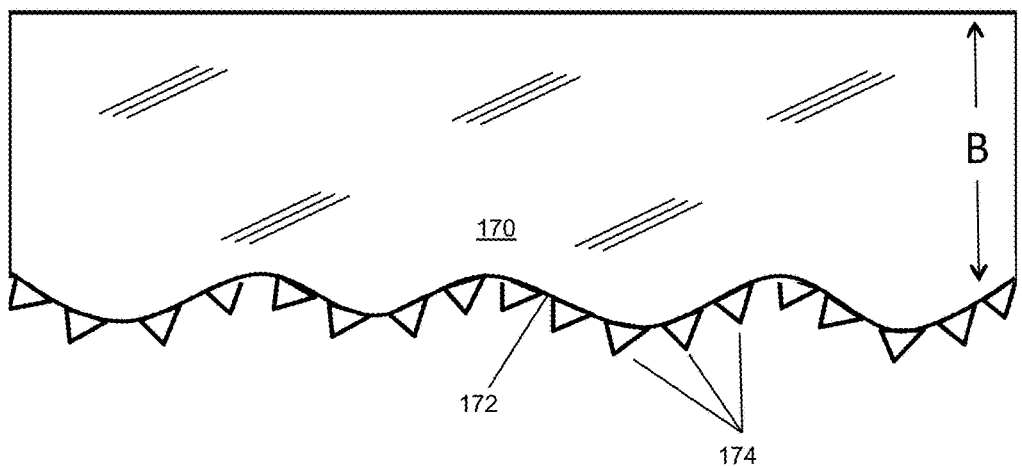
FIG. 19 shows an elevation view of an example of the present invention.

FIG. 19 shows an elevation view of an example of the present invention. The bottom edge 172 of tree surround 170 comprises a sinusoidal, wavy curve that additionally has saw tooth teeth 174 on the bottom edge. The combination increases the cutting action when sawing the tree surround segment 170 back and forth into the ground.

Figure 20:
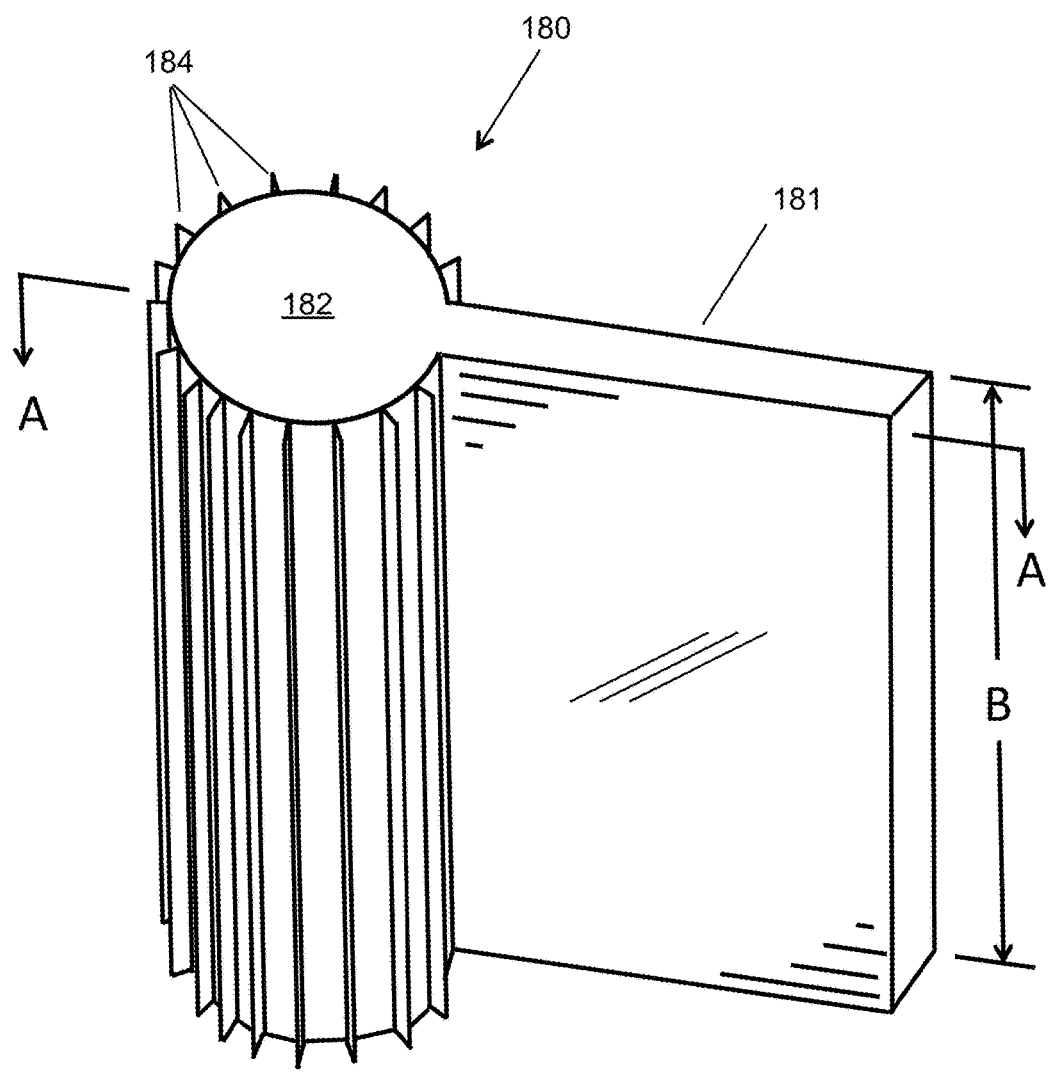
FIG. 20 shows an isometric view of an example of the present invention.

FIG. 20 shows an elevation view of an example of the present invention. Male interlocking member 180 comprises a vertically-oriented cylindrical male element 182 attached to the distal end of surround wall 181, with a plurality of vertically-oriented, thin radial fins attached along the length of cylinder 182. Each radial fin 184 has a thickness of a few thousands of an inch (i.e., thickness ranging from 0.001 to 0.010 inches, with a preferred thickness of about 0.003 to 0.005 inches). In FIG. 20, radial fins 184 are made integral with the cylindrical male element 182 (e.g., by injection molding or extrusion molding).

Figure 21:
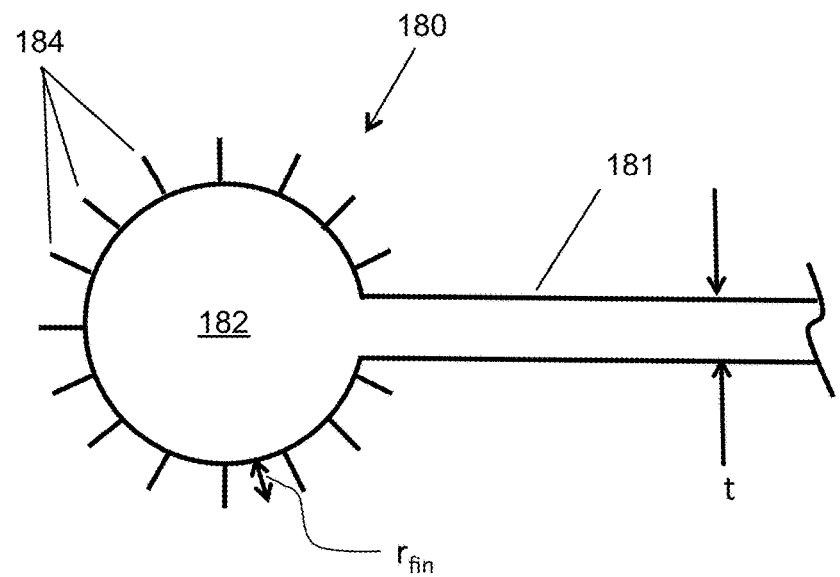
FIG. 21 shows a plan view of the finned joint of FIG. 20 of the present invention.

FIG. 21 shows a plan view of the finned male joint of FIG. 20 of the present invention. Radial fins 184, in the uninstalled state, protrude out from the wall of cylindrical male member 182 by a radial distance, $r_{fin}$, which can range from 0.05-0.20 inches, with a preferred dimension of about 0.010 inch. Alternatively, $r_{fin}$, can equal ½ of the wall thickness, t, of surround strip 181.

Figure 22:
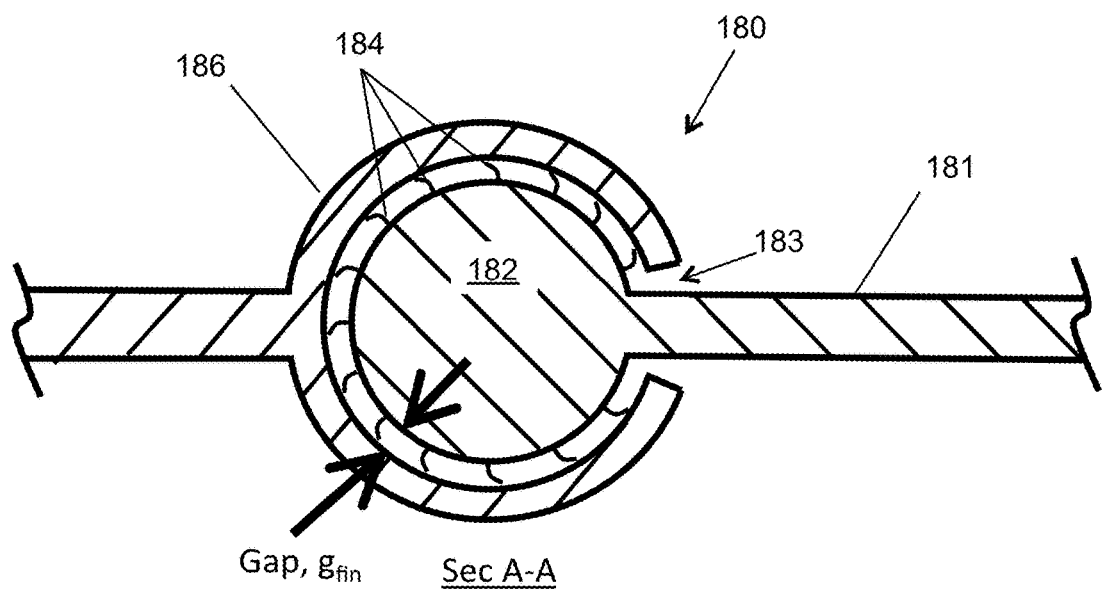
FIG. 22 shows a plan cross-section view of an assembled joint example of the present invention.

FIG. 22 shows a plan cross-section (Section A-A) view of the assembled finned male joint 180 of FIG. 20 of the present invention. Finned male element 182 is received by (inserted into) female connector element 186, which has the shape of an open "C", with an open slot 183 for receiving the wall of tree surround strip 181. Radial fins 184 are deformed (bent) when the joint is assembled, and the deformed fins form the watertight sealing elements. Note: the number of fins 184 can range from 1 to 20, with the optimum number depending on the fin's wall thickness, radial width, and overall stiffness of the assembled male/female interlocking joint. The assembled gap, $g_{fin}$, between the outer wall of male member 182 and the inner wall of female connector 186, when the joint 180 is assembled, can range from 0.003 to 0.15 inches, with a preferred gap thickness, $g_{fin}$, of about 0.005-0.010 inches. Alternatively, $g_{fin}$, can equal ¼ of the wall thickness, t, of surround strip 181.

Figure 23A:
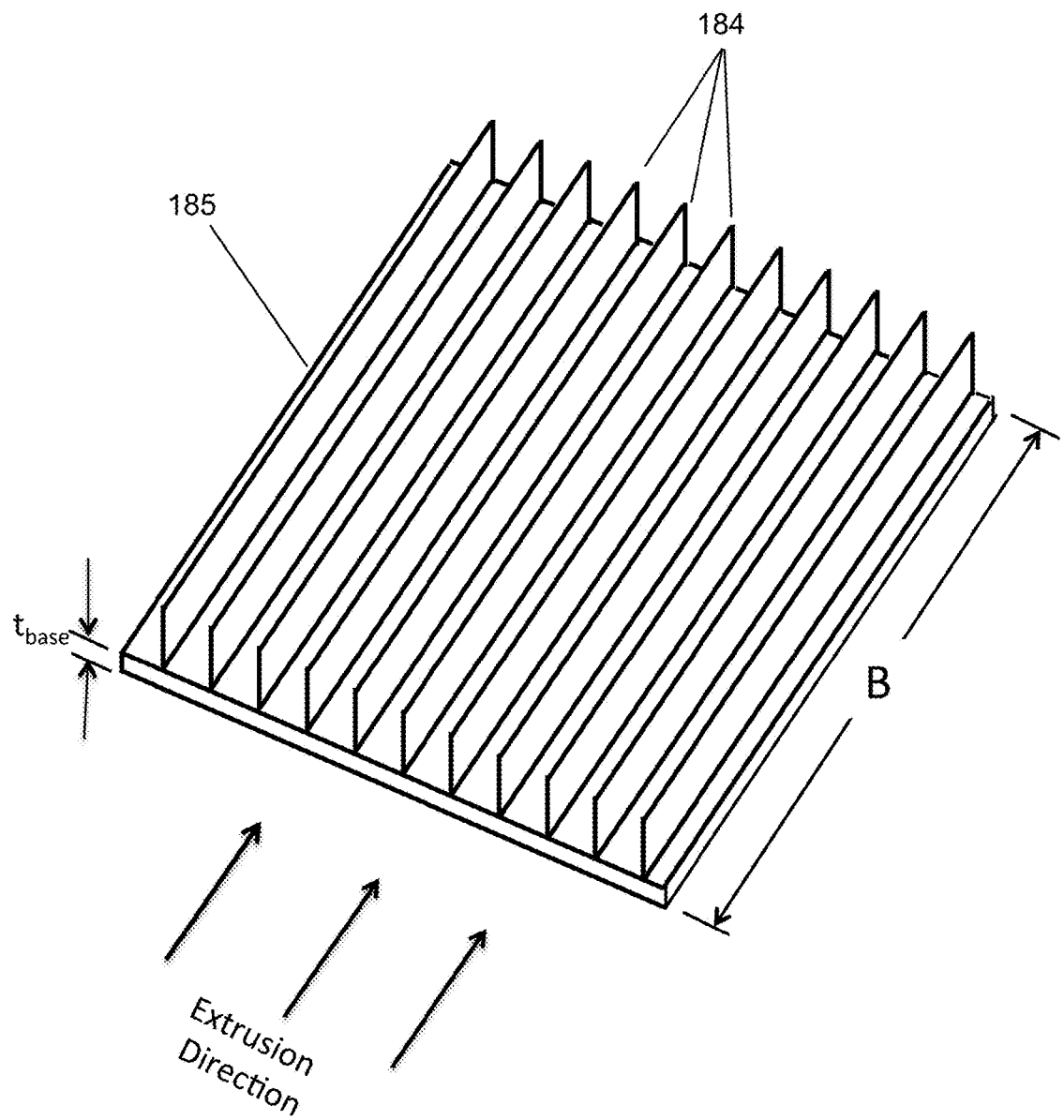
FIG. 23A shows an isometric view of an example of the present invention.

FIG. 23A shows an isometric view of an example according to the present invention. This shows a sub-assembly comprising a single, unitary extrusion of plastic comprising a thin, flat base 185 of length=B and thickness=$t_{base}$, and a plurality of parallel fins that run the length, B, of the base 185, and are oriented substantially perpendicular to the plane of base 185. The thickness of base 185, $t_{base}$, is on the order of the assembled fin gap, $g_{fin}$, which can range from 0.003 to 0.15 inches, with a preferred thickness, $t_{base}$, of about 0.005-0.008 inches.

Figure 23B:
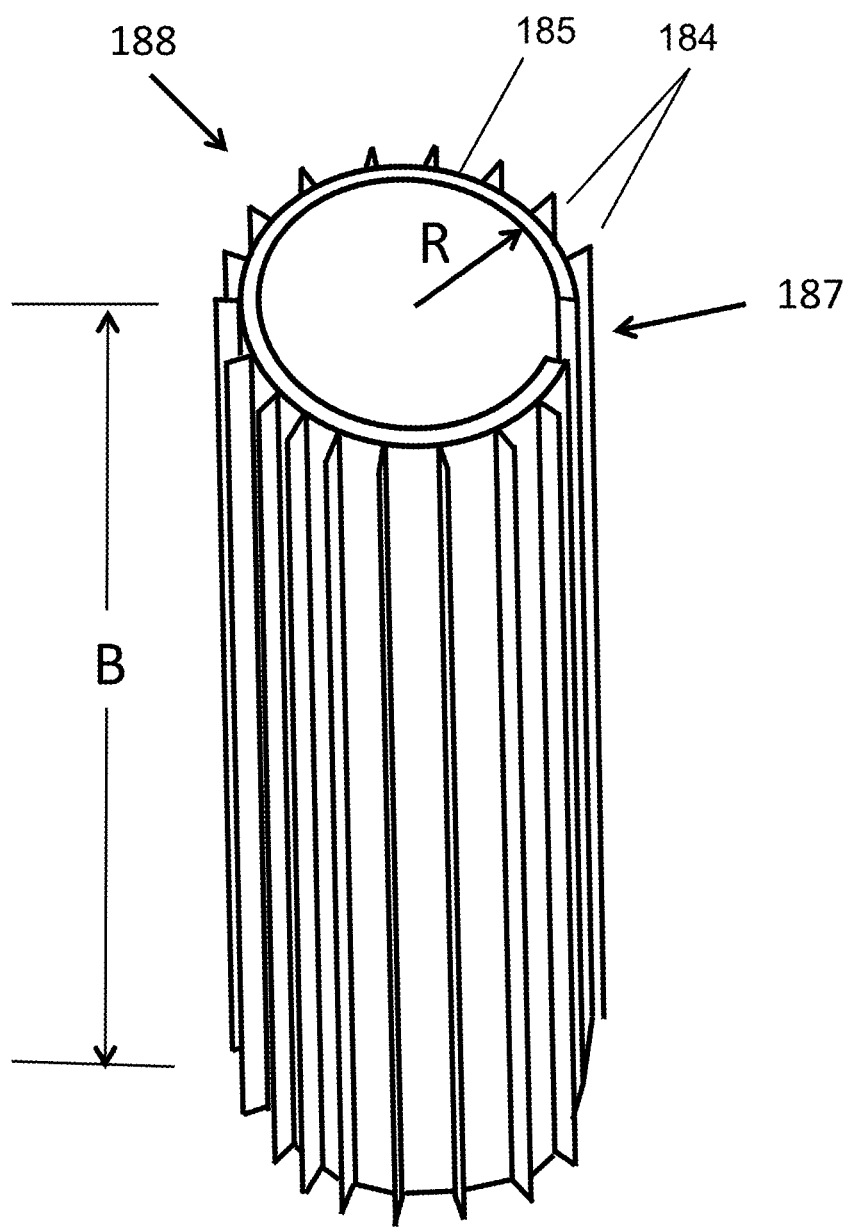
FIG. 23B shows an isometric view of an example of the present invention.

FIG. 23B shows an isometric view of the finned male subassembly 188 of FIG. 20 of the present invention. Here, the flat, finned base 185 from FIG. 23A has been rolled into a cylindrical shape of radius=R, length=B, and with a slot opening (aperture) 187 running along the length, B, of the shell. The fins are oriented parallel to Direction "B", and are located outside of the rolled cylinder 188. The flat finned base 185 can be rolled on a heated mandrel and held to heat-set the cylindrical shape.

Figure 23C:
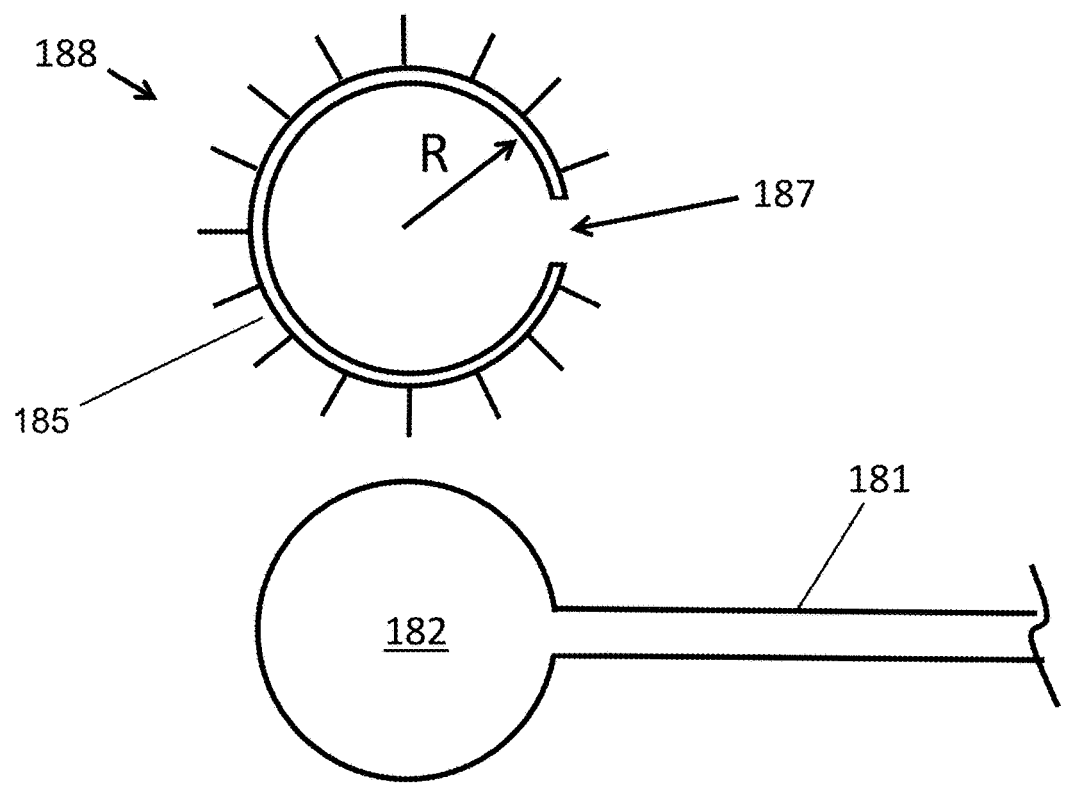
FIG. 23C shows a plan view of an example of the present invention.

FIG. 23C shows a plan layout view showing two parts of an example of the present invention.

Figure 23D:
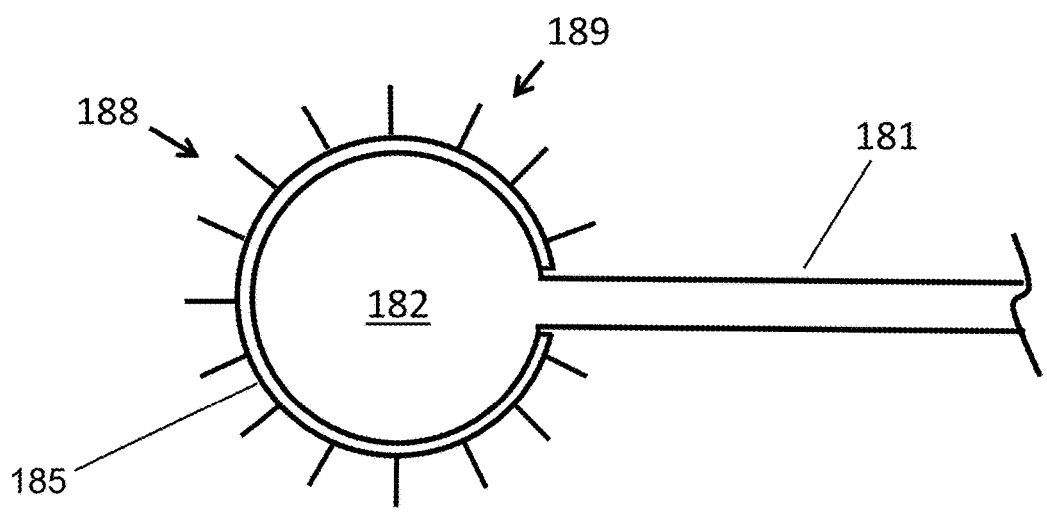
FIG. 23D shows a plan view of an example of the present invention.

FIG. 23D shows a plan layout view showing a subassembly of an example of the present invention. Here, the rolled, finned cylindrical shell 188 from FIG. 23C has been slipped over the cylindrical male element 182 and heat welded or glued together to form a finned male sub-assembly 189.

Figure 23E:
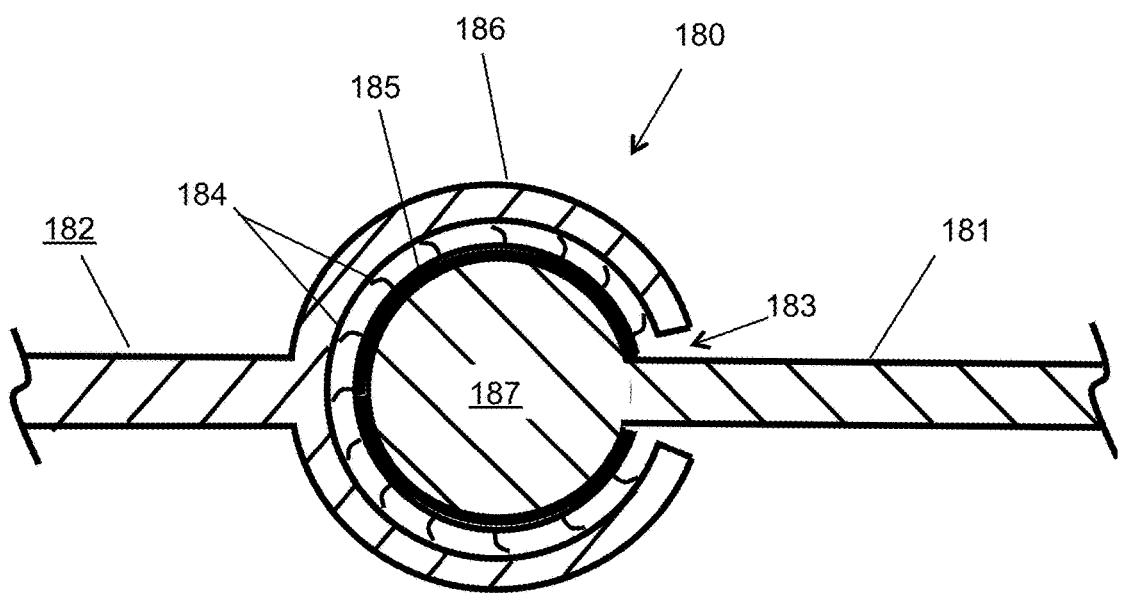
FIG. 23E shows an isometric view of an example of the present invention.

FIG. 23E shows a plan cross-section layout view showing an assembled example of the present invention. Joint assembly 180 comprises the finned male sub-assembly 189 shown in FIG. 23D inserted into the female "C"-shaped connecting member 186. The plurality of fins 184 are deformed upon insertion, thereby forming a watertight seal.

Figure 23F:
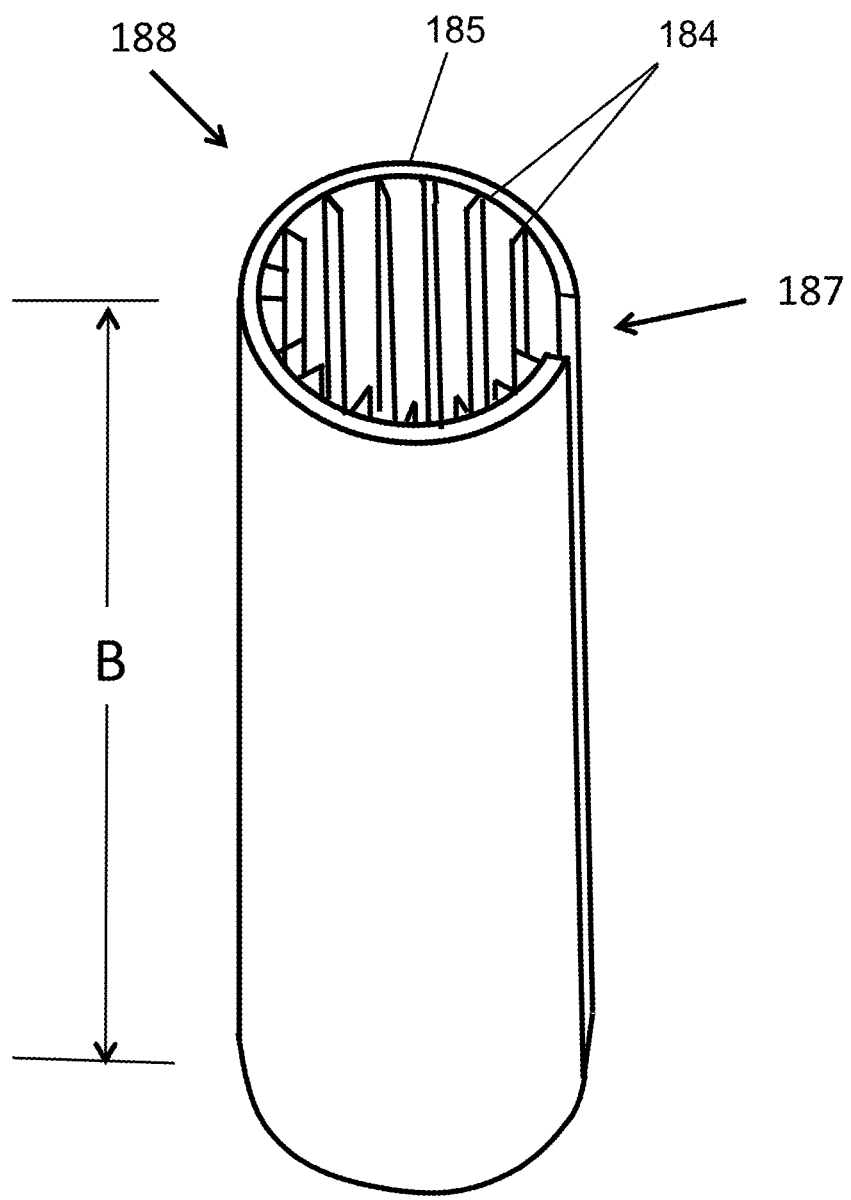
FIG. 23F shows a plan cross-section view of an example of the present invention.

FIG. 23F shows an isometric view of the finned male subassembly 188 of FIG. 20 of the present invention. Here, the flat, finned base 185 from FIG. 23A has been rolled into a cylindrical shape of radius=R, length=B, and with a slot opening (aperture) 187 running along the length, B, of the shell. The fins are oriented parallel to Direction "B", and are located inside of the rolled cylinder 188. The flat finned base 185 can be rolled on a heated mandrel and held to heat-set the cylindrical shape.

Figure 23G:
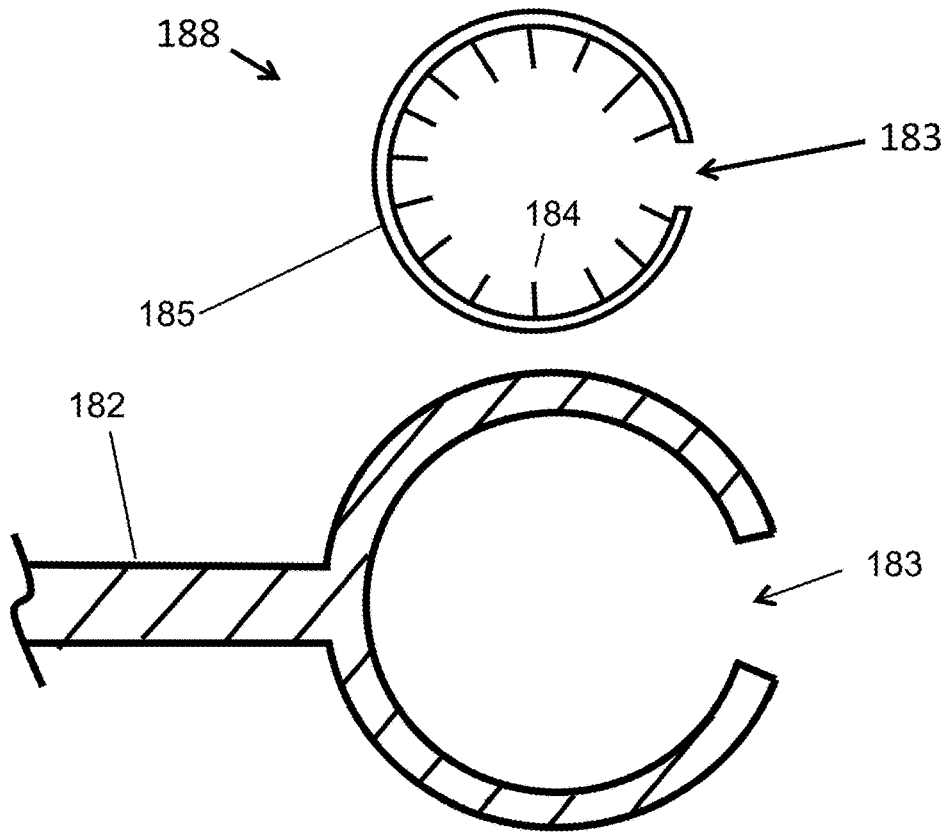
FIG. 23G shows a plan cross-section view of an example of the present invention.

FIG. 23G shows a plan layout view showing two parts of an example of the present invention.

Figure 23H:
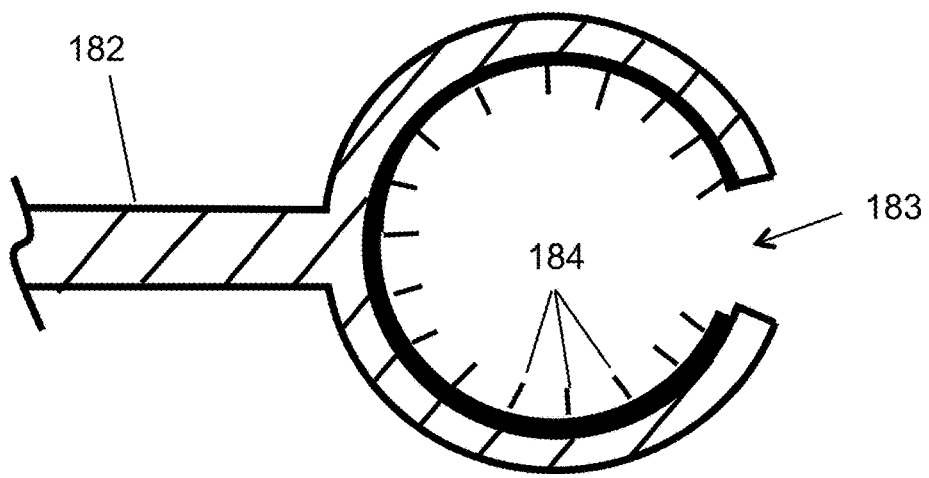
FIG. 23H shows a plan cross-section view of an example of the present invention.

FIG. 23H shows a plan layout view showing a subassembly of an example of the present invention. Here, the rolled, finned cylindrical shell 188 from FIG. 23F has been slipped inside the cylindrical female element 186 and heat welded or glued together to form a finned female subassembly 191.

Figure 23I:
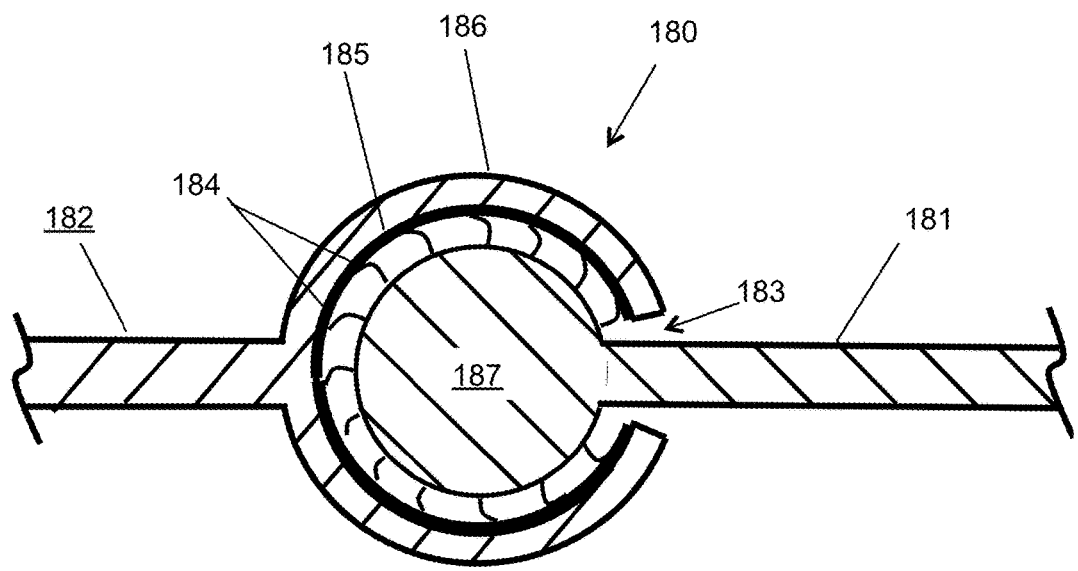
FIG. 23I shows a plan cross-section view of an example of the present invention.

FIG. 23I shows a plan cross-section layout view showing an assembled example of the present invention. Joint assembly 180 comprises the finned female sub-assembly 191 shown in FIG. 23D, with the male member 187 inserted inside the fins 184. The plurality of fins 184 are deformed upon insertion, thereby forming a watertight seal.

Note: the examples shown in FIGS. 20-23 use a cylindrically-shaped connecting member (male & female) in combination with a plurality of fins that replace a single wiper-blade elastomeric sealing element. Other shapes can replace the cylindrical geometry of the male/female connectors, including, but not limited to, a square, triangular, diamond, or oval shape. The step of "rolling" the flat sheet described in FIG. 23B or FIG. 23F can use a forming mandrel that has the corresponding square, triangular, diamond, or oval shape.

Figure 24A:
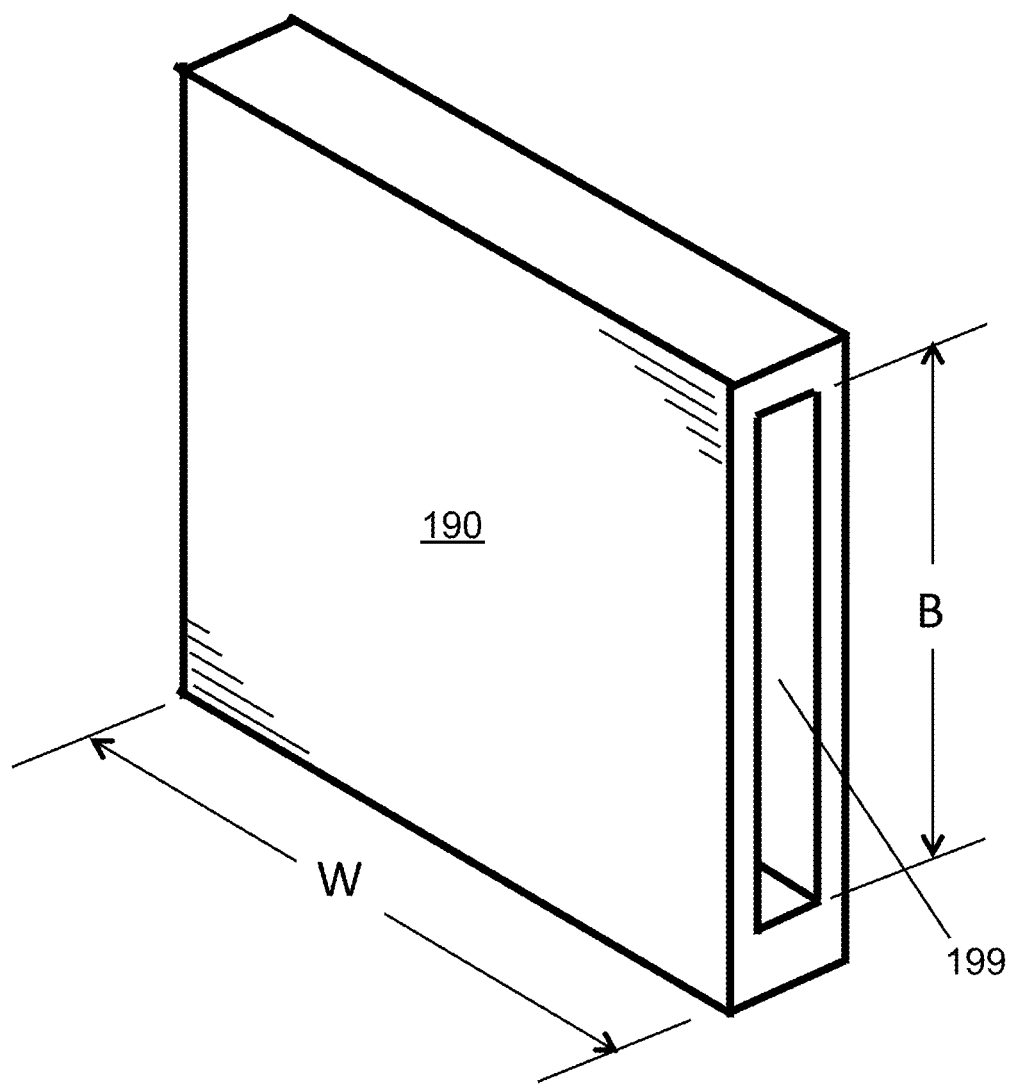
FIG. 24A shows an isometric view of an example of the present invention.

FIG. 24A shows an isometric view of an example of the present invention. This figure shows a hollow, locking sleeve 190 that serves as a connecting means for joining the two distal ends 191 and 192 of the tree surround together. Sleeve 190 has a rectangular aperture 199 with dimensions of t×B. The length of locking sleeve 190 is W, which can range from 2-4 inches, with a preferred width of 3 inches. Sleeve 190 can be made of a high strength plastic, and can be injection molded or printed by 3-D additive printing. Note: the distal ends 191 and 192 can be "unlocked" by inserting a screwdriver into the open aperture 199 of sleeve 190 and applying pressure to deform the side walls of sleeve 190, while pulling apart the distal end from the sleeve, thereby unlocking and releasing the two distal ends.

Figure 24B:
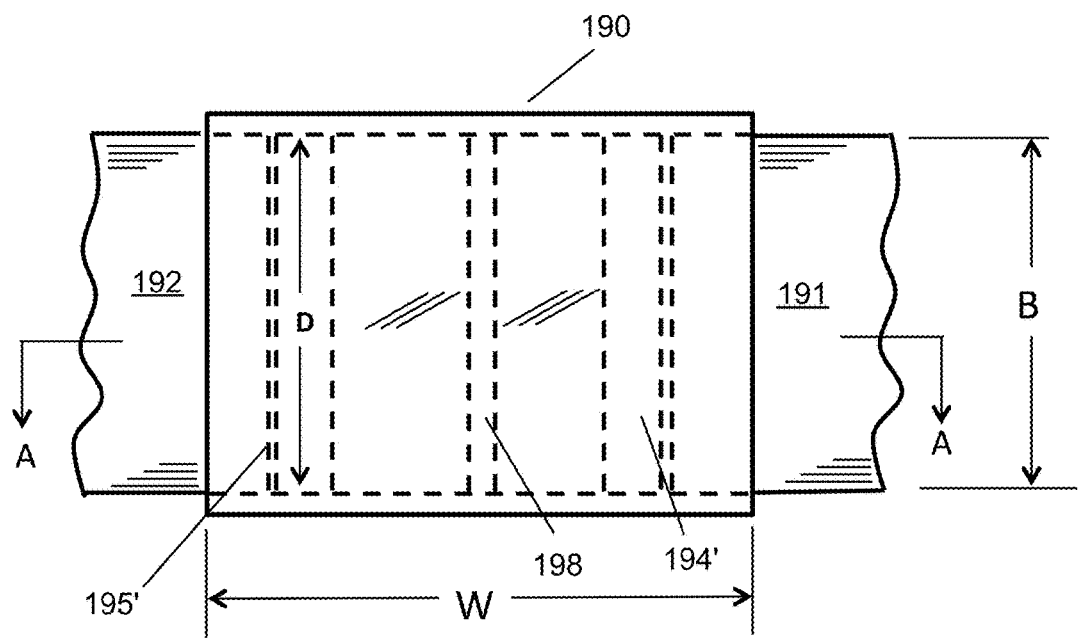
FIG. 24B shows an elevation view of an example of the present invention.

FIG. 24B shows an elevation view of the locking sleeve shown in FIG. 24A of the present invention. Note that the vertical height, D, of locking ramp 195' (and ramps 194, 194', 195, 195') can be the same as vertical height, B of surround ends 191, 192. Alternatively, the vertical height, D, of locking ramp 195' can be some fraction of B, for example, D=B/2 or D=B/3. If D is less that ½ of B (i.e. D<B/2), then each ramp 194 (194, 194', 195, 195') can be divided into two ramps of the same vertical height, D, for each subdivided ramp, with a vertical gap or open space disposed in-between the pair of subdivided ramps.

Figure 24C:
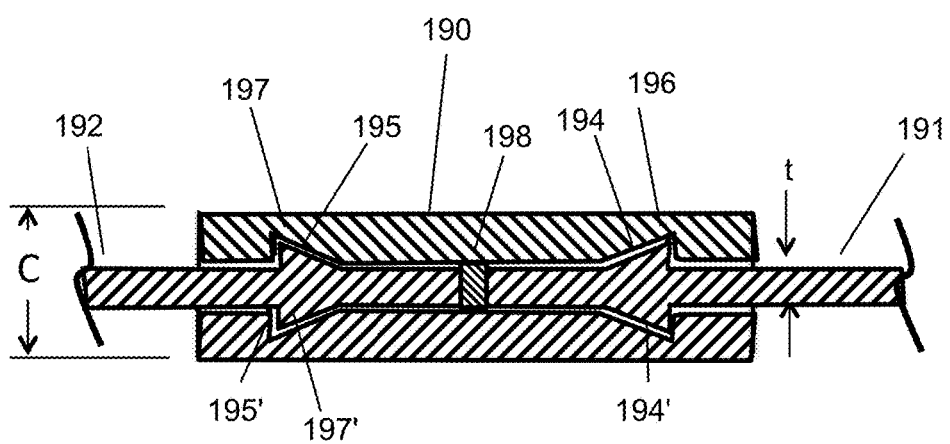
FIG. 24C shows a plan cross-section view of an example of the present invention.

FIG. 24C shows a plan cross-section view (Section A-A) of an example of the present invention. Locking sleeve 190 is a hollow rectangular body of dimensions W×B×C, where C ranges from 0.25 to 1 inches, with a preferred thickness of about ½ inch. Alternatively, C can equal 3 times the thickness, t, of tree surround strip 191/192. Located inside of sleeve 190 are a symmetric pair of mating ramped recesses (notches) 194/194' and 195/195' (total of 4 locking positions). Corresponding to these four recessed ramps are four raised ramp protrusions (latches) 196/196' and 197/197' sticking out of the distal ends 191 and 192, respectively of the tree surround. For example, the distal end 191 is pushed (inserted) into the locking sleeve 190 to a depth sufficient for the locking ramp 194 to snap into place within the corresponding recessed ramp 196; and for ramp 194' to snap into place within recessed ramp 196'. The same is true for the other distal end (192), which is symmetric. This geometrical configuration prevents the distal end 191 from being withdrawn, after having been locked in place by the dual pair of locking ramps. Located directly in-between the distal ends 191 and 192 is an optional elastomeric sealing element 198, to help provide a watertight seal. Seal 198 can be rectangular in cross-section, or circular, for example, and can be made of any well-known elastomeric, compressible material (e.g., rubber). Seal 198 can be made to be attachable to one distal end 191 or 192 using a pressure-sensitive sticky tape (not shown) that is installed by the user just prior to installation in the field.

Figure 24D:
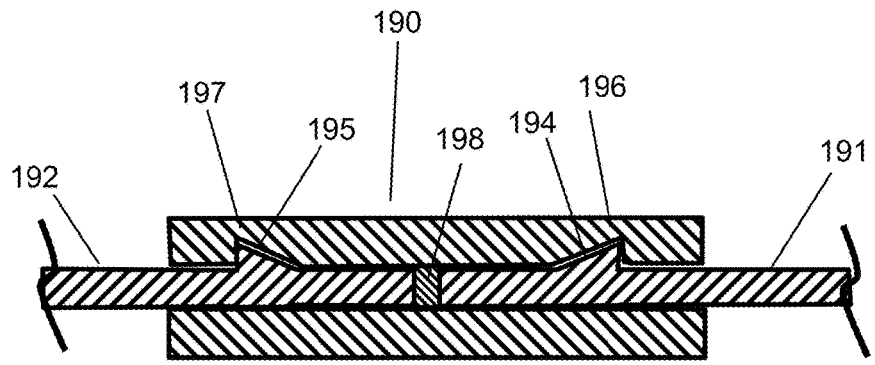
FIG. 24D shows a plan cross-section view of an example of the present invention.

FIG. 24D shows a plan cross-section view (Section A-A) of an example of the present invention. In this example, the locking sleeve 190 only has a single pair of protruding locking ramps 194 and 195, for locking into recessed ramps 196 and 197, respectively.

Figure 24E:
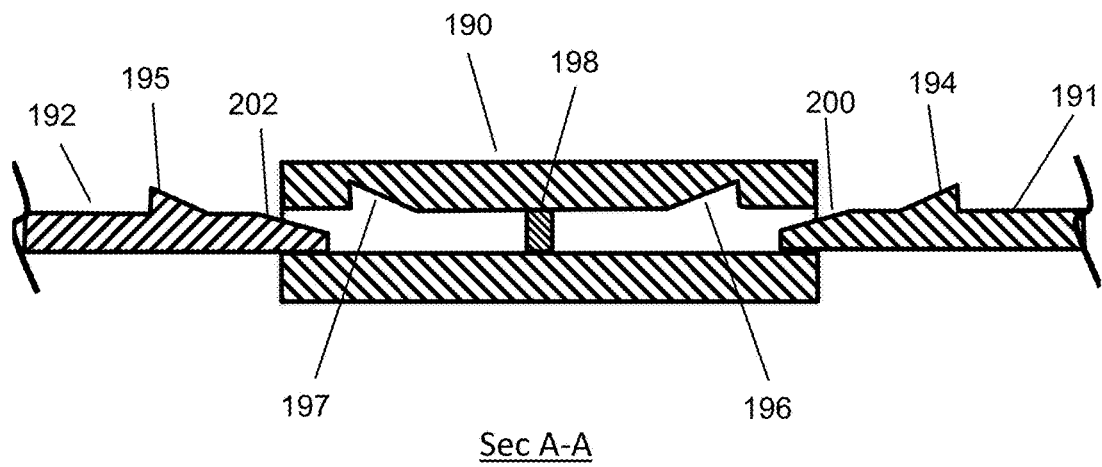
FIG. 24E shows a plan cross-section view of an example of the present invention.

FIG. 24E shows a plan cross-section view (Section A-A) of an example of the present invention. In this example, the locking sleeve 190 only has a single pair of protruding locking ramps 194 and 195, for locking into recessed ramps 196 and 197, respectively. In this exploded view (pre-insertion), one can see that the distal ends of tree surround 191 and 192 have a tapered entrance ramp/edge 200, and 202, respectively, to ease the insertion of ends 191 and 192 into locking sleeve 190. Recesses 196 and 197 are located in sleeve 190, and protruding ramps 194, 195 are located on the side of distal ends 195, 195.

Figure 24F:
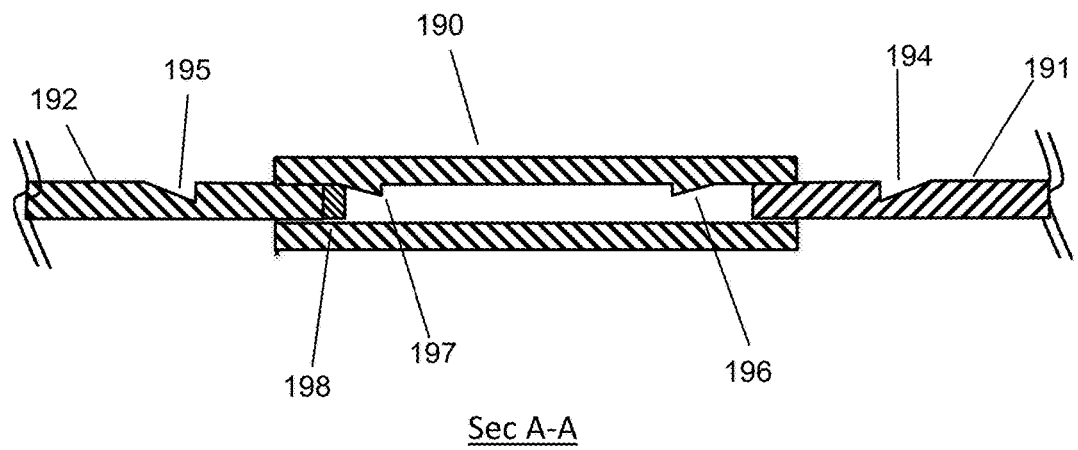
FIG. 24F shows a plan cross-section view of an example of the present invention.
Figure 24G:
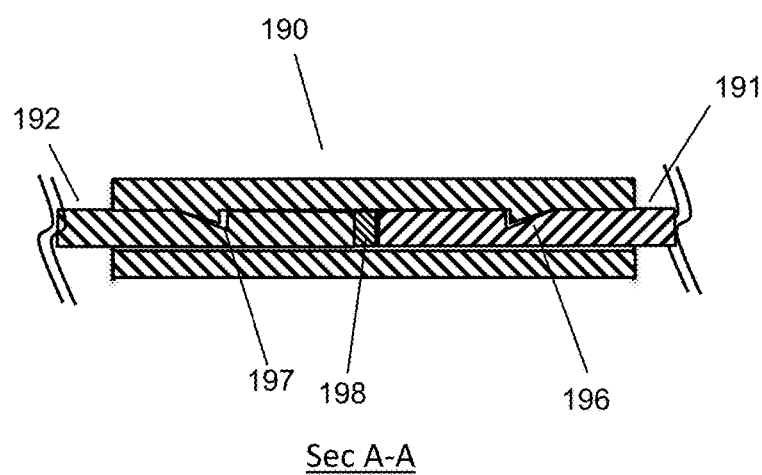
FIG. 24G shows a plan cross-section view of an example of the present invention

FIG. 24F shows a plan cross-section view (Section A-A) of an example of the present invention. In this example, the locking sleeve 190 only has a single pair of protruding locking ramps 194 and 195, for locking into recessed ramps 196 and 197, respectively. Ramps 196, 197 on sleeve 190 protrude the opposite direction of that shown in FIG. 24D. Mating recesses 194, 195 are located on the side of distal ends 194, 195, respectively. FIG. 24G shows the same configuration as FIG. 24F after being locked together.

FIGS. 25A-F show a series of plan cross-sectional views of a mechanical joint made between the distal ends 191 and 192 of a 360° tree surround enclosure (ring). In each of these joint designs, a wiper-blade type of sealing element 206 can optionally be added to improve the water-holding quality of the joint.

Figure 25A:
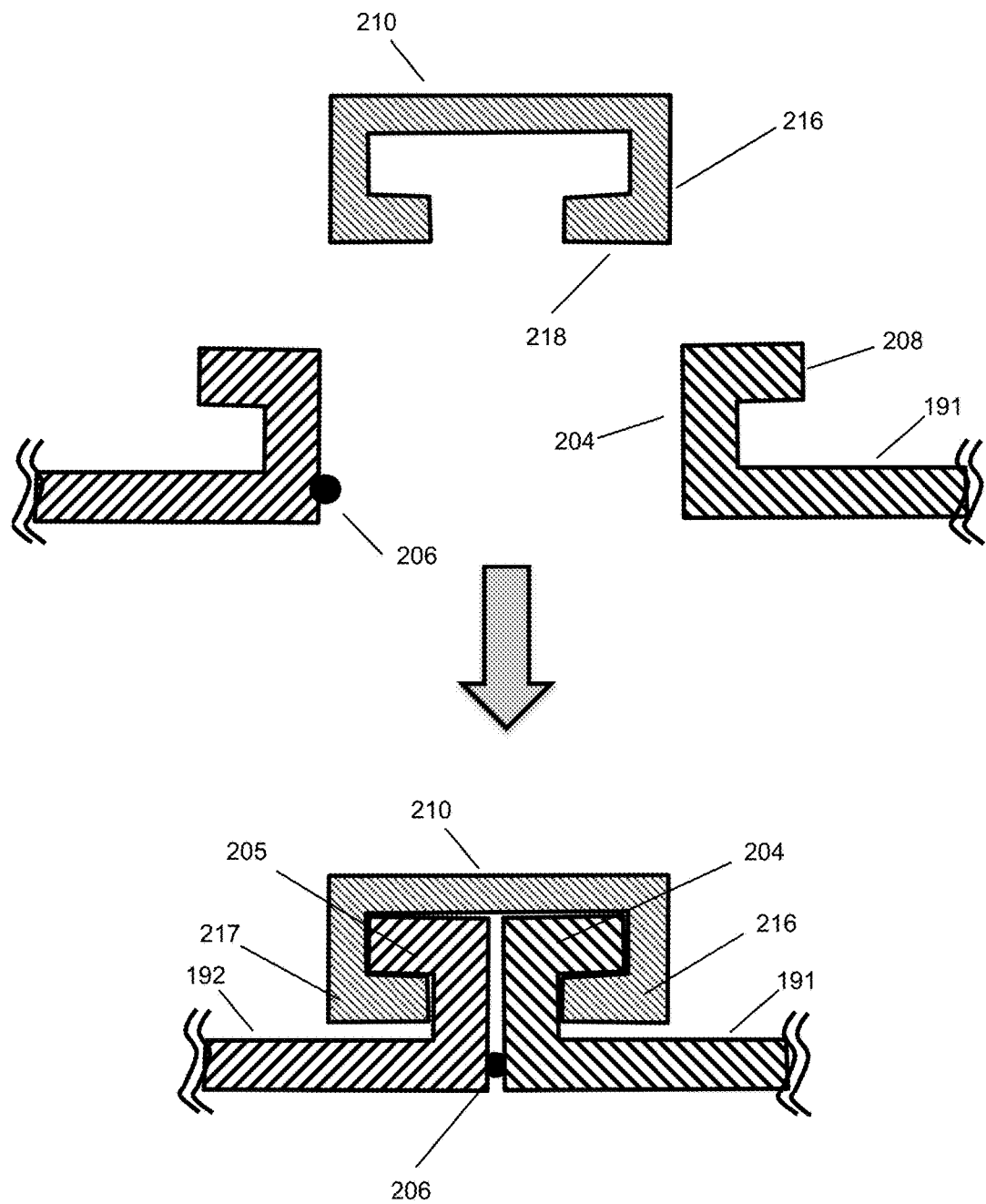
FIG. 25A shows a plan cross-section view of an example of the present invention.

FIG. 25A shows a plan cross-section view of an example of the present invention. Each tree surround distal end 191 and 192 has a molded turned-up edge, forming a "J"-shaped flanged end with a flange segment 204 at right angles to side wall 191, and another flange segment 208 at right angles to part 204. The two flanges are mechanically held together by a clip 210, which has an interlocking symmetric "J-shaped" cross-section shape. Clip 210 is attached by sliding the clip onto the mating flanges, or by snapping-on the clip. Clip 210 is preferably made of a plastic or polymer material, but could also be made of metal or metal alloy. Seal element 206 can optionally be disposed between the adjacent surfaces of flanges 204 and 205 to make the joint watertight.

Figure 25B:
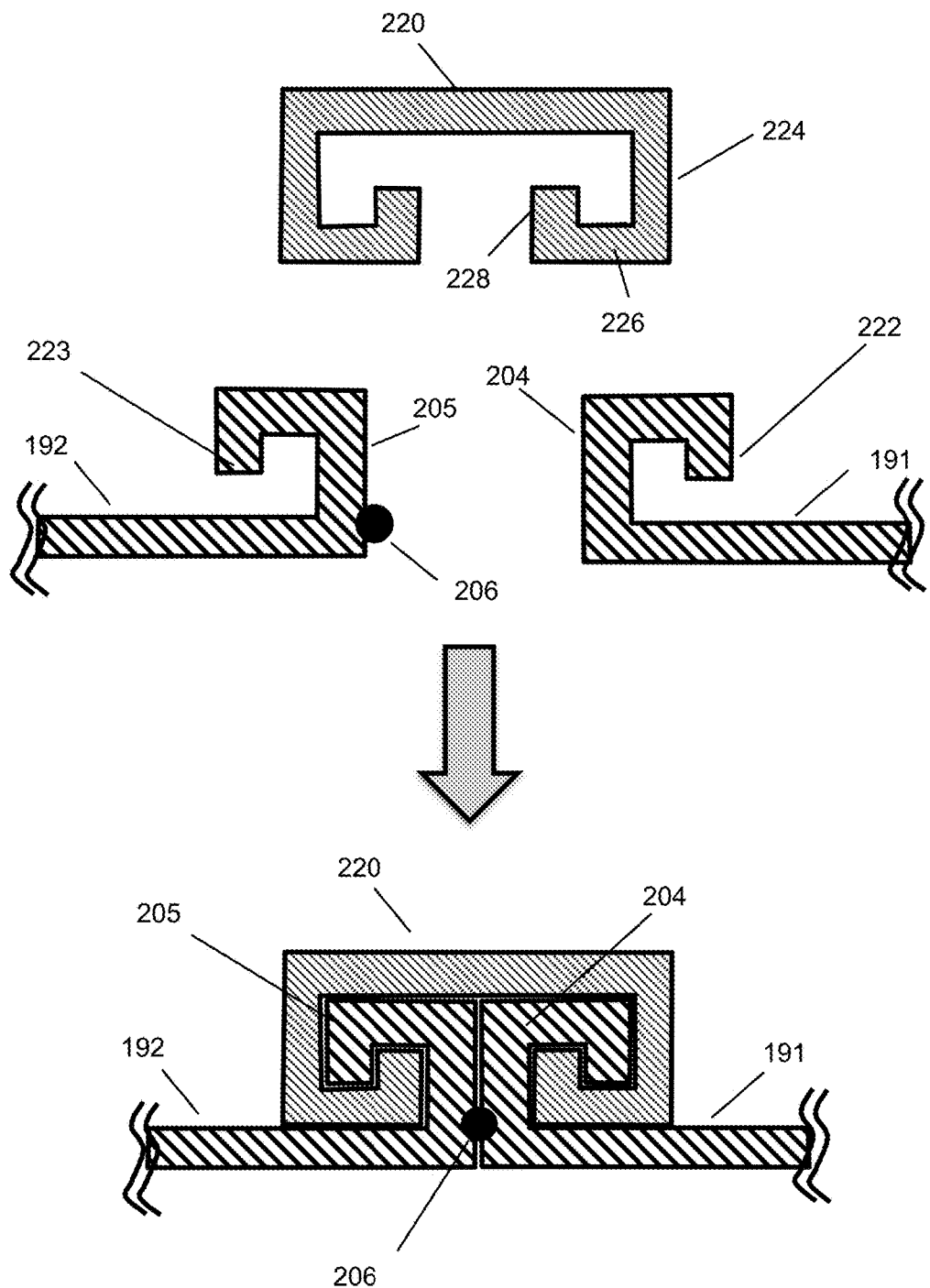
FIG. 25B shows a plan cross-section view of an example of the present invention.

FIG. 25B shows a plan cross-section view of an example of the present invention. Each tree surround distal end 191 and 192 has a pair of molded turned-up edges, forming a "J"-shaped flanged end. The two flanges are mechanically held together by a clip 220, which has an interlocking symmetric "G-shaped" cross-section. Clip 220 is attached by sliding the clip onto the mating flanges, or by snapping-on the clip. Clip 220 is shaped such that it interlocks with the mating flanges and cannot fall off after being installed. Clip 220 is preferably made of a plastic or polymer material, but could also be made of metal or metal alloy. Seal element 206 can optionally be disposed between the adjacent surfaces of flanges 204 and 205 to make the joint watertight.

Figure 25C:
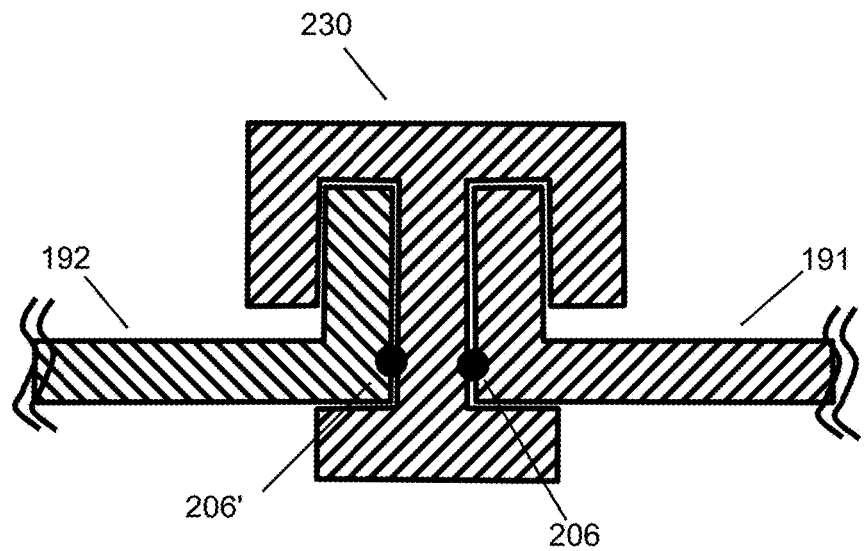
FIG. 25C shows a plan cross-section view of an example of the present invention.

FIG. 25C shows a plan cross-section view of an example of the present invention. Each tree surround distal end 191 and 192 has a pair of molded turned-up edges, forming an "L"-shaped flanged end. The two flanges are mechanically held together by a clip 230, which has a "T-shaped" cross-section. Clip 230 is attached by sliding the clip onto the mating flanges, or by snapping-on the clip. Clip 230 is shaped such that it interlocks with the mating flanges and cannot fall off after being installed. Clip 230 is preferably made of a plastic or polymer material, but could also be made of metal or metal alloy. Seal element 206 can be disposed between the mating flanges.

Figure 25D:
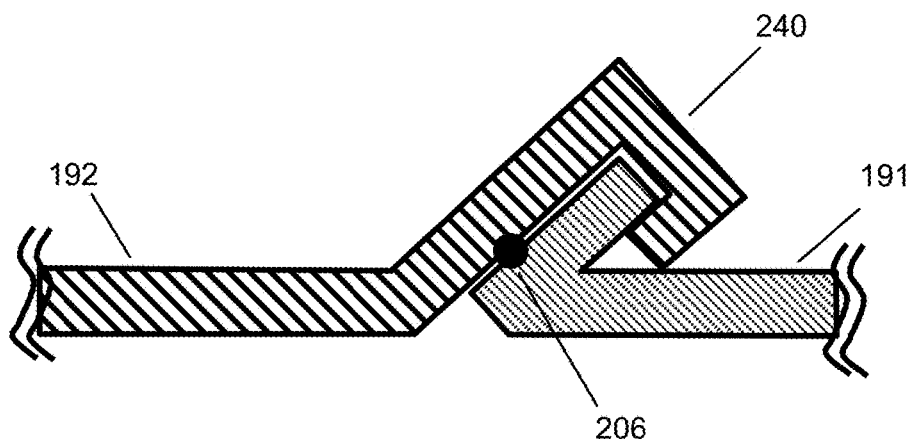
FIG. 25D shows a plan cross-section view of an example of the present invention.

FIG. 25D shows a plan cross-section view of an example of the present invention. The right tree surround distal end 191 has a molded flange end that is bent back at a 45° angle to form a "J-shaped flange. The left tree surround distal end 192 has a molded flange end 240 that is bent forward at a 135° angle, and also has a "C"-shaped cross-section. The two flanges are mechanically held together by interlocking themselves, after being slid together. Note: an external clip is not required. Seal element 206 can be disposed between the mating flanges.

Figure 25E:
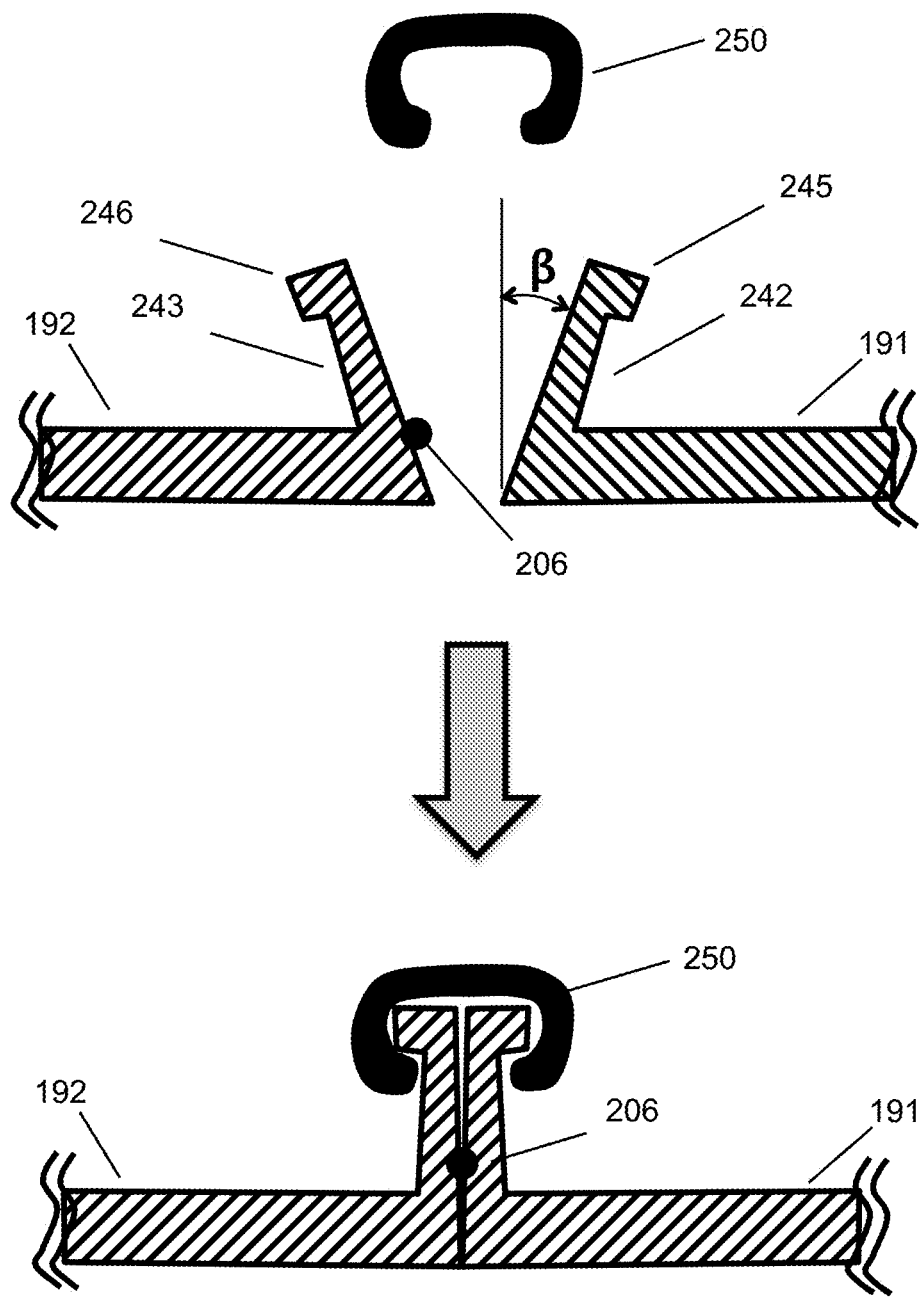
FIG. 25E shows a plan cross-section view of an example of the present invention.

FIG. 25E shows a plan cross-section view of an example of the present invention. The left and right tree surround distal ends 191 and 192 each has a molded flange end 242, 243 that is bent backwards at an angle, β=0-15°, to form an angled "J"-shaped flange 242 and 243, each having a slightly bulbous (enlarged) end 245, 246, respectively. The two flanges are mechanically held together by a clip 250, which has a "C"-shaped cross-section. Clip 250 is attached by sliding the clip onto the mating flanges, or by snapping-on the clip, after the two flanges 242 and 243 have been elastically deformed by squeezing them together first. Clip 250 is shaped such that it interlocks with the mating flanges and cannot fall off after being installed (due to the elastic flanges pushing back against the clip). Clip 250 is preferably made of a plastic or polymer material, but could also be made of metal or metal alloy. Optionally, seal element 206 can be disposed between the mating flanges 242 and 243. However, if the two mating surfaces 242 and 243 are held together (squeezed together) tight enough by clip 250, then the joint will be watertight and seal 206 won't be needed.

Figure 25F:
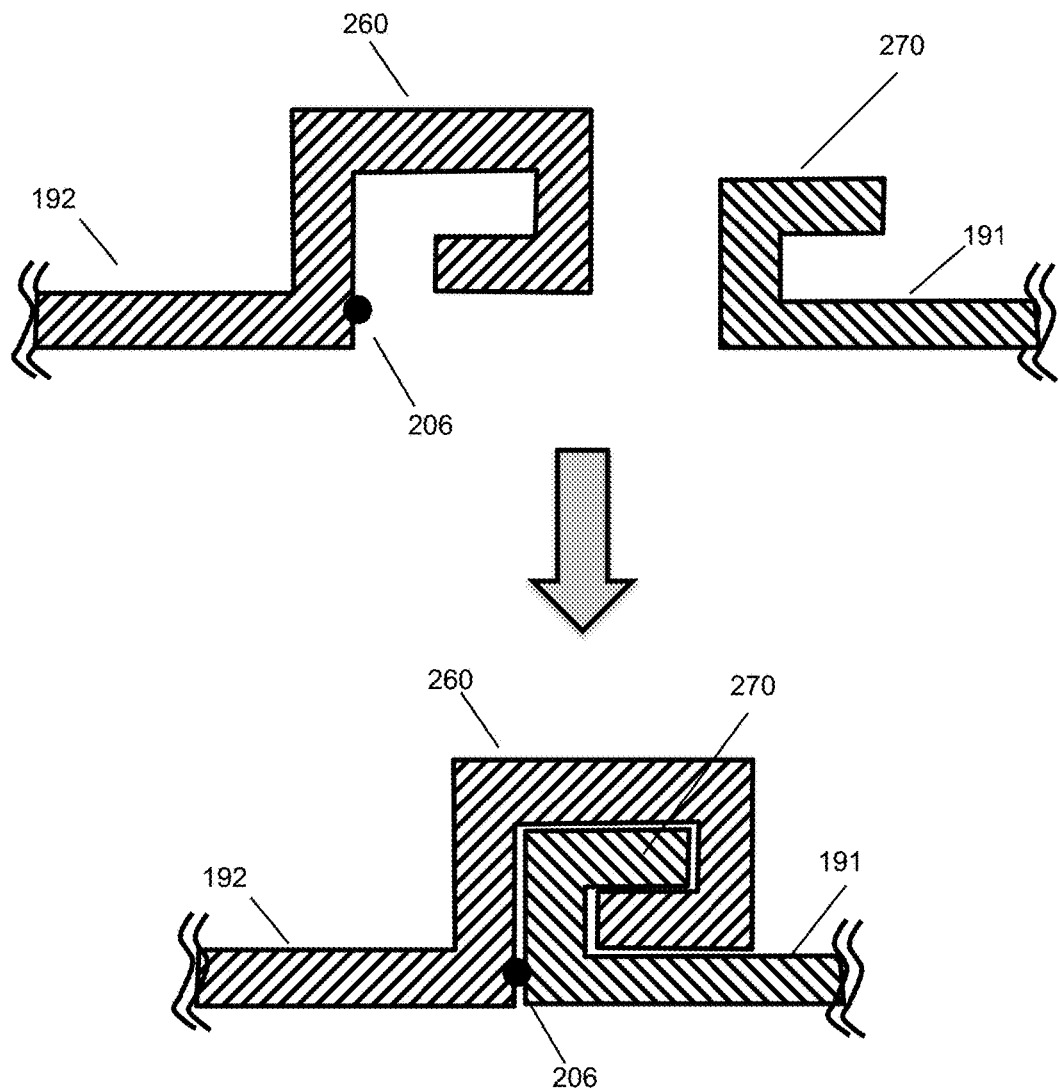
FIG. 25F shows a plan cross-section view of an example of the present invention.

FIG. 25F shows a plan cross-section view of an example of the present invention. The right tree surround distal end 191 has a molded flange end 270 that forms a "J-shaped flange. The left tree surround distal end 192 has a molded flange end 260 that forms a "J"-shaped cross-section. The two flanges are mechanically held together by interlocking among themselves after being slid together. Note: an external clip is not required. The interlocking configuration comprises a pair of interlocking, squared-off spirals. Optionally, seal element 206 can be disposed between the mating flanges. Note that a preferred location for this joint is disposed on the inside of the curved tree surround, so that the joint is not visible from outside of the tree surround.

Figure 25G:
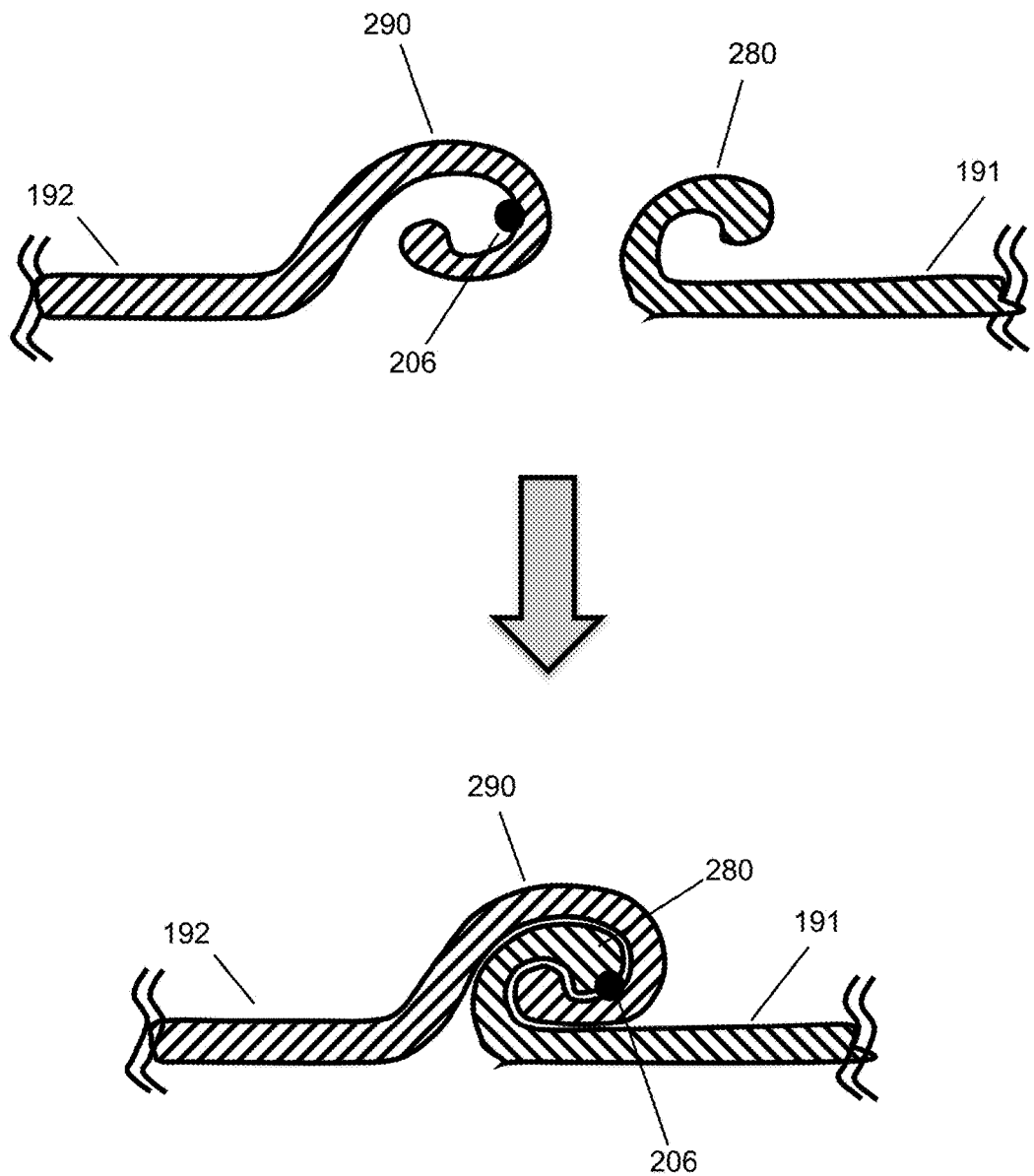
FIG. 25G shows a plan cross-section view of an example of the present invention.

FIG. 25G shows a plan cross-section view of an example of the present invention. The right tree surround distal end 191 has a molded flange end 270 that forms a spiral "G-shaped flange. The left tree surround distal end 192 has a molded flange end 260 that forms a complementary spiral "G"-shaped cross-section. The two flanges 280 and 290 are mechanically held together by interlocking among themselves after being slid together. Note: an external clip is not required. The interlocking configuration comprises a pair of interlocking spiral flanges. Seal element 206 can optionally be disposed between the mating flanges. Note that a preferred location for this joint is disposed on the inside of the curved tree surround, so that the joint is not visible from outside of the tree surround.

Figure 26:
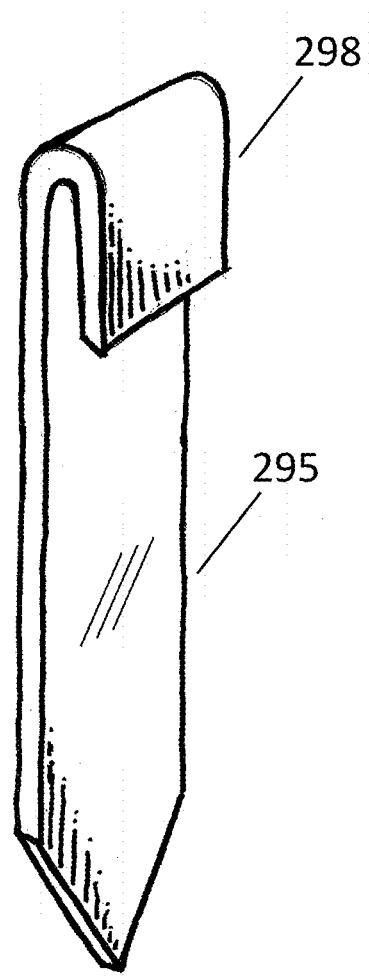
FIG. 26 shows an isometric cross-section view of an example of the present invention.

FIG. 26 shows an isometric view of an example of the present invention. This shows an attachment stake 295 with a curled-over top end 298 for hooking over the top of the tree surround when embedding the tree surround in the ground.

Figure 27:
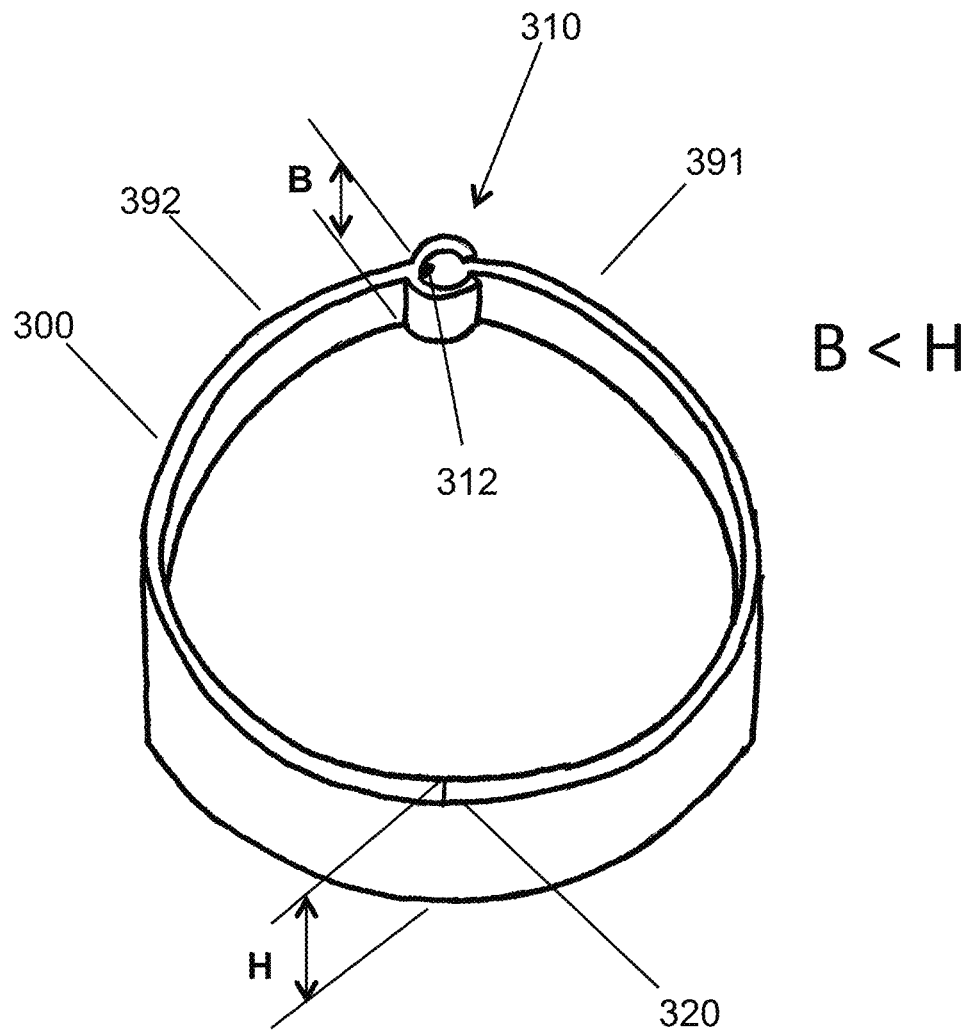
FIG. 27 shows an isometric view of an example of the present invention.

FIG. 27 shows an isometric view of an example of the present invention. Tree surround enclosure 300 has a height=H at the tallest point 320 of ring 300, and has tapered ends 391 and 392 of height=B at the distal ends. Height B is less than H. Alternatively, height B can be ½ to ¼ of the height H, depending on the slope of the ground. Interlocking joint 310 mechanically joins the two distal ends 391 and 392 together, and can have a wiper-blade type of elastomeric sealing element 312 disposed within the joint 310 for making the joint watertight. Alternatively (not shown) the mechanical interlocking joint 310 can comprise a dual-conical male/female design that is watertight without the need for using a wiper-blade type of sealing element. Alternatively (not shown) the interlocking joint 310 can comprise a finned design (see, e.g., FIG. 20) that is watertight without the need for using a wiper-blade type of sealing element. Alternatively (not shown) the interlocking joint 310 can comprise a locking sleeve type of design (see, e.g., FIGS. 24A-D) that optionally can use a wiper-blade type of sealing element. Alternatively (not shown) the interlocking joint 310 can comprise any of the types of interlocking flanges shown in, for example, in FIGS. 25A-F, that optionally can use a clip to hold the flanges together and that optionally can use a wiper-blade type of sealing element.

Figure 28A:
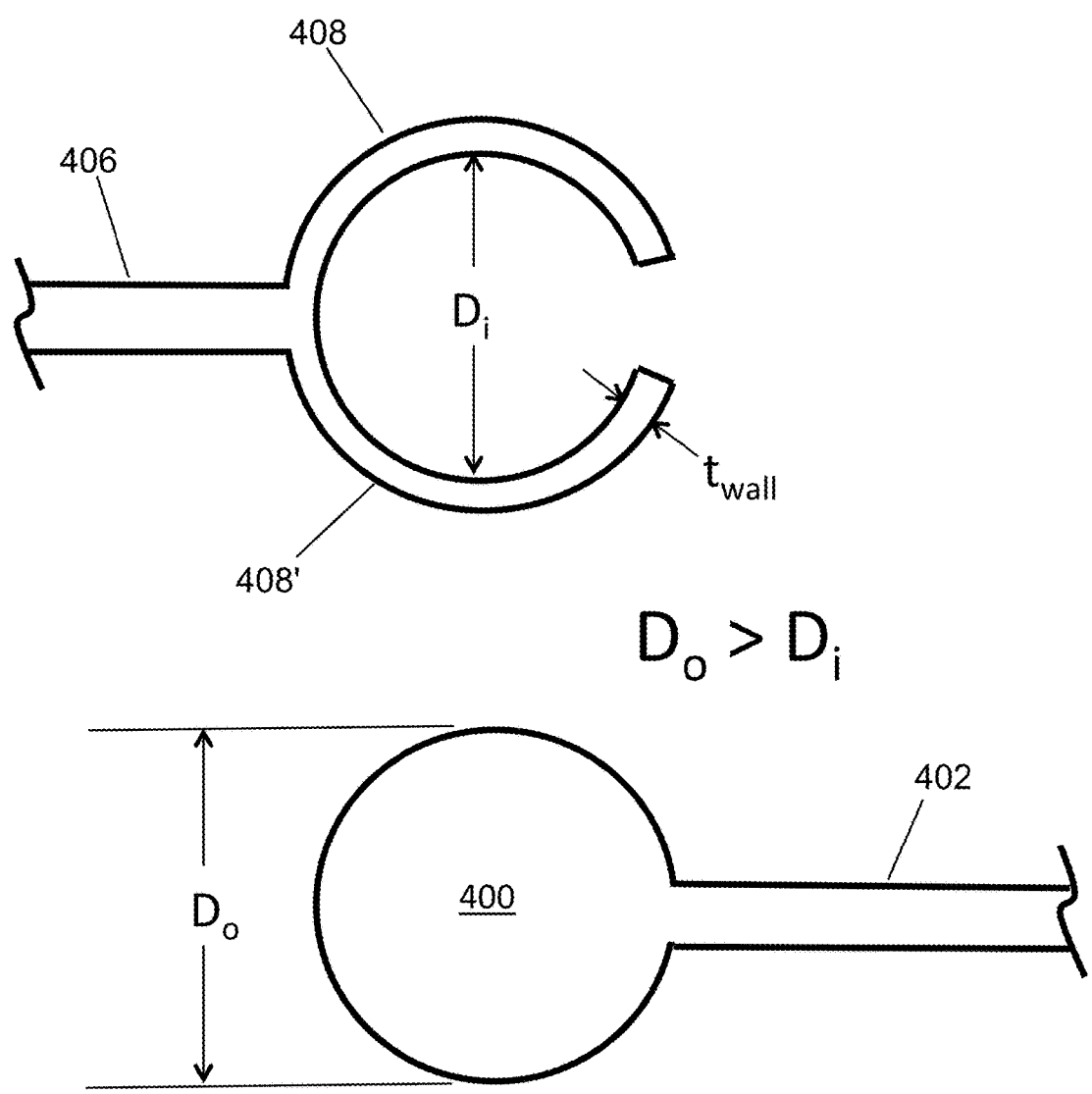
FIG. 28A shows a plan view of an example of the present invention.

FIG. 28A shows a plan view of an example of the present invention. This figure shows two parts of an interference-type interlocking male/female joint: the "C-"shaped female connector 408 attached to the distal end of left surround 406; and the cylindrical male end 400 attached to the distal end of right surround 402. In this embodiment, the outer diameter, $D_o$, of the male connector 400 is greater than the inner diameter, $D_i$, of the female connector 408 by a small amount, such as 0.005-0.010 inches, for example. In the previous art, this positive interference fit would have prevented the two parts from being assembled due to jamming. However, in this embodiment the wall thickness, $t_{wall}$, of the two wings of the "C"-shaped female connector (408 and 408'), is sufficiently thin (e.g., $t_{wall} \le t/2$) so that the wings can readily flex outwards to accommodate the greater diameter of the male cylinder 400.

Figure 28B:
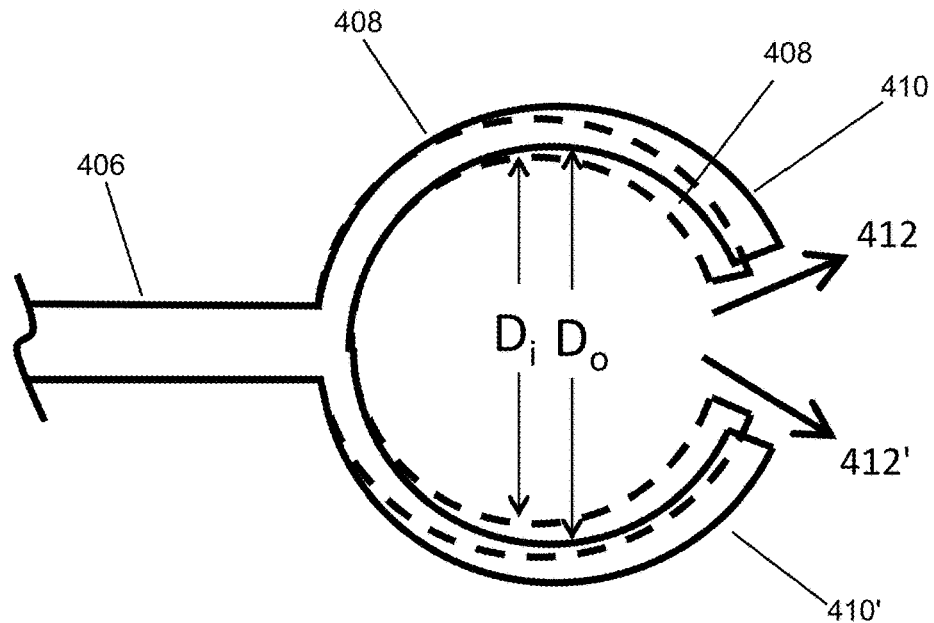
FIG. 28B shows a plan view of an example of the present invention.
Figure 28C:
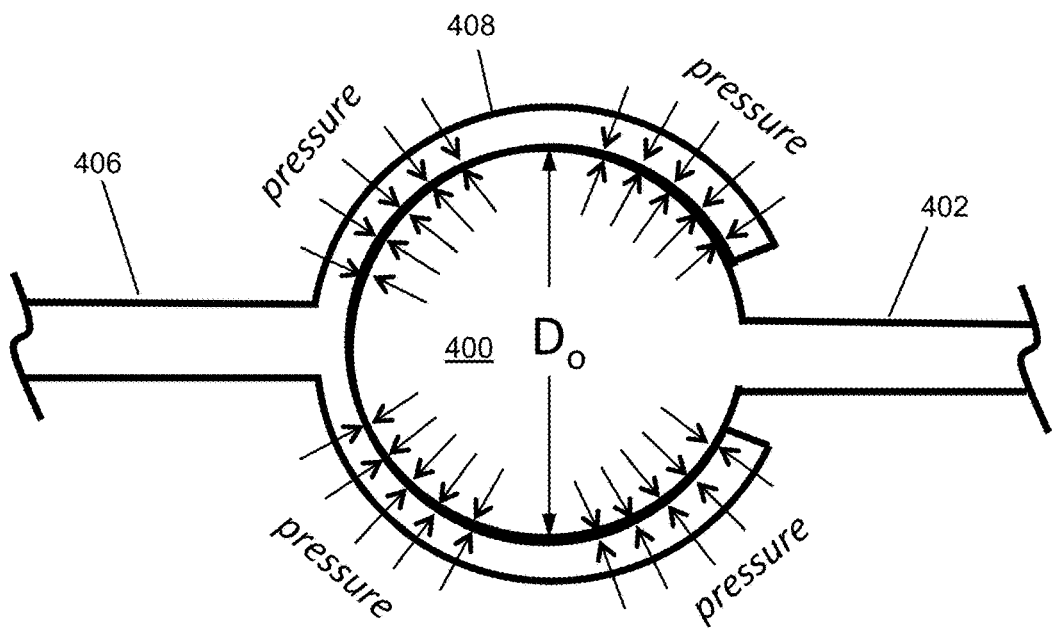
FIG. 28C shows a plan view of an example of the present invention.
Figure 28D:
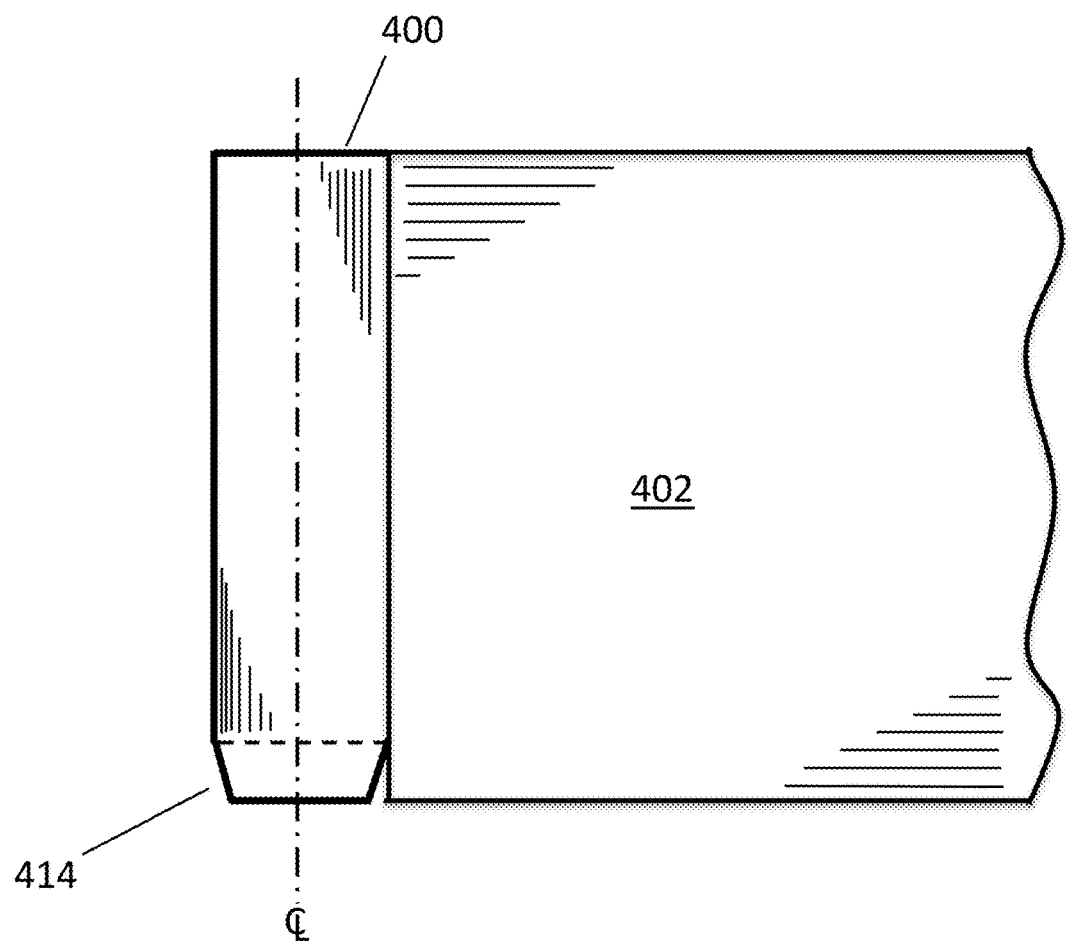
FIG. 28D shows an elevation view of an example of the present invention.

This deformation is illustrated in FIG. 28B, which shows the deformed wings 410, 410' of the female connector 408 as a solid line (compared to the un-deformed shape (408, 408') drawn in a dashed line). The radial outward deformation, 412, of the wings (408, 408') increases the circumference the exact amount to precisely accommodate the greater diameter, $D_o$, of the male cylindrical connector 400. The result, which is shown in FIG. 28C, is a watertight seal around the entire circumference of the interlocking joint (as indicated by the arrows showing the compressive pressure applied around the circumference of cylinder 400). Hence, with this type of an interference joint, there is no need to use a wiper-blade type of sealing element. Note: to reduce the force needed to insert the male connector 400 into the female receiver 408, with this interference type of joint, a beveled edge 414 (chamfer) is cut on the lower corner of male cylinder 400, which reduces the diameter for a short portion of the cylinder, and reduces the insertion force. This chamfered corner 414 is illustrated in FIG. 28D.

Note that although a cylindrical shape is illustrated in FIGS. 28A-D, any other cross-sectional shape can be used, for example, a square, diamond, triangle, or oval shape.

Figure 29:
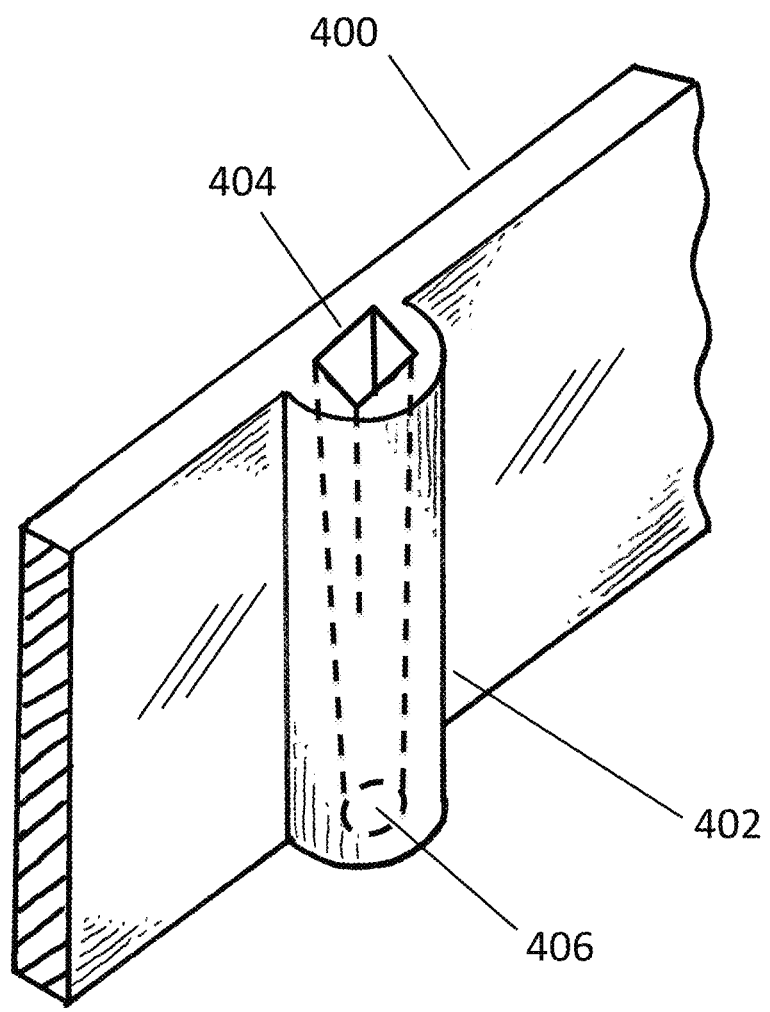
FIG. 29 shows an isometric view of an example of the present invention.

FIG. 29 shows an isometric view of an example of the present invention. This figure shows a section of the tree surround sidewall 400, comprising an integrally molded slot 402 with a circularly-shaped hole 404 oriented vertically disposed within, or along the side of, sidewall 400. Preferably the slot 402 is disposed on the inside of the tree surround 400, with reference to the same side as the tree would be located (i.e., in the center of surround 400). The circular hole 404 is for receiving a circular pin, large nail, or large screw (see, e.g., FIG. 30) for staking and holding the tree surround when being embedded into the ground. Hole 404 can optionally have a square, diamond, or oval cross-sectional shape along its entire length. Optionally, hole 404 can have a square cross-section at the top, tapering down to a circular cross-section 406 at the bottom, to match the design of pin 500 illustrated in FIG. 30.

The tree surround of the present invention can have any number of slots 402 for holding staking pins, e.g., 1, 2, 3, 4, 5, 6, etc. number of slots, depending on the length of the tree surround. A preferred number of slots ranges from 3 to 5 slots, according to Table 1.

TABLE 1

Number of Pin Slots

A. 4 foot long = 3 slots
B. 5 foot long = 4 slots
C. 6 foot long = 5 slots

Figure 30:
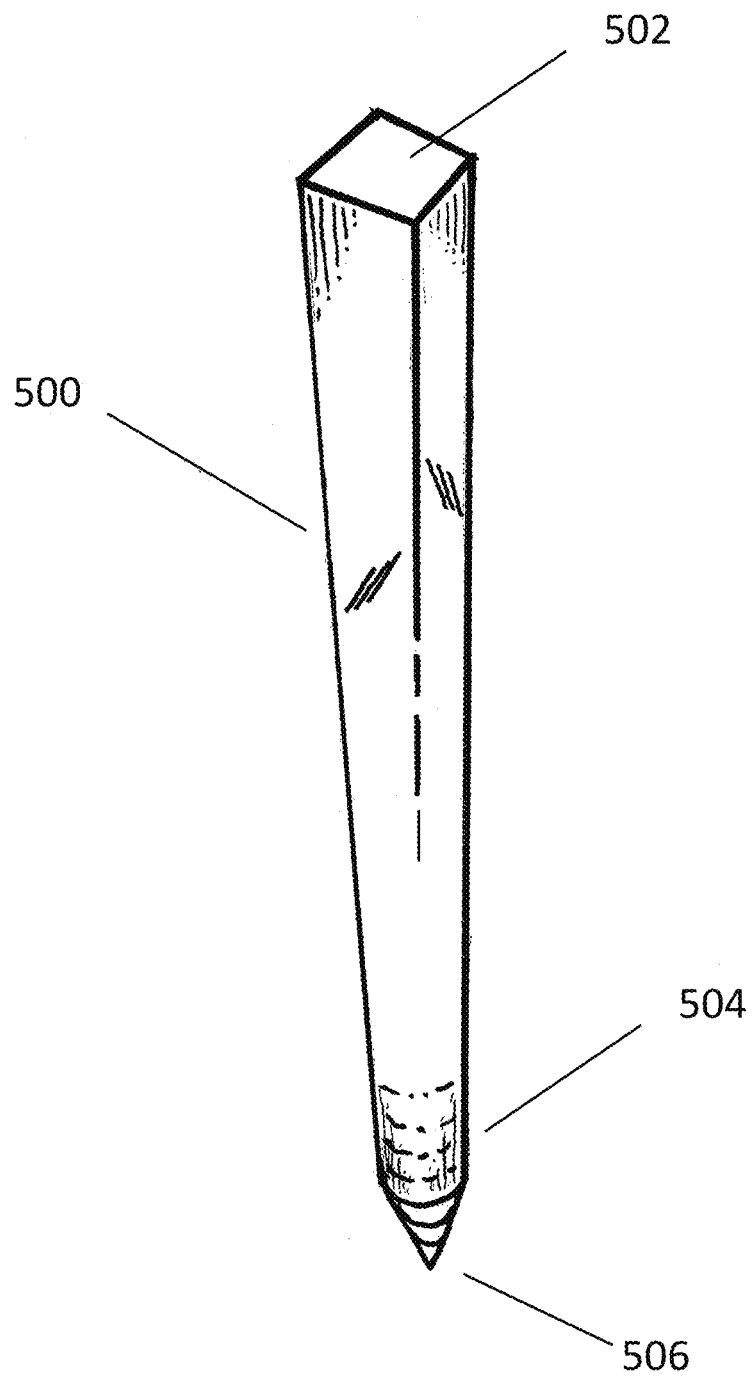
FIG. 30 shows an isometric view of an example of the present invention.

FIG. 30 shows an isometric view of an example of the present invention. This figure shows a stake or pin 500, for staking down the sidewall of a tree surround (not shown). Stake 500 comprises a square-shaped upper section 502; a cylindrical-shaped 504 bottom section; and a conical, pointed end 506; with a transitional shape that is in-between a square and cylinder disposed in the middle section of pin 500. Pin 500 can be used for staking and holding the tree surround when being embedded into the ground (see, e.g., FIG. 29). Pin 500 can be as long as 8 inches, and can extend into the ground at least as deep as 4 inches.

Figure 31A:
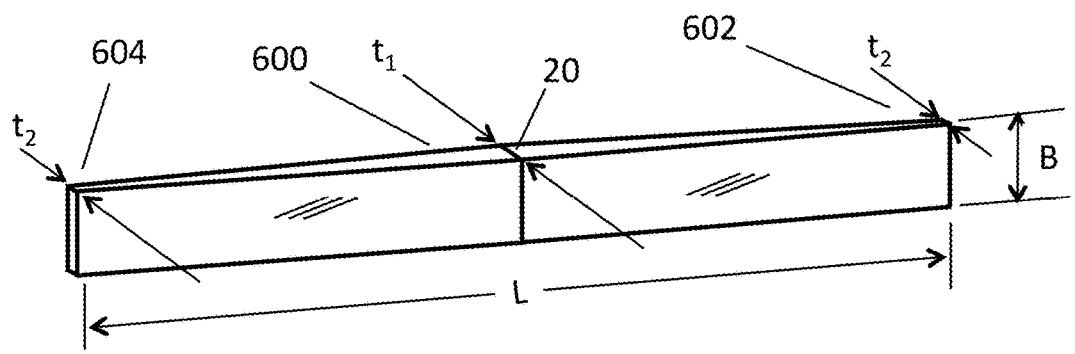
FIG. 31A shows an isometric view of an example of the present invention.
Figure 31B:
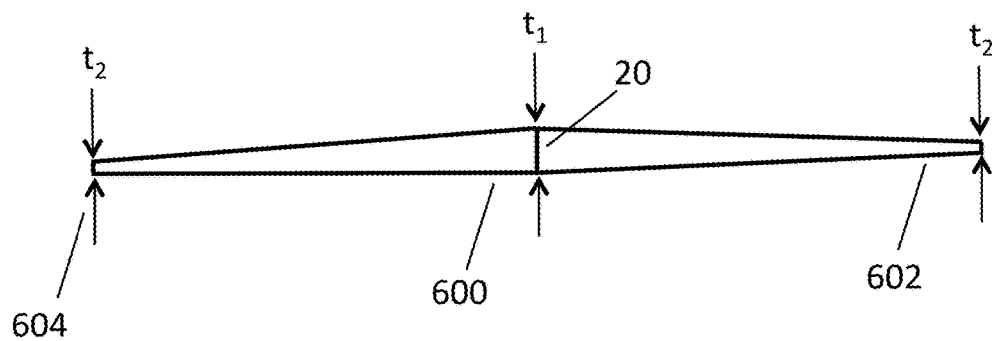
FIG. 31B shows a plan view of an example of the present invention.

FIG. 31A shows an isometric view of an example of the present invention. Tree surround strip 600 has a non-uniform thickness, ranging from $t_1$ at the center (highest point 20) to $t_2$ at the distal ends 602 and 604, where $t_1 > t_2$. The thinner section can be as much as ½ to ⅓ the thickest portion, i.e., $t_1 = t_1/2$ or $t_1 = t_2/3$. The non-uniform wall thickness can be used with either a tapered tree surround (i.e., where B<H) or with a constant height tree surround (i.e., B=H). The non-uniform wall thickness can be also seen in FIG. 31B, which shows a plan view of the example shown in FIG. 31A.

Figure 32A:
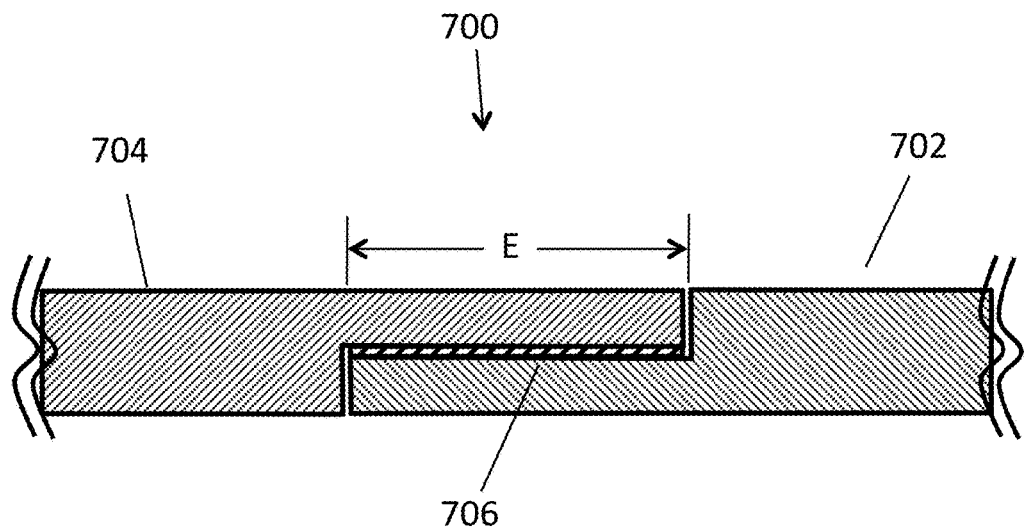
FIG. 32A shows a plan cross-section view of an example of the present invention.
Figure 32B:
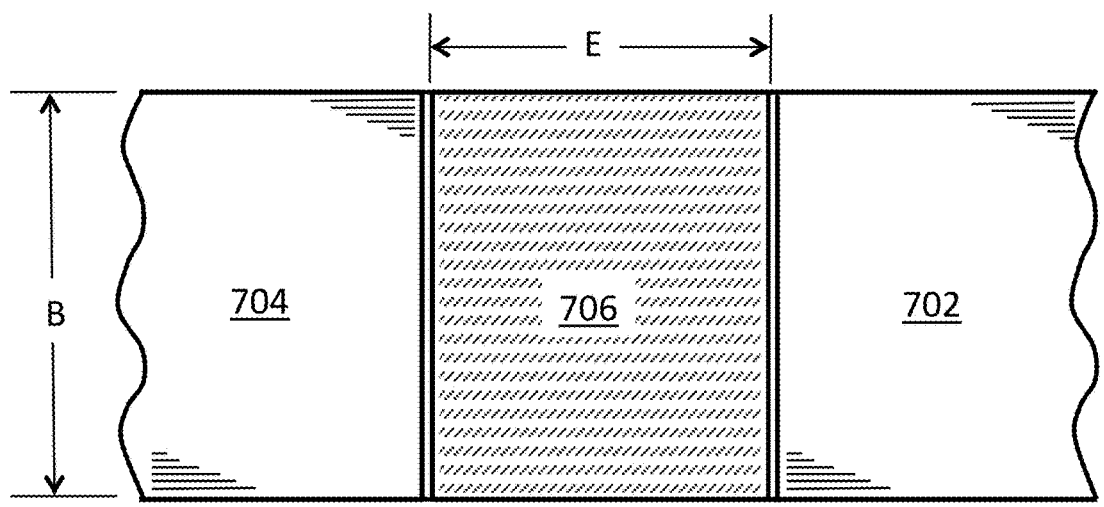
FIG. 32B shows an elevation view of an example of the present invention.

FIG. 32A shows a plan cross-section view of an example of the present invention. Joint 700 forms an overlapping joint where distal ends 702 and 704 overlap each other by an overlap distance=E, where E can range from B/2 to 2B, with a preferred distance of 2-3 inches. The joining material 706 that joins the two ends together can be an adhesive or glue, or it can comprise a Hook & Loop type of fastener (e.g., Velcro®) that is glued to the side walls. The adhesive joint can comprise a double-sided, pressure-sensitive type of adhesive tape. FIG. 32B shows an elevation view of the example of FIG. 32A.

Figure 33A:
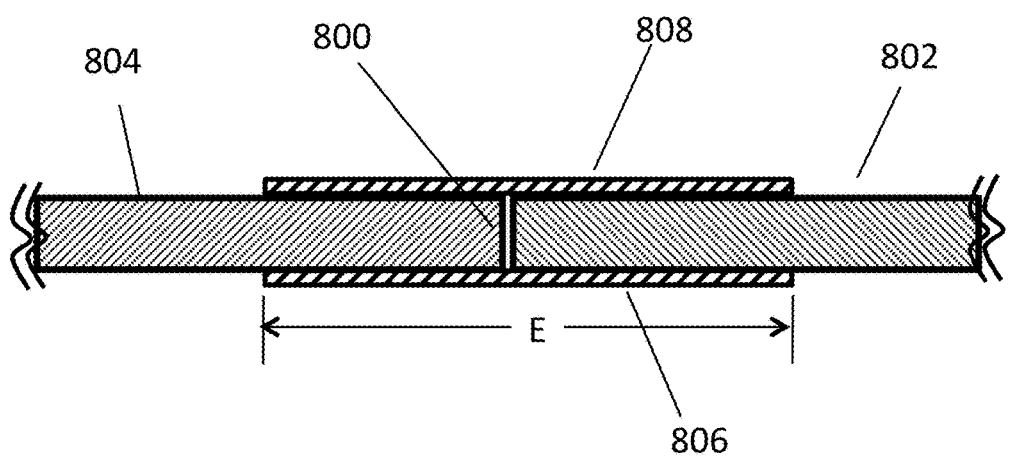
FIG. 33A shows a plan cross-section view of an example of the present invention.
Figure 33B:
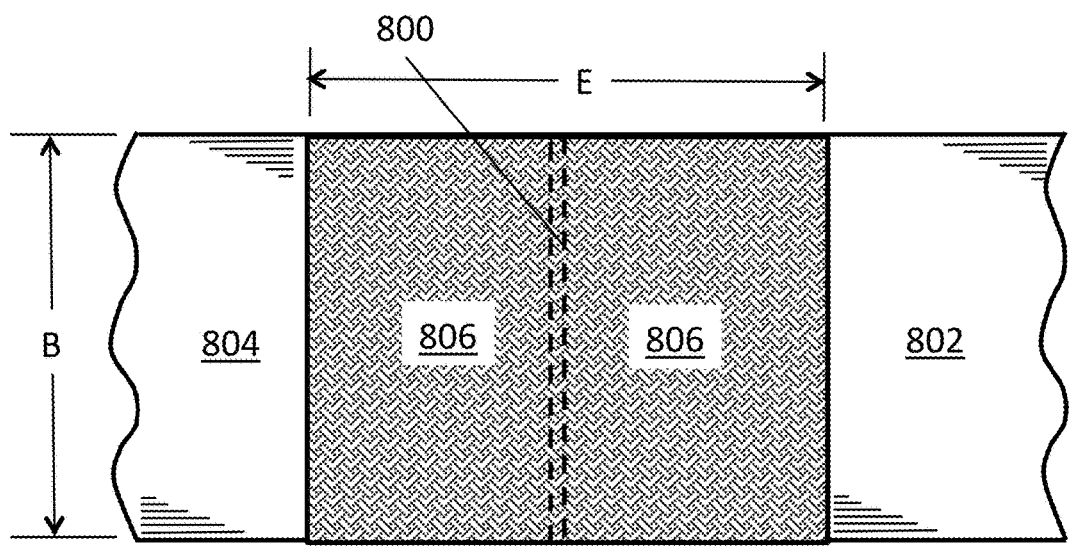
FIG. 33B shows an elevation view of an example of the present invention.

FIG. 33A shows a plan cross-section view of an example of the present invention. Here, the two distal ends 802 and 804 are simply butted together, and joined together on one or both sides by a segment of adhesive tape 806, 808 over a length=F, where F can range from B/2 to 2B, with a preferred distance of 2-4 inches. Depending on the construction of the tape segments 806, 808, the adhesive tape can serve two purposes: (1) structural and (2) waterproofing. FIG. 33B shows an elevation view of the example shown in FIG. 33A.

Figure 34A:
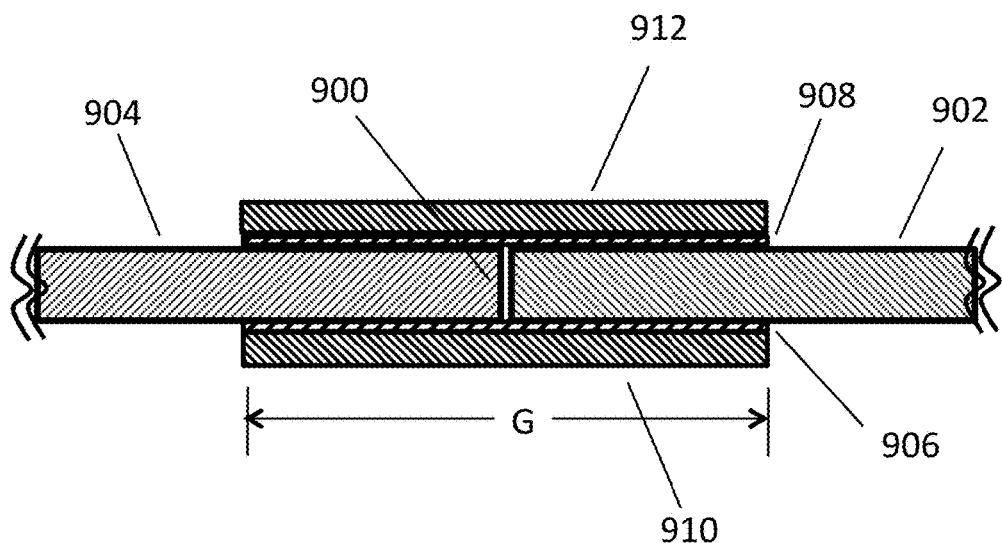
FIG. 34A shows a plan cross-section view of an example of the present invention.
Figure 34B:
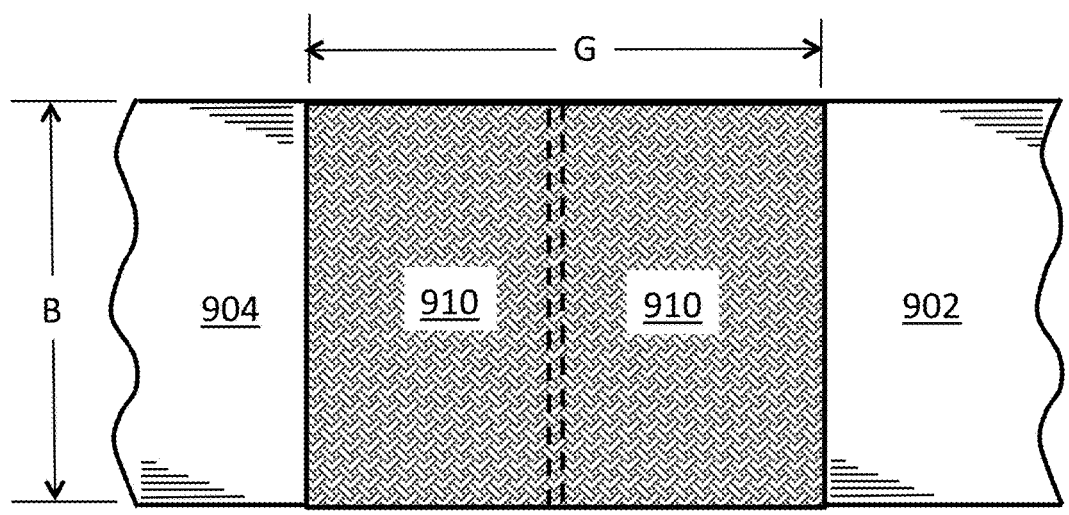
FIG. 34B shows an elevation view of an example of the present invention.

FIG. 34A shows a plan cross-section view of an example of the present invention. Here, the two distal ends 902 and 904 are simply butted together, and joined together on one or both sides by a segment of adhesive tape 906, 908 that joins a section of structural plastic 910, 912 over a length=G, where G can range from B/2 to 2B, with a preferred distance of 2-4 inches. Depending on the construction of the tape segments 906, 908, the adhesive tape can serve two purposes: (1) structural and (2) waterproofing. FIG. 34B shows an elevation view of the example shown in FIG. 33A.

An open version of the tree enclosure of the present invention can be made as a ¾ circle (e.g. θ=270°). It can be made as a 4 foot length by 4 inches in height (H=4 inches) tapering down on both sides to an end height of 2.25 inches (B=2.25 inches). The four foot length can be a single piece, and optionally can be pre-made as a curved segment curved to a ¾ circle. Optionally, it can be made as a 5 foot length by 5 inches in height (H=5 inches) tapering down on both sides to an end height of 2.75 inches (B=2.75 inches). The five foot length can be made into two half pieces that are joined in the middle with a single watertight joint. Optionally, it can be made as a 6 foot length by 6 inches in height (H=6 inches), tapering down to an end height of 3.25 inches (B=3.25 inches). The six foot length can be made into two half pieces that are joined in the middle with a single watertight joint. The main purpose for the 5 and 6 foot three-quarter semi circles being made into two separate pieces is for easier shipping and easier transporting. The bottom edge of each pre-made ¾ circle piece(s) can have an edge that is beveled to form a point (30-45 degree angle), with or without a serrated edge. This will allow the device to more easily penetrate the soil by twisting back and forth going down ¼" to ½", making the device more secure and not allowing water to drain underneath. The four foot long enclosure can have 3 slots. The fixed foot long enclosure can have 4 slots. The six foot long enclosure can have 4 slots. After the device is embedded in the ground, the spikes can be put through the slots and a hammer used to drive in the spikes to better secure the device. The thickness will be approximately 0.12 to 0.1875 inches thick. No digging is required to install the enclosure.

A closed version of the tree enclosure of the present invention can be made as a full-circle (e.g. θ=360°). It can be made as a 4 foot length (L=4 ft) by 4 inches in height (H=4 inches), and have a single watertight joint for joining the two free ends. The four foot length can be a single piece, and optionally can be pre-made as a curved segment curved to a full-circle. Optionally, it can be made as a 6 foot length by 5 inches in height (H=5 inches). The six foot length can be made into two, 3-foot long, half circle pieces that are joined in the middle, and at the ends, with a pair of watertight joints. Optionally, it can be made as an 8 foot length by 6 inches in height (H=6 inches). The eight foot length can be made into two, 4-foot long, half pieces that are joined in the middle, and at the ends, with a pair of watertight joints. The main purpose for the 6 and 8 foot full-circle enclosures being made into two separate pieces is for easier shipping and easier transporting. The bottom edge of each pre-made full-circle piece(s) can have an edge that is beveled to form a point (30-45 degree angle), with or without a serrated edge. This will allow the device to more easily penetrate the soil by twisting back and forth going down ¼" to ½", making the device more secure and not allowing water to drain underneath. After the device is embedded in the ground, the spikes can be put through the slots and a hammer used to drive in the spikes to better secure the device. The four foot long enclosure can have 3 slots spaced 16 inches apart from a locking joint. The six foot long enclosure can have 4 slots spaced 12 inches apart from the two locking joints. The eight foot long enclosure can have 4 slots spaced 16 inches apart from the two locking joints. Once connected at the locking joints, the enclosure will form a full 360 degree circle around the plant. The thickness will be approximately 0.12 to 0.1875 inches thick. No digging is required to install the enclosure.

What is claimed is:

1. A water-retaining enclosure for surrounding the base of a tree or bush planted on a sloped hillside, wherein the enclosure is assembled into a continuous, 360°, watertight ring; and is installed into a slope of a hill around a tree or shrub; and is rotationally oriented about a vertical central axis such that an upper planar surface of the assembled ring is oriented horizontally and perpendicular to the direction of gravity; the enclosure comprising a single long strip of resilient, water-impermeable, polymeric material; wherein the strip comprises:

a pair of distal ends,
a top edge, said top edge tapering from a central point of vertical height H down to a vertical height from 0 to H/2 at each of the distal ends,
an enhanced bottom edge, and
a rectangular cross-section of uniform wall thickness; and
further wherein the enhanced bottom edge comprises a sharpened edge comprising a single-beveled knife-edge or a double-beveled knife-edge for enhancing cutting into the soil when the bottom edge is partially buried in the ground; and
further comprising a connection at the distal ends of the strip together to form a continuous, 360°, watertight ring of the impermeable material that holds water; and
wherein said connection at the distal ends comprises a male/female connection joint comprising a mating male and female connector with a plurality of vertically-oriented, deformable, radially-oriented sealing fins arranged uniformly around a circumference of the joint and disposed in-between the male and female connectors;
wherein the sealing fins extend vertically along an entire vertical length of the male or female connector.

2. The enclosure of claim 1, wherein the length of the strip ranges from 3 to 6 feet long.

3. The enclosure of claim 1, wherein the enhanced bottom edge comprises a shape selected from the group consisting of: a wavy edge, a scalloped edge, and a plurality of molded sawteeth made integral with a wavy or scalloped bottom edge, and combinations thereof.

4. The enclosure of claim 1, wherein the resilient polymeric material comprises a wood/polymer composite material.

5. The enclosure of claim 1, wherein the male/female connection joint comprises a finned male connecter comprising the plurality of vertically-oriented, deformable, radially-oriented sealing fins spaced uniformly around an outer circumference of the male connector; wherein the sealing fins extend vertically along an entire vertical length of the male connector.

6. The enclosure of claim 5, where the deformable fins are made integral with the male connector.

7. The enclosure of claim 5, wherein the array of deformable fins is made integral with a thin base that is adhesively joined to the outer circumference of the male connector.

8. The enclosure of claim 1, wherein the male/female connection joint comprises a finned female connecter comprising the plurality of vertically-oriented, deformable, radially-oriented sealing fins spaced uniformly around an inner circumference of the female connector; wherein the sealing fins extend vertically along an entire vertical length of the female connector.

9. The enclosure of claim 8, where the deformable fins are made integral with the female connector.

10. The enclosure of claim 8, wherein the array of deformable fins is made integral with a thin base that is adhesively joined to the inner circumference of the female connector.

* * * * *